(12) United States Patent
Bataineh et al.

(10) Patent No.: US 11,973,685 B2
(45) Date of Patent: Apr. 30, 2024

(54) FAT TREE ADAPTIVE ROUTING

(71) Applicant: Hewlett Packard Enterprise Development LP, Houston, TX (US)

(72) Inventors: Abdulla M. Bataineh, Vista, CA (US); Thomas L. Court, Three Lakes, WI (US); Edwin L. Froese, Burnaby (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/594,687

(22) PCT Filed: Mar. 23, 2020

(86) PCT No.: PCT/US2020/024192
§ 371 (c)(1),
(2) Date: Oct. 26, 2021

(87) PCT Pub. No.: WO2020/236264
PCT Pub. Date: Nov. 26, 2020

(65) Prior Publication Data
US 2022/0210058 A1    Jun. 30, 2022

Related U.S. Application Data

(60) Provisional application No. 62/852,289, filed on May 23, 2019, provisional application No. 62/852,273, (Continued)

(51) Int. Cl.
*H04L 45/28* (2022.01)
*G06F 9/50* (2006.01)
(Continued)

(52) U.S. Cl.
CPC .............. *H04L 45/28* (2013.01); *G06F 9/505* (2013.01); *G06F 9/546* (2013.01);
(Continued)

(58) Field of Classification Search
CPC ...................................................... H04L 45/28
See application file for complete search history.

(56) References Cited

U.S. PATENT DOCUMENTS

| | | |
|---|---|---|
| 4,807,118 A | 2/1989 | Lin et al. |
| 5,138,615 A | 8/1992 | Lamport et al. |

(Continued)

FOREIGN PATENT DOCUMENTS

| | | |
|---|---|---|
| CN | 101729609 A | 6/2010 |
| CN | 102932203 A | 2/2013 |

(Continued)

OTHER PUBLICATIONS

Awerbuch, B., et al.; "An On-Demand Secure Routing Protocol Resilient to Byzantine Failures"; Sep. 2002; 10 pages.
(Continued)

*Primary Examiner* — Guang W Li
(74) *Attorney, Agent, or Firm* — Yao Legal Services, Inc.

(57) ABSTRACT

Systems and methods are provided for efficiently routing data through a network having a plurality of switches configured in a fat-tree topology, including: receiving a data transmission comprising a plurality of packets at an edge port of the network, and routing the data transmission through the network with routing decisions based upon a routing table, wherein the routing table includes entries to effect routing decisions based upon a destination based hash function.

20 Claims, 17 Drawing Sheets

Related U.S. Application Data filed on May 23, 2019, provisional application No. 62/852,203, filed on May 23, 2019.

(51) Int. Cl.

| | | |
|---|---|---|
| G06F 9/54 | (2006.01) | |
| G06F 12/0862 | (2016.01) | |
| G06F 12/1036 | (2016.01) | |
| G06F 12/1045 | (2016.01) | |
| G06F 13/14 | (2006.01) | |
| G06F 13/16 | (2006.01) | |
| G06F 13/38 | (2006.01) | |
| G06F 13/40 | (2006.01) | |
| G06F 13/42 | (2006.01) | |
| G06F 15/173 | (2006.01) | |
| H04L 1/00 | (2006.01) | |
| H04L 43/0876 | (2022.01) | |
| H04L 43/10 | (2022.01) | |
| H04L 45/00 | (2022.01) | |
| H04L 45/021 | (2022.01) | |
| H04L 45/028 | (2022.01) | |
| H04L 45/12 | (2022.01) | |
| H04L 45/122 | (2022.01) | |
| H04L 45/125 | (2022.01) | |
| H04L 45/16 | (2022.01) | |
| H04L 45/24 | (2022.01) | |
| H04L 45/42 | (2022.01) | |
| H04L 45/745 | (2022.01) | |
| H04L 45/7453 | (2022.01) | |
| H04L 47/10 | (2022.01) | |
| H04L 47/11 | (2022.01) | |
| H04L 47/12 | (2022.01) | |
| H04L 47/122 | (2022.01) | |
| H04L 47/20 | (2022.01) | |
| H04L 47/22 | (2022.01) | |
| H04L 47/24 | (2022.01) | |
| H04L 47/2441 | (2022.01) | |
| H04L 47/2466 | (2022.01) | |
| H04L 47/2483 | (2022.01) | |
| H04L 47/30 | (2022.01) | |
| H04L 47/32 | (2022.01) | |
| H04L 47/34 | (2022.01) | |
| H04L 47/52 | (2022.01) | |
| H04L 47/62 | (2022.01) | |
| H04L 47/625 | (2022.01) | |
| H04L 47/6275 | (2022.01) | |
| H04L 47/629 | (2022.01) | |
| H04L 47/76 | (2022.01) | |
| H04L 47/762 | (2022.01) | |
| H04L 47/78 | (2022.01) | |
| H04L 47/80 | (2022.01) | |
| H04L 49/00 | (2022.01) | |
| H04L 49/101 | (2022.01) | |
| H04L 49/15 | (2022.01) | |
| H04L 49/90 | (2022.01) | |
| H04L 49/9005 | (2022.01) | |
| H04L 49/9047 | (2022.01) | |
| H04L 67/1097 | (2022.01) | |
| H04L 69/22 | (2022.01) | |
| H04L 69/40 | (2022.01) | |
| H04L 69/28 | (2022.01) | |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(56) References Cited

U.S. PATENT DOCUMENTS

| | | |
|---|---|---|
| 5,457,687 A | 10/1995 | Newman |
| 5,937,436 A | 8/1999 | Watkins |
| 5,960,178 A | 9/1999 | Cochinwala et al. |
| 5,970,232 A | 10/1999 | Passint et al. |
| 5,983,332 A | 11/1999 | Watkins |
| 6,112,265 A | 8/2000 | Harriman et al. |
| 6,230,252 B1 | 5/2001 | Passint et al. |
| 6,246,682 B1 | 6/2001 | Roy et al. |
| 6,493,347 B2 | 12/2002 | Sindhu et al. |
| 6,545,981 B1 | 4/2003 | Garcia et al. |
| 6,633,580 B1 | 10/2003 | Toerudbakken et al. |
| 6,674,720 B1 | 1/2004 | Passint et al. |
| 6,714,553 B1 | 3/2004 | Poole et al. |
| 6,728,211 B1 | 4/2004 | Peris et al. |
| 6,732,212 B2 | 5/2004 | Sugahara et al. |
| 6,735,173 B1 | 5/2004 | Lenoski et al. |
| 6,894,974 B1 | 5/2005 | Aweva et al. |
| 7,023,856 B1 | 4/2006 | Washabaugh et al. |
| 7,133,940 B2 | 11/2006 | Blightman et al. |
| 7,218,637 B1 | 5/2007 | Best et al. |
| 7,269,180 B2 | 9/2007 | Bly et al. |
| 7,305,487 B2 | 12/2007 | Blumrich et al. |
| 7,337,285 B2 | 2/2008 | Tanoue |
| 7,397,797 B2 | 7/2008 | Alfieri et al. |

(56) References Cited

U.S. PATENT DOCUMENTS

| | | |
|---|---|---|
| 7,430,559 B2 | 9/2008 | Lomet |
| 7,441,006 B2 | 10/2008 | Biran et al. |
| 7,464,174 B1 | 12/2008 | Ngai |
| 7,483,442 B1 | 1/2009 | Torudbakken et al. |
| 7,562,366 B2 | 7/2009 | Pope et al. |
| 7,593,329 B2 | 9/2009 | Kwan et al. |
| 7,596,628 B2 | 9/2009 | Aloni et al. |
| 7,620,791 B1 | 11/2009 | Wentzlaff et al. |
| 7,633,869 B1 | 12/2009 | Morris et al. |
| 7,639,616 B1 | 12/2009 | Manula et al. |
| 7,734,894 B1 | 6/2010 | Wentzlaff et al. |
| 7,774,461 B2 | 8/2010 | Tanaka et al. |
| 7,782,869 B1 | 8/2010 | Chitlur Srinivasa |
| 7,796,579 B2 | 9/2010 | Bruss |
| 7,856,026 B1 | 12/2010 | Finan et al. |
| 7,933,282 B1 | 4/2011 | Gupta et al. |
| 7,953,002 B2 | 5/2011 | Opsasnick |
| 7,975,120 B2 | 7/2011 | Sabbatini, Jr. et al. |
| 8,014,278 B1 | 9/2011 | Subramanian et al. |
| 8,023,521 B2 | 9/2011 | Woo et al. |
| 8,050,180 B2 | 11/2011 | Judd |
| 8,077,606 B1 | 12/2011 | Litwack |
| 8,103,788 B1 | 1/2012 | Miranda |
| 8,160,085 B2 | 4/2012 | Voruganti et al. |
| 8,175,107 B1 | 5/2012 | Yalagandula et al. |
| 8,249,072 B2 | 8/2012 | Sugumar et al. |
| 8,281,013 B2 | 10/2012 | Mundkur et al. |
| 8,352,727 B2 | 1/2013 | Chen et al. |
| 8,353,003 B2 | 1/2013 | Noehring et al. |
| 8,443,151 B2 | 5/2013 | Tang et al. |
| 8,473,783 B2 | 6/2013 | Andrade et al. |
| 8,543,534 B2 | 9/2013 | Alves et al. |
| 8,619,793 B2 | 12/2013 | Lavian et al. |
| 8,626,957 B2 | 1/2014 | Blumrich et al. |
| 8,650,582 B2 | 2/2014 | Archer et al. |
| 8,706,832 B2 | 4/2014 | Blocksome |
| 8,719,543 B2 | 5/2014 | Kaminski et al. |
| 8,811,183 B1 | 8/2014 | Anand et al. |
| 8,948,175 B2 | 2/2015 | Bly et al. |
| 8,971,345 B1 | 3/2015 | McCanne et al. |
| 9,001,663 B2 | 4/2015 | Attar et al. |
| 9,053,012 B1 | 6/2015 | Northcott et al. |
| 9,088,496 B2 | 7/2015 | Vaidya et al. |
| 9,094,327 B2 | 7/2015 | Jacobs et al. |
| 9,178,782 B2 | 11/2015 | Matthews et al. |
| 9,208,071 B2 | 12/2015 | Talagala et al. |
| 9,218,278 B2 | 12/2015 | Talagala et al. |
| 9,231,876 B2 | 1/2016 | Mir et al. |
| 9,231,888 B2 | 1/2016 | Bogdanski et al. |
| 9,239,804 B2 | 1/2016 | Kegel et al. |
| 9,269,438 B2 | 2/2016 | Nachimuthu et al. |
| 9,276,771 B1 * | 3/2016 | Zhou .................. H04L 45/02 |
| 9,276,864 B1 | 3/2016 | Pradeep |
| 9,436,651 B2 | 9/2016 | Underwood et al. |
| 9,455,915 B2 | 9/2016 | Sinha et al. |
| 9,460,178 B2 | 10/2016 | Bashyam et al. |
| 9,479,426 B2 | 10/2016 | Munger et al. |
| 9,496,991 B2 | 11/2016 | Plamondon et al. |
| 9,544,234 B1 | 1/2017 | Markine |
| 9,548,924 B2 | 1/2017 | Pettit et al. |
| 9,594,521 B2 | 3/2017 | Blagodurov et al. |
| 9,635,121 B2 | 4/2017 | Mathew et al. |
| 9,716,592 B1 * | 7/2017 | Mandal ............... H04L 45/245 |
| 9,722,932 B1 * | 8/2017 | Brandwine ......... H04L 47/125 |
| 9,742,855 B2 | 8/2017 | Shuler et al. |
| 9,762,488 B2 | 9/2017 | Previdi et al. |
| 9,762,497 B2 | 9/2017 | Kishore et al. |
| 9,830,273 B2 | 11/2017 | Bk et al. |
| 9,838,500 B1 | 12/2017 | Lan et al. |
| 9,853,900 B1 | 12/2017 | Mula et al. |
| 9,887,923 B2 | 2/2018 | Chorafakis et al. |
| 10,003,544 B2 | 6/2018 | Liu et al. |
| 10,009,270 B1 | 6/2018 | Stark et al. |
| 10,031,857 B2 | 7/2018 | Menachem et al. |
| 10,033,638 B1 * | 7/2018 | Stark .................. H04L 69/22 |
| 10,050,896 B2 | 8/2018 | Yang et al. |
| 10,061,613 B1 | 8/2018 | Brooker et al. |
| 10,063,481 B1 | 8/2018 | Jiang et al. |
| 10,089,220 B1 | 10/2018 | McKelvie et al. |
| 10,169,060 B1 | 1/2019 | Mncent et al. |
| 10,178,035 B2 | 1/2019 | Dillon |
| 10,200,279 B1 | 2/2019 | Aljaedi |
| 10,218,634 B2 | 2/2019 | Aldebert et al. |
| 10,270,700 B2 | 4/2019 | Burnette et al. |
| 10,305,772 B2 | 5/2019 | Zur et al. |
| 10,331,590 B2 | 6/2019 | Macnamara et al. |
| 10,353,833 B2 | 7/2019 | Hagspiel et al. |
| 10,454,835 B2 | 10/2019 | Contavalli et al. |
| 10,498,672 B2 | 12/2019 | Graham et al. |
| 10,567,307 B2 | 2/2020 | Fairhurst et al. |
| 10,728,173 B1 | 7/2020 | Agrawal et al. |
| 10,802,828 B1 | 10/2020 | Volpe et al. |
| 10,817,502 B2 | 10/2020 | Talagala et al. |
| 11,128,561 B1 | 9/2021 | Matthews et al. |
| 11,271,869 B1 | 3/2022 | Agrawal et al. |
| 11,416,749 B2 | 8/2022 | Bshara et al. |
| 11,444,886 B1 | 9/2022 | Stawitzky et al. |
| 2001/0010692 A1 | 8/2001 | Sindhu et al. |
| 2001/0047438 A1 | 11/2001 | Forin |
| 2002/0174279 A1 | 11/2002 | Wynne et al. |
| 2003/0016808 A1 | 1/2003 | Hu et al. |
| 2003/0041168 A1 | 2/2003 | Musoll |
| 2003/0110455 A1 | 6/2003 | Baumgartner et al. |
| 2003/0174711 A1 | 9/2003 | Shankar |
| 2003/0200363 A1 | 10/2003 | Futral |
| 2003/0223420 A1 | 12/2003 | Ferolito |
| 2004/0008716 A1 | 1/2004 | Stiliadis |
| 2004/0059828 A1 | 3/2004 | Hooper et al. |
| 2004/0095882 A1 | 5/2004 | Hamzah et al. |
| 2004/0133634 A1 | 7/2004 | Luke et al. |
| 2004/0223452 A1 | 11/2004 | Santos et al. |
| 2005/0021837 A1 | 1/2005 | Haselhorst et al. |
| 2005/0047334 A1 | 3/2005 | Paul et al. |
| 2005/0088969 A1 | 4/2005 | Carlsen et al. |
| 2005/0091396 A1 | 4/2005 | Nilakantan et al. |
| 2005/0108444 A1 | 5/2005 | Flauaus et al. |
| 2005/0108518 A1 | 5/2005 | Pandya |
| 2005/0152274 A1 | 7/2005 | Simpson |
| 2005/0182854 A1 | 8/2005 | Pinkerton et al. |
| 2005/0270974 A1 | 12/2005 | Mayhew |
| 2005/0270976 A1 | 12/2005 | Yang et al. |
| 2006/0023705 A1 | 2/2006 | Zoranovic et al. |
| 2006/0067347 A1 | 3/2006 | Naik et al. |
| 2006/0075480 A1 | 4/2006 | Noehring et al. |
| 2006/0174251 A1 | 8/2006 | Pope et al. |
| 2006/0203728 A1 | 9/2006 | Kwan et al. |
| 2007/0061433 A1 | 3/2007 | Reynolds et al. |
| 2007/0070901 A1 | 3/2007 | Aloni et al. |
| 2007/0198804 A1 | 8/2007 | Moyer |
| 2007/0211746 A1 | 9/2007 | Oshikiri et al. |
| 2007/0242611 A1 | 10/2007 | Archer et al. |
| 2007/0268825 A1 | 11/2007 | Corwin et al. |
| 2008/0013453 A1 | 1/2008 | Chiang et al. |
| 2008/0013549 A1 | 1/2008 | Okagawa et al. |
| 2008/0071757 A1 | 3/2008 | Ichiriu et al. |
| 2008/0084864 A1 | 4/2008 | Archer et al. |
| 2008/0091915 A1 | 4/2008 | Moertl et al. |
| 2008/0147881 A1 | 6/2008 | Krishnamurthy et al. |
| 2008/0159138 A1 | 7/2008 | Shepherd et al. |
| 2008/0253289 A1 | 10/2008 | Naven et al. |
| 2009/0003212 A1 | 1/2009 | Kwan et al. |
| 2009/0010157 A1 | 1/2009 | Holmes et al. |
| 2009/0013175 A1 | 1/2009 | Elliott |
| 2009/0055496 A1 | 2/2009 | Garg et al. |
| 2009/0092046 A1 | 4/2009 | Naven et al. |
| 2009/0141621 A1 | 6/2009 | Fan et al. |
| 2009/0198958 A1 | 8/2009 | Arimilli et al. |
| 2009/0259713 A1 | 10/2009 | Blumrich et al. |
| 2009/0285222 A1 | 11/2009 | Hoover et al. |
| 2010/0061241 A1 | 3/2010 | Sindhu et al. |
| 2010/0169608 A1 | 7/2010 | Kuo et al. |
| 2010/0172260 A1 | 7/2010 | Kwan et al. |
| 2010/0183024 A1 | 7/2010 | Gupta |
| 2010/0220595 A1 | 9/2010 | Petersen |

(56) References Cited

U.S. PATENT DOCUMENTS

| | | |
|---|---|---|
| 2010/0274876 A1 | 10/2010 | Kagan et al. |
| 2010/0302942 A1 | 12/2010 | Shankar et al. |
| 2010/0316053 A1 | 12/2010 | Miyoshi et al. |
| 2011/0051724 A1 | 3/2011 | Scott et al. |
| 2011/0066824 A1 | 3/2011 | Bestler |
| 2011/0072179 A1 | 3/2011 | Lacroute et al. |
| 2011/0099326 A1 | 4/2011 | Jung et al. |
| 2011/0110383 A1 | 5/2011 | Yang et al. |
| 2011/0128959 A1 | 6/2011 | Bando et al. |
| 2011/0158096 A1 | 6/2011 | Leung et al. |
| 2011/0158248 A1 | 6/2011 | Vorunganti et al. |
| 2011/0164496 A1 | 7/2011 | Loh et al. |
| 2011/0173370 A1 | 7/2011 | Jacobs et al. |
| 2011/0264822 A1 | 10/2011 | Ferguson et al. |
| 2011/0276699 A1 | 11/2011 | Pedersen |
| 2011/0280125 A1 | 11/2011 | Jayakumar |
| 2011/0320724 A1 | 12/2011 | Mejdrich et al. |
| 2012/0093505 A1 | 4/2012 | Yeap et al. |
| 2012/0102506 A1 | 4/2012 | Hopmann et al. |
| 2012/0117423 A1 | 5/2012 | Andrade et al. |
| 2012/0137075 A1 | 5/2012 | Vorbach |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0170462 A1 | 7/2012 | Sinha |
| 2012/0170575 A1 | 7/2012 | Mehra |
| 2012/0213118 A1 | 8/2012 | Lindsay et al. |
| 2012/0250512 A1 | 10/2012 | Jagadeeswaran et al. |
| 2012/0287821 A1 | 11/2012 | Godfrey et al. |
| 2012/0297083 A1 | 11/2012 | Ferguson et al. |
| 2012/0300669 A1 | 11/2012 | Zahavi |
| 2012/0314707 A1 | 12/2012 | Epps et al. |
| 2013/0010636 A1 | 1/2013 | Regula |
| 2013/0039169 A1* | 2/2013 | Schlansker ............. H04L 45/28 370/225 |
| 2013/0060944 A1 | 3/2013 | Archer et al. |
| 2013/0103777 A1 | 4/2013 | Kagan et al. |
| 2013/0121178 A1 | 5/2013 | Mainaud et al. |
| 2013/0136090 A1 | 5/2013 | Liu et al. |
| 2013/0182704 A1 | 7/2013 | Jacobs et al. |
| 2013/0194927 A1 | 8/2013 | Yamaguchi et al. |
| 2013/0203422 A1 | 8/2013 | Masputra et al. |
| 2013/0205002 A1 | 8/2013 | Wang et al. |
| 2013/0208593 A1 | 8/2013 | Nandagopal |
| 2013/0246552 A1 | 9/2013 | Underwood et al. |
| 2013/0290673 A1 | 10/2013 | Archer et al. |
| 2013/0301645 A1 | 11/2013 | Bogdanski et al. |
| 2013/0304988 A1 | 11/2013 | Totolos et al. |
| 2013/0311525 A1 | 11/2013 | Neerincx et al. |
| 2013/0329577 A1 | 12/2013 | Suzuki et al. |
| 2013/0336164 A1* | 12/2013 | Yang ..................... H04L 47/125 370/255 |
| 2014/0019661 A1 | 1/2014 | Hormuth et al. |
| 2014/0032695 A1 | 1/2014 | Michels et al. |
| 2014/0036680 A1 | 2/2014 | Lih et al. |
| 2014/0064082 A1 | 3/2014 | Yeung et al. |
| 2014/0095753 A1 | 4/2014 | Crupnicoff et al. |
| 2014/0098675 A1 | 4/2014 | Frost et al. |
| 2014/0119367 A1 | 5/2014 | Han et al. |
| 2014/0122560 A1 | 5/2014 | Ramey et al. |
| 2014/0129664 A1 | 5/2014 | McDaniel et al. |
| 2014/0133292 A1 | 5/2014 | Yamatsu et al. |
| 2014/0136646 A1 | 5/2014 | Tamir et al. |
| 2014/0169173 A1 | 6/2014 | Naouri et al. |
| 2014/0185621 A1 | 7/2014 | Decusatis et al. |
| 2014/0189174 A1 | 7/2014 | Ajanovic et al. |
| 2014/0207881 A1 | 7/2014 | Nussle et al. |
| 2014/0211804 A1 | 7/2014 | Makikeni et al. |
| 2014/0226488 A1 | 8/2014 | Shamis et al. |
| 2014/0241164 A1 | 8/2014 | Cociglio et al. |
| 2014/0258438 A1 | 9/2014 | Ayoub |
| 2014/0301390 A1 | 10/2014 | Scott et al. |
| 2014/0307554 A1 | 10/2014 | Basso et al. |
| 2014/0325013 A1 | 10/2014 | Tamir et al. |
| 2014/0328172 A1 | 11/2014 | Kumar et al. |
| 2014/0347997 A1 | 11/2014 | Bergamasco et al. |
| 2014/0362698 A1 | 12/2014 | Arad |
| 2014/0369360 A1 | 12/2014 | Carlstrom |
| 2014/0379847 A1 | 12/2014 | Williams |
| 2015/0003247 A1 | 1/2015 | Mejia et al. |
| 2015/0006849 A1 | 1/2015 | Xu et al. |
| 2015/0009823 A1 | 1/2015 | Ganga et al. |
| 2015/0026361 A1 | 1/2015 | Matthews et al. |
| 2015/0029848 A1 | 1/2015 | Jain |
| 2015/0055476 A1 | 2/2015 | Decusatis et al. |
| 2015/0055661 A1 | 2/2015 | Boucher et al. |
| 2015/0067095 A1 | 3/2015 | Gopal et al. |
| 2015/0089495 A1 | 3/2015 | Persson et al. |
| 2015/0103667 A1 | 4/2015 | Elias et al. |
| 2015/0124826 A1 | 5/2015 | Edsall et al. |
| 2015/0146527 A1 | 5/2015 | Kishore et al. |
| 2015/0154004 A1 | 6/2015 | Aggarwal |
| 2015/0161064 A1 | 6/2015 | Pope |
| 2015/0180782 A1 | 6/2015 | Rimmer et al. |
| 2015/0186318 A1 | 7/2015 | Kim et al. |
| 2015/0193262 A1 | 7/2015 | Archer et al. |
| 2015/0195204 A1* | 7/2015 | Haramaty ............. H04L 47/122 370/237 |
| 2015/0195388 A1 | 7/2015 | Snyder et al. |
| 2015/0208145 A1 | 7/2015 | Parker et al. |
| 2015/0220449 A1 | 8/2015 | Stark et al. |
| 2015/0237180 A1 | 8/2015 | Swartzentruber et al. |
| 2015/0244617 A1 | 8/2015 | Nakil et al. |
| 2015/0244804 A1 | 8/2015 | Warfield et al. |
| 2015/0261434 A1 | 9/2015 | Kagan et al. |
| 2015/0263955 A1 | 9/2015 | Talaski et al. |
| 2015/0263994 A1 | 9/2015 | Haramaty et al. |
| 2015/0288626 A1* | 10/2015 | Aybay ................. H04L 49/9084 370/235 |
| 2015/0365337 A1 | 12/2015 | Pannell |
| 2015/0370586 A1 | 12/2015 | Cooper et al. |
| 2016/0006664 A1 | 1/2016 | Sabato et al. |
| 2016/0012002 A1 | 1/2016 | Arimilli et al. |
| 2016/0028613 A1 | 1/2016 | Haramaty et al. |
| 2016/0065455 A1 | 3/2016 | Wang et al. |
| 2016/0094450 A1 | 3/2016 | Ghanwani et al. |
| 2016/0134518 A1 | 5/2016 | Callon et al. |
| 2016/0134535 A1 | 5/2016 | Callon |
| 2016/0134559 A1 | 5/2016 | Abel et al. |
| 2016/0134573 A1 | 5/2016 | Gagliardi et al. |
| 2016/0142318 A1* | 5/2016 | Beecroft ................ H04L 45/125 370/237 |
| 2016/0154756 A1 | 6/2016 | Dodson et al. |
| 2016/0182383 A1 | 6/2016 | Pedersen |
| 2016/0182450 A1* | 6/2016 | Mihelich ................ H04L 67/142 726/13 |
| 2016/0205023 A1 | 7/2016 | Janardhanan |
| 2016/0226797 A1 | 8/2016 | Aravinthan et al. |
| 2016/0254991 A1* | 9/2016 | Eckert ................. H04L 12/4633 370/225 |
| 2016/0259394 A1 | 9/2016 | Ragavan |
| 2016/0283422 A1 | 9/2016 | Crupnicoff et al. |
| 2016/0285545 A1 | 9/2016 | Schmidtke et al. |
| 2016/0285677 A1 | 9/2016 | Kashyap et al. |
| 2016/0294694 A1 | 10/2016 | Parker et al. |
| 2016/0294926 A1 | 10/2016 | Zur et al. |
| 2016/0301610 A1 | 10/2016 | Amit et al. |
| 2016/0344620 A1 | 11/2016 | G. Santos et al. |
| 2016/0381189 A1 | 12/2016 | Caulfield et al. |
| 2017/0024263 A1 | 1/2017 | Verplanken |
| 2017/0039063 A1 | 2/2017 | Gopal et al. |
| 2017/0041239 A1 | 2/2017 | Goldenberg et al. |
| 2017/0048144 A1 | 2/2017 | Liu |
| 2017/0054633 A1 | 2/2017 | Underwood et al. |
| 2017/0091108 A1 | 3/2017 | Arellano et al. |
| 2017/0097840 A1 | 4/2017 | Bridgers |
| 2017/0103108 A1 | 4/2017 | Datta et al. |
| 2017/0118090 A1 | 4/2017 | Pettit et al. |
| 2017/0118098 A1 | 4/2017 | Littlejohn et al. |
| 2017/0153852 A1 | 6/2017 | Ma et al. |
| 2017/0177541 A1 | 6/2017 | Berman et al. |
| 2017/0220500 A1 | 8/2017 | Tong |
| 2017/0237654 A1 | 8/2017 | Turner et al. |
| 2017/0237671 A1 | 8/2017 | Rimmer et al. |

(56) References Cited

U.S. PATENT DOCUMENTS

| | | |
|---|---|---|
| 2017/0242753 A1 | 8/2017 | Sherlock et al. |
| 2017/0250914 A1 | 8/2017 | Caulfield et al. |
| 2017/0251394 A1 | 8/2017 | Johansson et al. |
| 2017/0270051 A1 | 9/2017 | Chen et al. |
| 2017/0272331 A1 | 9/2017 | Lissack |
| 2017/0272370 A1 | 9/2017 | Ganga et al. |
| 2017/0286316 A1 | 10/2017 | Doshi et al. |
| 2017/0289066 A1 | 10/2017 | Haramaty et al. |
| 2017/0295098 A1 | 10/2017 | Watkins et al. |
| 2017/0324664 A1 | 11/2017 | Xu et al. |
| 2017/0371778 A1 | 12/2017 | McKelvie et al. |
| 2018/0004705 A1 | 1/2018 | Menachem et al. |
| 2018/0019948 A1 | 1/2018 | Patwardhan et al. |
| 2018/0026878 A1 | 1/2018 | Zahavi et al. |
| 2018/0077064 A1 | 3/2018 | Wang |
| 2018/0083868 A1 | 3/2018 | Cheng |
| 2018/0097645 A1 | 4/2018 | Rajagopalan et al. |
| 2018/0097912 A1 | 4/2018 | Chumbalkar et al. |
| 2018/0113618 A1 | 4/2018 | Chan et al. |
| 2018/0115469 A1 | 4/2018 | Erickson et al. |
| 2018/0131602 A1 | 5/2018 | Civanlar et al. |
| 2018/0131678 A1 | 5/2018 | Agarwal et al. |
| 2018/0150374 A1 | 5/2018 | Ratcliff |
| 2018/0152317 A1 | 5/2018 | Chang et al. |
| 2018/0152357 A1 | 5/2018 | Natham et al. |
| 2018/0173557 A1 | 6/2018 | Nakil et al. |
| 2018/0183724 A1 | 6/2018 | Callard et al. |
| 2018/0191609 A1 | 7/2018 | Caulfield et al. |
| 2018/0198736 A1 | 7/2018 | Labonte et al. |
| 2018/0212876 A1 | 7/2018 | Bacthu et al. |
| 2018/0212902 A1 | 7/2018 | Steinmacher-Burow |
| 2018/0219804 A1 | 8/2018 | Graham et al. |
| 2018/0225238 A1 | 8/2018 | Karguth et al. |
| 2018/0234343 A1* | 8/2018 | Zdornov ............... H04L 47/621 |
| 2018/0254945 A1* | 9/2018 | Bogdanski .......... H04L 41/0672 |
| 2018/0260324 A1 | 9/2018 | Marathe et al. |
| 2018/0278540 A1 | 9/2018 | Shalev et al. |
| 2018/0287928 A1 | 10/2018 | Levi et al. |
| 2018/0323898 A1 | 11/2018 | Dods |
| 2018/0335974 A1 | 11/2018 | Simionescu et al. |
| 2018/0341494 A1 | 11/2018 | Sood et al. |
| 2019/0007349 A1 | 1/2019 | Wang et al. |
| 2019/0018808 A1 | 1/2019 | Beard et al. |
| 2019/0036771 A1 | 1/2019 | Sharpless et al. |
| 2019/0042337 A1 | 2/2019 | Dinan et al. |
| 2019/0042518 A1 | 2/2019 | Marolia |
| 2019/0044809 A1* | 2/2019 | Willis ................... G06F 16/2453 |
| 2019/0044827 A1* | 2/2019 | Ganapathi ........... H04L 41/0806 |
| 2019/0044863 A1 | 2/2019 | Mula et al. |
| 2019/0044872 A1 | 2/2019 | Ganapathi et al. |
| 2019/0044875 A1 | 2/2019 | Murty et al. |
| 2019/0052327 A1* | 2/2019 | Motozuka ............. H04W 88/02 |
| 2019/0058663 A1 | 2/2019 | Song |
| 2019/0068501 A1 | 2/2019 | Schneider et al. |
| 2019/0081903 A1 | 3/2019 | Kobayashi et al. |
| 2019/0095134 A1 | 3/2019 | Li |
| 2019/0104057 A1 | 4/2019 | Goel et al. |
| 2019/0104206 A1 | 4/2019 | Goel et al. |
| 2019/0108106 A1 | 4/2019 | Aggarwal et al. |
| 2019/0108332 A1 | 4/2019 | Glew et al. |
| 2019/0109791 A1 | 4/2019 | Mehra et al. |
| 2019/0121781 A1 | 4/2019 | Kasichainula |
| 2019/0140979 A1 | 5/2019 | Levi et al. |
| 2019/0146477 A1 | 5/2019 | Cella et al. |
| 2019/0171612 A1 | 6/2019 | Shahar et al. |
| 2019/0196982 A1 | 6/2019 | Rozas et al. |
| 2019/0199646 A1 | 6/2019 | Singh et al. |
| 2019/0253354 A1 | 8/2019 | Caulfield et al. |
| 2019/0280978 A1 | 9/2019 | Schmatz et al. |
| 2019/0294575 A1 | 9/2019 | Dennison et al. |
| 2019/0306134 A1 | 10/2019 | Shanbhogue et al. |
| 2019/0332314 A1 | 10/2019 | Zhang et al. |
| 2019/0334624 A1 | 10/2019 | Bernard |
| 2019/0356611 A1 | 11/2019 | Das et al. |
| 2019/0361728 A1 | 11/2019 | Kumar et al. |
| 2019/0379610 A1 | 12/2019 | Srinivasan et al. |
| 2020/0036644 A1 | 1/2020 | Belogolovy et al. |
| 2020/0084150 A1 | 3/2020 | Burstein et al. |
| 2020/0145725 A1 | 5/2020 | Eberle et al. |
| 2020/0177505 A1 | 6/2020 | Li |
| 2020/0177521 A1 | 6/2020 | Blumrich et al. |
| 2020/0259755 A1 | 8/2020 | Wang et al. |
| 2020/0272579 A1 | 8/2020 | Humphrey et al. |
| 2020/0274832 A1 | 8/2020 | Humphrey et al. |
| 2020/0334195 A1 | 10/2020 | Chen et al. |
| 2020/0349098 A1 | 11/2020 | Caulfield et al. |
| 2021/0081410 A1 | 3/2021 | Chavan et al. |
| 2021/0152494 A1* | 5/2021 | Johnsen ................ H04L 49/358 |
| 2021/0263779 A1 | 8/2021 | Haghighat et al. |
| 2021/0334206 A1 | 10/2021 | Colgrove et al. |
| 2021/0377156 A1 | 12/2021 | Michael et al. |
| 2021/0409351 A1 | 12/2021 | Das et al. |
| 2022/0131768 A1 | 4/2022 | Ganapathi et al. |
| 2022/0166705 A1 | 5/2022 | Froese |
| 2022/0200900 A1 | 6/2022 | Roweth |
| 2022/0210058 A1* | 6/2022 | Bataineh ................ H04L 45/70 |
| 2022/0217078 A1 | 7/2022 | Ford et al. |
| 2022/0217101 A1 | 7/2022 | Yefet et al. |
| 2022/0245072 A1 | 8/2022 | Roweth et al. |
| 2022/0278941 A1 | 9/2022 | Shalev et al. |
| 2022/0309025 A1 | 9/2022 | Chen et al. |
| 2023/0035420 A1 | 2/2023 | Sankaran et al. |
| 2023/0046221 A1 | 2/2023 | Pismenny et al. |

FOREIGN PATENT DOCUMENTS

| | | |
|---|---|---|
| CN | 110324249 A | 10/2019 |
| CN | 110601888 A | 12/2019 |
| EP | 0275135 A2 | 7/1988 |
| EP | 2187576 A1 | 5/2010 |
| EP | 2219329 A1 | 8/2010 |
| EP | 2947832 A1 | 11/2015 |
| EP | 3445006 A1 | 2/2019 |
| JP | 2003-244196 A | 8/2003 |
| JP | 3459653 B2 | 10/2003 |
| KR | 10-2012-0062864 A | 6/2012 |
| KR | 10-2012-0082739 A | 7/2012 |
| KR | 10-2014-0100529 A | 8/2014 |
| KR | 10-2015-0026939 A | 3/2015 |
| KR | 10-2015-0104056 A | 9/2015 |
| KR | 10-2017-0110106 A | 10/2017 |
| KR | 10-1850749 B1 | 4/2018 |
| WO | 2001/069851 A2 | 9/2001 |
| WO | 02/47329 A2 | 6/2002 |
| WO | 2003/019861 A2 | 3/2003 |
| WO | 2004/001615 A1 | 12/2003 |
| WO | 2005/094487 A2 | 10/2005 |
| WO | 2007/034184 A2 | 3/2007 |
| WO | 2009/010461 A2 | 1/2009 |
| WO | 2009/018232 A1 | 2/2009 |
| WO | 2014/092780 A1 | 6/2014 |
| WO | 2014/137382 A1 | 9/2014 |
| WO | 2014/141005 A1 | 9/2014 |
| WO | 2018/004977 A1 | 1/2018 |
| WO | 2018/046703 A1 | 3/2018 |
| WO | 2019/072072 A1 | 4/2019 |

OTHER PUBLICATIONS

Belayneh L.W., et al.; "Method and Apparatus for Routing Data in an Inter-Nodal Communications Lattice of a Massively Parallel Computer System by Semi-Randomly Varying Routing Policies for Different Packets"; 2019; 3 pages.

Bhatele, A., et al.; "Analyzing Network Health and Congestion in Dragonfly-based Supercomputers"; May 23-27, 2016; 10 pages.

Blumrich, M.A., et al.; "Exploiting Idle Resources in a High-Radix Switch for Supplemental Storage"; Nov. 2018; 13 pages.

Chang, F., et al.; "PVW: Designing Vir PVW: Designing Virtual World Ser orld Server Infr er Infrastructur astructure"; 2010; 8 pages.

Chang, F., et al.; "PVW: Designing Virtual World Server Infrastructure"; 2010; 8 pages.

(56) References Cited

OTHER PUBLICATIONS

Chen, F., et al.; "Requirements for RoCEv3 Congestion Management"; Mar. 21, 2019; 8 pages.
Cisco Packet Tracer; "packet-tracer;—ping"; https://www.cisco.com/c/en/us/td/docs/security/asa/asa-command-reference/I-R/cmdref2/p1.html; 2017.
Cisco; "Understanding Rapid Spanning Tree Protocol (802.1w)"; Aug. 1, 2017; 13 pages.
Eardley, ED, P; "Pre-Congestion Notification (PCN) Architecture"; Jun. 2009; 54 pages.
Escudero-Sahuquillo, J., et al.; "Combining Congested-Flow Isolation and Injection Throttling in HPC Interconnection Networks"; Sep. 13-16, 2011; 3 pages.
Hong, Y.; "Mitigating the Cost, Performance, and Power Overheads Induced by Load Variations in Multicore Cloud Servers"; Fall 2013; 132 pages.
Huawei; "The Lossless Network for Data Centers"; Nov. 7, 2017; 15 pages.
International Search Report and Written Opinion received for PCT Application No. PCT/US2020/024248, dated Jul. 8, 2020, 11 pages.
International Search Report and Written Opinion received for PCT Application No. PCT/US20/024332, dated Jul. 8, 2020, 13 pages.
International Search Report and Written Opinion received for PCT Application No. PCT/US20/24243, dated July 9. 2020, 10 pages.
International Search Report and Written Opinion received for PCT Application No. PCT/US20/24253, dated July 6. 2020, 12 pages.
International Search Report and Written Opinion received for PCT Application No. PCT/US20/24256, dated Jul. 7, 2020, 11 pages.
International Search Report and Written Opinion received for PCT Application No. PCT/US20/24257, dated Jul. 7, 2020, 10 pages.
International Search Report and Written Opinion received for PCT Application No. PCT/US20/24258, dated Jul. 7, 2020, 9 pages.
International Search Report and Written Opinion received for PCT Application No. PCT/US20/24259, dated Jul. 9, 2020, 13 pages.
International Search Report and Written Opinion received for PCT Application No. PCT/US20/24260, dated Jul. 7, 2020, 11 pages.
International Search Report and Written Opinion received for PCT Application No. PCT/US20/24268, dated Jul. 9, 2020, 11 pages.
International Search Report and Written Opinion received for PCT Application No. PCT/US20/24269, dated Jul. 9, 2020, 11 pages.
International Search Report and Written Opinion received for PCT Application No. PCT/US20/24339, dated Jul. 8, 2020, 11 pages.
International Search Report and Written Opinion received for PCT Application No. PCT/US2020/024125, dated Jul. 10, 2020, 5 pages.
International Search Report and Written Opinion received for PCT Application No. PCT/US2020/024129, dated Jul. 10, 2020, 11 pages.
International Search Report and Written Opinion received for PCT Application No. PCT/US2020/024237, dated Jul. 14, 2020, 5 pages.
International Search Report and Written Opinion received for PCT Application No. PCT/US2020/024239, dated Jul. 14, 2020, 11 pages.
International Search Report and Written Opinion received for PCT Application No. PCT/US2020/024241, dated Jul. 14, 2020, 13 pages.
International Search Report and Written Opinion received for PCT Application No. PCT/US2020/024242, dated Jul. 6, 2020, 11 pages.
International Search Report and Written Opinion received for PCT Application No. PCT/US2020/024244, dated Jul. 13, 2020, 10 pages.
International Search Report and Written Opinion received for PCT Application No. PCT/US2020/024245, dated Jul. 14, 2020, 11 pages.
International Search Report and Written Opinion received for PCT Application No. PCT/US2020/024246, dated Jul. 14, 2020, 10 pages.
International Search Report and Written Opinion received for PCT Application No. PCT/US2020/024250, dated Jul. 14, 2020, 12 pages.
International Search Report and Written Opinion received for PCT Application No. PCT/US2020/024254, dated Jul. 13, 2020, 10 pages.
International Search Report and Written Opinion received for PCT Application No. PCT/US2020/024262, dated Jul. 13, 2020, 10 pages.
International Search Report and Written Opinion received for PCT Application No. PCT/US2020/024266, dated Jul. 9, 2020, 10 pages.
International Search Report and Written Opinion received for PCT Application No. PCT/US2020/024270, dated Jul. 10, 2020, 13 pages.
International Search Report and Written Opinion received for PCT Application No. PCT/US2020/024271, dated Jul. 9, 2020, 10 pages.
International Search Report and Written Opinion received for PCT Application No. PCT/US2020/024272, dated Jul. 9, 2020, 10 pages.
International Search Report and Written Opinion received for PCT Application No. PCT/US2020/024276, dated Jul. 13, 2020, 9 pages.
International Search Report and Written Opinion received for PCT Application No. PCT/US2020/024304, dated Jul. 15, 2020, 11 pages.
International Search Report and Written Opinion received for PCT Application No. PCT/US2020/024311, dated Jul. 17, 2020, 8 pages.
International Search Report and Written Opinion received for PCT Application No. PCT/US2020/024321, dated Jul. 9, 2020, 9 pages.
International Search Report and Written Opinion received for PCT Application No. PCT/US2020/024324, dated Jul. 14, 2020, 10 pages.
International Search Report and Written Opinion received for PCT Application No. PCT/US2020/024327, dated Jul. 10, 2020, 15 pages.
International Search Report and Written Opinion received for PCT Application No. PCT/US2020/24158, dated Jul. 6, 2020, 18 pages.
International Search Report and Written Opinion received for PCT Application No. PCT/US2020/24251, dated Jul. 6, 2020, 11 pages.
International Search Report and Written Opinion received for PCT Application No. PCT/US2020/24267, dated Jul. 6, 2020, 9 pages.
Ramakrishnan et al., RFC 3168, "The addition of Explicit Congestion Notification (ECN) to IP", Sep. 2001 (Year: 2001).
International Search Report and Written Opinion received for PCT Patent Application No. PCT/US20/24303, dated Oct. 21, 2020, 9 pages.
International Search Report and Written Opinion received for PCT Patent Application No. PCT/US20/24340, dated Oct. 26, 2020, 9 pages.
International Search Report and Written Opinion received for PCT Patent Application No. PCT/US20/24342, dated Oct. 27, 2020, 10 pages.
International Search Report and Written Opinion received for PCT Patent Application No. PCT/US2020/024192, dated Oct. 23, 2020, 9 pages.
International Search Report and Written Opinion received for PCT Patent Application No. PCT/US2020/024221, dated Oct. 26, 2020, 9 pages.
International Search Report cited in PCT/US2020/024170 dated Dec. 16, 2020; 3 pages.
Maabi, S., et al.; "ERFAN: Efficient reconfigurable fault-tolerant deflection routing algorithm for 3-D Network-on-Chip"; Sep. 6-9, 2016.
Maglione-Mathey, G., et al.; "Scalable Deadlock-Free Deterministic Minimal-Path Routing Engine for InfiniBand-Based Dragonfly Networks"; Aug. 21, 2017; 15 pages.
Mamidala, A. R., et al.; "Efficient Barrier and Allreduce on Infiniband clusters using multicast and adaptive algorithms"; Sep. 20-23, 2004; 10 pages.
Mammeri, Z; "Reinforcement Learning Based Routing in Networks: Review and Classification of Approaches"; Apr. 29, 2019; 35 pages.
Mollah; M. A., et al.; "High Performance Computing Systems. Performance Modeling, Benchmarking, and Simulation: 8th International Workshop"; Nov. 13, 2017.
Open Networking Foundation; "OpenFlow Switch Specification"; Mar. 26, 2015; 283 pages.

(56) References Cited

OTHER PUBLICATIONS

Prakash, P., et al.; "The TCP Outcast Problem: Exposing Unfairness in Data Center Networks"; 2011; 15 pages.
Ramakrishnan, K., et al.; "The Addition of Explicit Congestion Notification (ECN) to IP"; Sep. 2001; 63 pages.
Roth, P. C., et al.; "MRNet: A Software-Based Multicast/Reduction Network for Scalable Tools1"; Nov. 15-21, 2003; 16 pages.
Silveira, J., et al.; "Preprocessing of Scenarios for Fast and Efficient Routing Reconfiguration in Fault-Tolerant NoCs"; Mar. 4-6, 2015.
Tsunekawa, K.; "Fair bandwidth allocation among LSPs for AF class accommodating TCP and UDP traffic in a Diffserv-capable MPLS network"; Nov. 17, 2005; 9 pages.
Underwood, K.D., et al.; "A hardware acceleration unit for MPI queue processing"; Apr. 18, 2005; 10 pages.
Wu, J.; "Fault-tolerant adaptive and minimal routing in mesh-connected multicomputers using extended safety levels"; Feb. 2000; 11 pages.
Xiang, D., et al.; "Fault-Tolerant Adaptive Routing in Dragonfly Networks"; Apr. 12, 2017; 15 pages.
Xiang, D., et al.; "Deadlock-Free Broadcast Routing in Dragonfly Networks without Virtual Channels", submission to IEEE transactions on Parallel and Distributed Systems, 2015, 15 pages.
Extended European Search Report and Search Opinion received for EP Application No. 20809930.9, dated Mar. 2, 2023, 9 pages.
Extended European Search Report and Search Opinion received for EP Application No. 20810784.7, dated Mar. 9, 2023, 7 pages.

\* cited by examiner

FAT TREE ADAPTIVE ROUTING

RELATED APPLICATIONS

This application claims the benefit of U.S. Provisional Patent Application No. 62/852,273, filed May 23, 2019, entitled "Network Switch," U.S. Provisional Patent Application No. 62/852,203, filed May 23, 2019, entitled "Network Interface Controller," and U.S. Provisional Patent Application No. 62/852,289, filed May 23, 2019, entitled "Network Computer System," the disclosures of which are incorporated herein by reference in their entirety for all purposes.

STATEMENT OF GOVERNMENT RIGHTS

The invention(s) described herein were made with U.S. Government support under one or more of the contracts set forth below. The U.S. Government has certain rights in these inventions.

| Contract Title | Customer/Agency | Contract Reference |
| --- | --- | --- |
| FastForward-2 | Lawrence Livermore National Security, LLC/Dept of Energy | Subcontract B609229 under prime contract DE-AC52-07NA27344 |
| BeePresent | Maryland Procurement Office | H98230-15-D-0020; Delivery Order 003 |
| SeaBiscuit | Maryland Procurement Office | II98230-14-C-0758 |
| PathForward | Lawrence Livermore National Security, LLC/Dept of Energy | Subcontract B620872 under prime contract DE-AC52-07NA27344 |
| DesignForward | The Regents of the University of California/Dept of Energy | Subcontract 7078453 under prime contract DE-AC02-05CII11231 |
| DesignForward-2 | The Regents of the University of California/Dept of Energy | Subcontract 7216357 under prime contract DE-AC02-05CII11231 |

BACKGROUND

Network switches are often implemented in computing environments as a tool for network communication. For example, network switches can interconnect with other components via a Network interface (NIC). Better communication methods and systems that implement these network switches are needed for improved communications in changing network environments.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

When multiple switches are configured in a fat tree topology, it was discovered that minimal routing techniques are less efficient. This is specifically true when dealing with uniform traffic across the network. In order to improve this, minimal routing techniques are replaced by a hash based routing methodology. More specifically, the routing table incorporates a hash function based upon the destination to make routing decisions.

Figure 1:
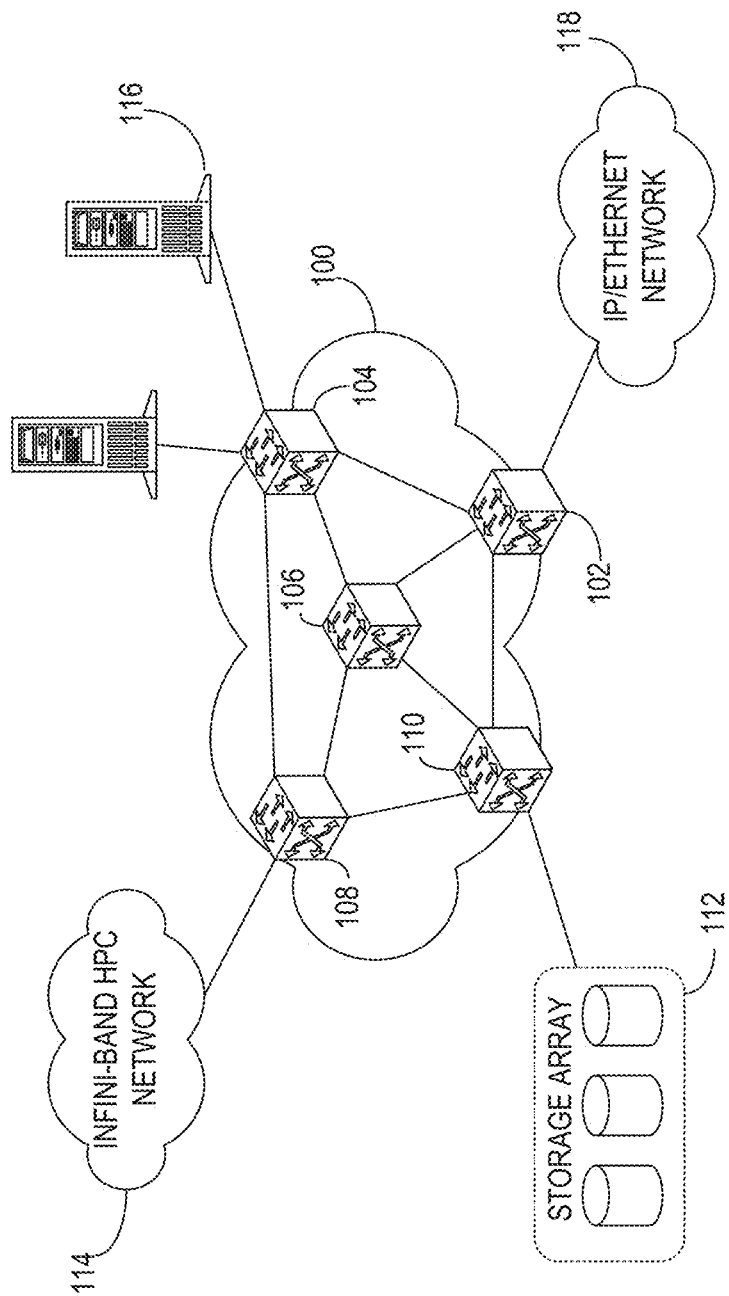
FIG. 1 illustrates an example network in which various embodiments may be implemented.

FIG. 1 shows an example network 100 comprising a plurality of switches, which can also be referred to as a "switch fabric." As illustrated in FIG. 1, network 100 can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. For example, a switch, such as switch 102 may receive 802.3 frames (including the encapsulated IP payload) by way of Ethernet devices, such as network interface cards (NICs), switches, routers, or gateways. IPv4 or IPv6 packets, frames formatted specifically for network 100, etc. may also be received, transported through the switch fabric 100, to another switch, e.g., switch 110. Thus, network 100 is capable of handling multiple types of traffic simultaneously. In general, a switch can have edge ports and fabric ports. An edge port can couple to a device that is external to the fabric. A fabric port can couple to another switch within the fabric via a fabric link.

Typically, traffic can be injected into switch fabric 100 via an ingress port of an edge switch, and leave switch fabric 100 via an egress port of another (or the same) edge switch. An ingress edge switch can group injected data packets into flows, which can be identified by flow ID's. The concept of a flow is not limited to a particular protocol or layer (such as layer-2 or layer-3 in the Open System Interface (OSI) reference model). For example, a flow can be mapped to traffic with a particular source Ethernet address, traffic between a source IP address and destination IP address, traffic corresponding to a TCP or UDP port/IP 5-tuple (source and destination IP addresses, source and destination TCP or UDP port numbers, and IP protocol number), or traffic produced by a process or thread running on an end host. In other words, a flow can be configured to map to data between any physical or logic entities. The configuration of this mapping can be done remotely or locally at the ingress edge switch.

Upon receiving injected data packets, the ingress edge switch can assign a flow ID to the flow. This flow ID can be included in a special header, which the ingress edge switch can use to encapsulate the injected packets. Furthermore, the ingress edge switch can also inspect the original header fields of an injected packet to determine the appropriate egress edge switch's address, and include this address as a destination address in the encapsulation header. Note that the flow ID can be a locally significant value specific to a link, and this value can be unique only to a particular input port on a switch. When the packet is forwarded to the next-hop switch, the packet enters another link, and the flow-ID can be updated accordingly. As the packets of a flow traverse multiple links and switches, the flow IDs corresponding to this flow can form a unique chain. That is, at every switch, before a packet leaves the switch, the packet's flow ID can be updated to a flow ID used by the outgoing link. This up-stream-to-down-stream one-to-one mapping between flow ID's can begin at the ingress edge switch and end at the egress edge switch. Because the flow ID's only need to be unique within an incoming link, a switch can accommodate a large number of flows. For example, if a flow ID is 11 bits long, an input port can support up to 2048 flows. Furthermore, the match pattern (one or more header fields of a packet) used to map to a flow can include a greater number of bits. For instance, a 32-bit long match pattern, which can include multiple fields in a packet header, can map up $2^{32}$ different header field patterns. If a fabric has N ingress edge ports, a total number of $N*2^{32}$ identifiable flows can be supported.

A switch can assign every flow a separate, dedicated input queue. This configuration allows the switch to monitor and manage the level of congestion of individual flows, and prevent head-of-queue blocking which could occur if shared buffer were used for multiple flows. When a packet is delivered to the destination egress switch, the egress switch can generate and send back an acknowledgement (ACK) in the upstream direction along the same data path to the ingress edge switch. As this ACK packet traverses the same data path, the switches along the path can obtain the state information associated with the delivery of the corresponding flow by monitoring the amount of outstanding, unacknowledged data. This state information can then be used to perform flow-specific traffic management to ensure the health of the entire network and fair treatment of the flows. As explained in more detail below, this per-flow queuing, combined with flow-specific delivery acknowledgements, can allow the switch fabric to implement effective, fast, and accurate congestion control. In turn, the switch fabric can deliver traffic with significantly improved network utilization without suffering from congestion.

Flows can be set up and released dynamically, or "on the fly," based on demand. Specifically, a flow can be set up (e.g., the flow-ID to packet header mapping is established) by an ingress edge switch when a data packet arrives at the switch and no flow ID has been previously assigned to this packet. As this packet travels through the network, flow IDs can be assigned along every switch the packet traverses, and a chain of flow IDs can be established from ingress to egress. Subsequent packets belonging to the same flow can use the same flow IDs along the data path. When packets are delivered to the destination egress switch and ACK packets are received by the switches along the data path, each switch can update its state information with respect to the amount of outstanding, unacknowledged data for this flow. When a switch's input queue for this flow is empty and there is no more unacknowledged data, the switch can release the flow ID (i.e., release this flow channel) and re-use the flow-ID for other flows. This data-driven dynamic flow setup and teardown mechanism can obviate the need for centralized flow management, and allows the network to respond quickly to traffic pattern changes.

Note that the network architecture described herein is different from software-defined networks (SDN's), which typically uses the OpenFlow protocol. In SDN, switches are configured by a central network controller, and packets are forwarded based one or more fields in the layer-2 (data link layer, such as Ethernet), layer-3 (network layer, such as IP), or layer-4 (transport layer, such as TCP or UDP) headers. In SDN such header-field lookup is performed at every switch in the network, and there is no fast flow ID-based forwarding as is done in the networks described herein. Furthermore, because the OpenFlow header-field lookup is done using ternary content-addressable memory (TCAM), the cost of such lookups can be high. Also, because the header-field mapping configuration is done by the central controller, the setup and tear-down of each mapping relationship is relatively slow and could require a fair amount of control traffic. As a result, an SDN network's response to various network situations, such as congestion, can be slow. In contrast, in the network described herein, the flows can be set up and torn down dynamically based on traffic demand; and packets can be forwarded by a fixed-length flow ID. In other words, flow channels can be data driven and managed (i.e., set up, monitored, and torn down) in a distributed manner, without the intervention of a central controller. Furthermore, the flow ID-based forwarding can reduce the amount of TCAM space used and as a result a much greater number of flows can be accommodated.

Referring to the example shown in FIG. 1, suppose that storage array 112 is to send data using TCP/IP to host 116. During operation, storage array 112 can send the first packet with host 116's IP address as the destination address and a predetermined TCP port specified in the TCP header. When this packet reaches switch 110, the packet processor at the input port of switch 110 can identify a TCP/IP 5-tuple of this packet. The packet processor of switch 110 can also determine that this 5-tuple currently is not mapped to any flow ID, and can allocate a new flow ID to this 5-tuple. Furthermore, switch 110 can determine the egress switch, which is switch 104, for this packet based on the destination (i.e., host 116's) IP address (assuming switch 110 has knowledge that host 116 is coupled to switch 104). Subsequently, switch 110 can encapsulate the received packet with a fabric header that indicates the newly assigned flow ID and switch 104's fabric address. Switch 110 can then schedule the encapsulated packet to be forwarded toward switch 104 based on a fabric forwarding table, which can be computed by all the switches in fabric 100 using a routing algorithm such as link state or distance vector.

Note that the operations described above can be performed substantially at line speed with little buffering and delay when the first packet is received. After the first packet is processed and scheduled for transmission, subsequent packets from the same flow can be processed by switch 110 even faster because the same flow ID is used. In addition, the design of the flow channels can be such that the allocation, matching, and deallocation of flow channels can have substantially the same cost. For example, a conditional allocation of a flow channel based on a lookup match and a separate, independent deallocation of another flow channel can be performed concurrently in nearly every clock cycle. This means that generating and controlling the flow channels can add nearly no additional overhead to the regular forwarding of packets. The congestion control mechanism, on the other hand, can improve the performance of some applications by more than three orders of magnitude.

At each switch along the data path (which includes switches 110, 106, and 104), a dedicated input buffer can be provided for this flow, and the amount of transmitted but unacknowledged data can be tracked. When the first packet reaches switch 104, switch 104 can determine that the destination fabric address in the packet's fabric header matches its own address. In response, switch 104 can decapsulate the packet from the fabric header, and forward the decapsulated packet to host 116. Furthermore, switch 104 can generate an ACK packet and send this ACK packet back to switch 110. As this ACK packet traverses the same data path, switches 106 and 110 can each update their own state information for the unacknowledged data for this flow.

In general, congestion within a network can cause the network buffers to fill. When a network buffer is full, the traffic trying to pass through the buffer ideally should be slowed down or stopped. Otherwise, the buffer could overflow and packets could be dropped. In conventional networks, congestion control is typically done end-to-end at the edge. The core of the network is assumed to function only as "dumb pipes," the main purpose of which is to forward traffic. Such network design often suffers from slow responses to congestions, because congestion information often cannot be sent to the edge devices quickly, and the resulting action taken by the edge devices cannot always be effective in removing the congestion. This slow response in turn limits the utilization of the network, because to keep the network free of congestion the network operator often needs to limit the total amount of traffic injected into the network. Furthermore, end-to-end congestion control usually is only effective provided that the network is not already congested. Once the network is heavily congested, end-to-end congestion control would not work, because the congestion notification messages can be congested themselves (unless a separate control-plane network that is different from the data-plane network is used for sending congestion control messages).

In contrast, the flow channels can prevent such congestion from growing within the switch fabric. The flow channel mechanism can recognize when a flow is experiencing some degree of congestion, and in response can slow down or stop new packets of the same flow from entering the fabric. In turn, these new packets can be buffered in a flow channel queue on the edge port and are only allowed into the fabric when packets for the same flow leave the fabric at the destination edge port. This process can limit the total buffering requirements of this flow within the fabric to an amount that would not cause the fabric buffers to become too full.

With flow channels, the switches have a reasonably accurate state information on the amount of outstanding in-transit data within the fabric. This state information can be aggregated for all the flows on an ingress edge port. This means that the total amount of data injected by an ingress edge port can be known. Consequently, the flow channel mechanism can set a limit on the total amount of data in the fabric. When all edge ports apply this limit action, the total amount of packet data in the entire fabric can be well controlled, which in turn can prevent the entire fabric from being saturated. The flow channels can also slow the progress of an individual congested flow within the fabric without slowing down other flows. This feature can keep packets away from a congestion hot spot while preventing buffers from becoming full and ensuring free buffer space for unrelated traffic.

Figure 2:
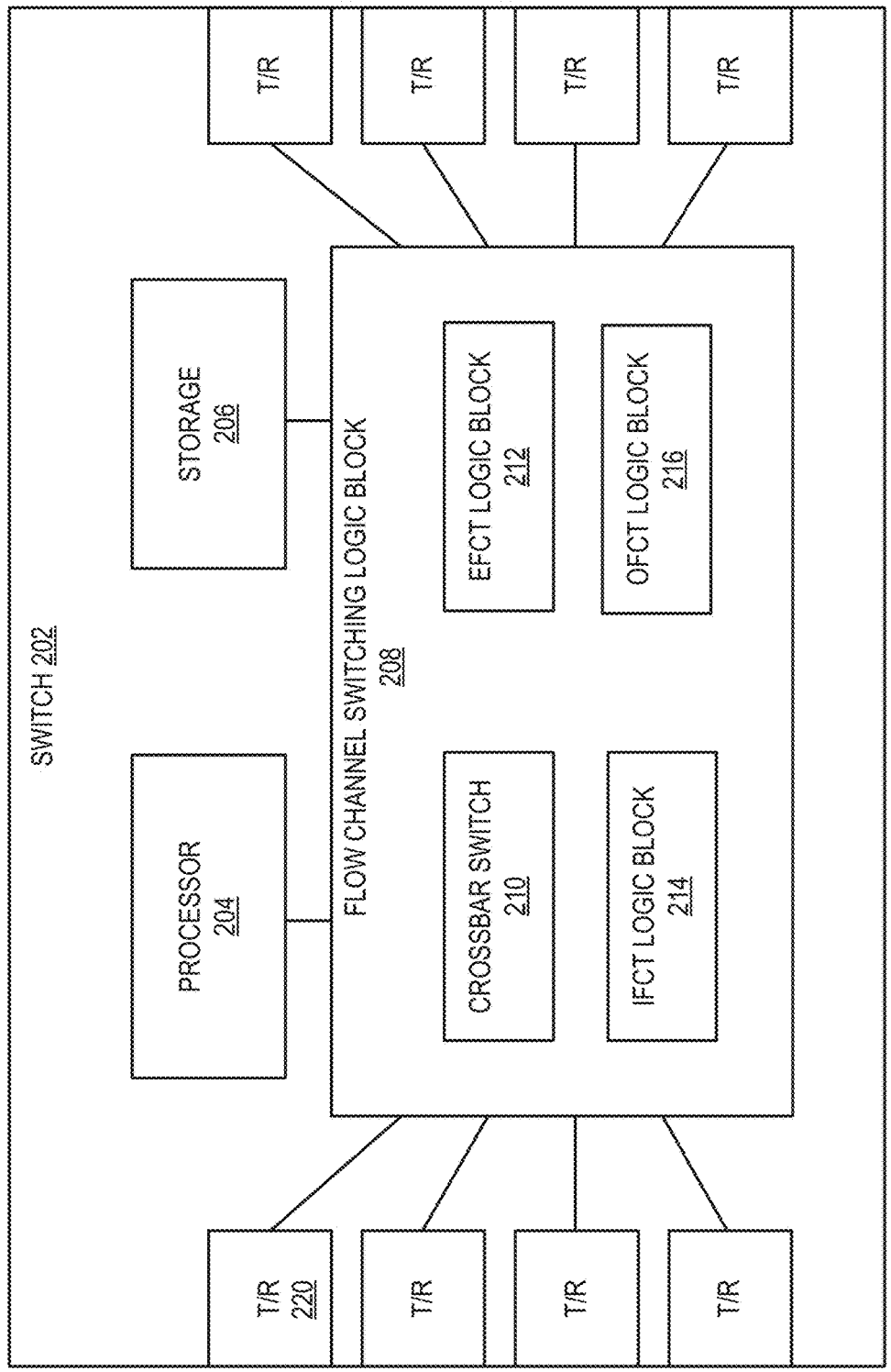
FIG. 2 illustrates an example switching system that facilitates flow channels in accordance with various embodiments.

FIG. 2 illustrates an example switch 202 (which may be an embodiment of any one or more of switches 102, 104, 106, 108, and 110) that may be used to create a switch fabric, e.g., switch fabric 100 of FIG. 1. In this example, a switch 202 can include a number of communication ports, such as port 220. Each port can include a transmitter and a receiver. Switch 202 can also include a processor 204, a storage device 206, and a flow channel switching logic block 208. Flow channel switching logic block 208 can be coupled to all the communication ports and can further include a crossbar switch 210, an EFCT logic block 212, an IFCT logic block 214, and an OFCT logic block 216.

Crossbar switch 210 includes crossbars, which can be configured to forward data packets and control packets (such as ACK packets) among the communication ports. EFCT logic block 212 can process packets received from an edge link and map the received packets to respective flows based on one or more header fields in the packets. In addition, EFCT logic block 212 can assemble FGFC Ethernet frames, which can be communicated to an end host to control the amount of data injected by individual processes or threads. IFCT logic block 214 can include the IFCT, and perform various flow control methods in response to control packets, such as endpoint-congestion-notification ACKs and fabric-link credit-based flow control ACKs. OFCT logic block 216 can include a memory unit that stores the OFCT and communicates with another switch's IFCT logic block to update a packet's flow ID when the packet is forwarded to a next-hop switch.

In one embodiment, switch 202 is an application-specific integrated circuit (ASIC) that can provide 64 network ports that can operate at either 100 Gbps or 200 Gbps for an aggregate throughput of 12.8 Tbps. Each network edge port may be able to support IEEE 802.3 Ethernet, and Optimized-IP based protocols as well as Portals, an enhanced frame format that provides support for higher rates of small messages. Ethernet frames can be bridged based on their L2 address or they can be routed based on their L3 (1Pv4//1Pv6) address. Optimized-IP frames may only have an L3 (1Pv4/1Pv6) header, and are routed. Specialized NIC support can be used for the Portals enhanced frame format, and can map directly onto the fabric format of network 100, e.g., a fabric format that provides certain control and status fields to support a multi-chip fabric when switches/switch chips, such as switches 102, 104, 106, 108, and 110 are connected and communicate with each other. As alluded to above, a congestion control mechanism based on flow channels can be used by such switches, and can also achieve high transmission rates for small packets (e.g., more than 1.2 billion packets per second per port) to accommodate the needs of HPC applications.

Switch 202 can provide system-wide Quality of Service (QoS) classes, along with the ability to control how network bandwidth is allocated to different classes of traffic, and to different classes of applications, where a single privileged application may access more than one class of traffic. Where there is contention for network bandwidth, arbiters select packets to forward based on their traffic class and the credits available to that class. Network 100 can support minimum and maximum bandwidths for each traffic class. If a class does not use its minimum bandwidth, other classes may use the unused bandwidth, but no class can get more than its maximum allocated bandwidth. The ability to manage bandwidth provides the opportunity to dedicate network resources, as well as CPUs and memory bandwidth to a particular application.

In addition to support for QoS classes, switch 202 effectuates flow channel-based congestion control, and can reduce the number of network hops, e.g., in a network having a dragonfly topology, from five network hops to three. The design of switch 202, described in greater detail below, can reduce network cost and power consumption, and may further facilitate use of innovative adaptive routing algorithms that improve application performance. A fabric created by a plurality of switches, such as a plurality of switches 202 may also be used in constructing Fat-Tree networks, for example when building a storage subsystem for integration with third-party networks and software. Further still, the use of switch 202 enables fine-grain adaptive routing while maintaining ordered packet delivery. In some embodiments, switch 202 may be configured to send the header of a packet from an input port to an output port before the full data payload arrives, thereby allowing output port load metrics to reflect future loads, thereby improving adaptive routing decisions made by switch 202.

Figure 3A:
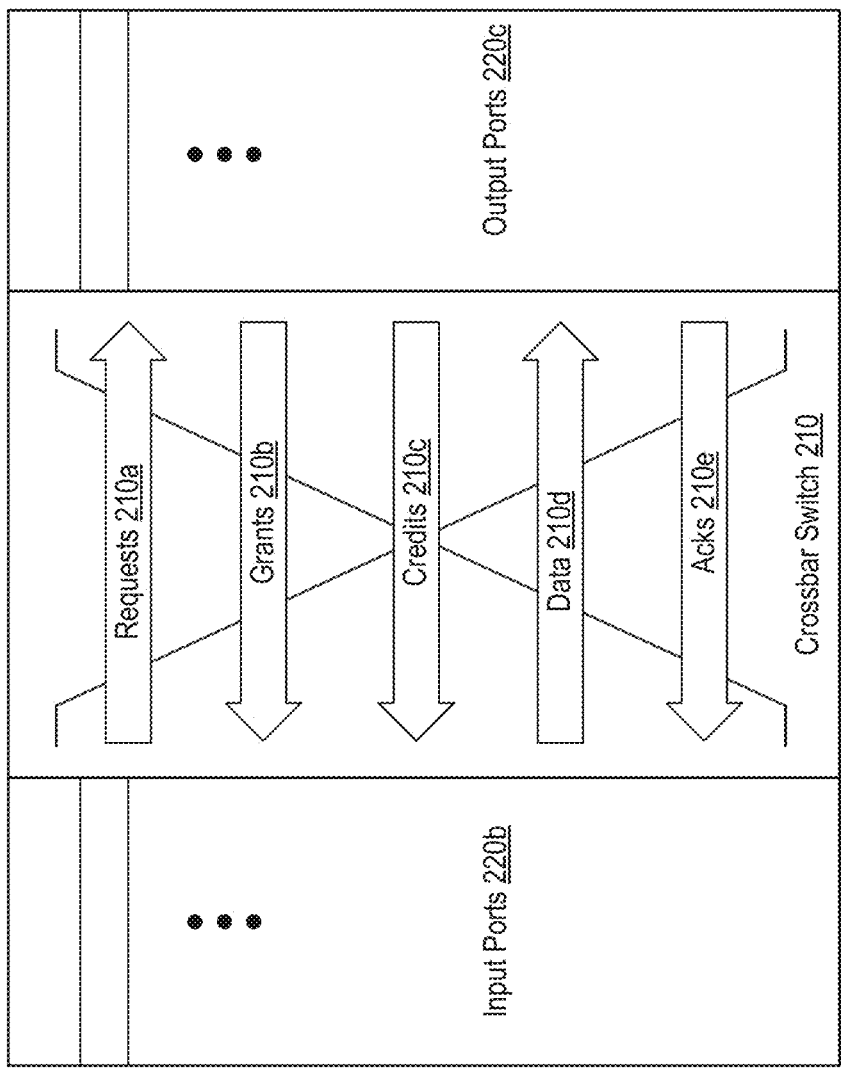
FIG. 3A illustrates crossbars implemented within an example crossbar switch in accordance with various embodiments.

Crossbar switch 210 may comprise separate, distributed crossbars routing data/data elements between input and output ports. In some embodiments, and as illustrated in FIG. 3A, there are five distributed crossbars including a request crossbar 210a, a grant crossbar 210b, credit crossbar 210c, an Ack crossbar 210e, and a data crossbar 210d between input port 220b and output port 220c.

Request crossbar 210a is used to send requests from an input to a targeted output age queue. Grant crossbar 210b is used to return a grant back to the input to satisfy a request. In particular, grant crossbar 210b returns a pointer indicating where a packet is within an input buffer. It should be noted that a grant is returned when there is space in the output for the corresponding packet. Grant crossbar 210b may also optionally return a credit for requested space in the output. It should be noted that grants are returned when there is a landing spot for a packet at the output, e.g., an output port 220c, so packets cannot be blocked (though they can face transient contention for resources).

It should be understood that in accordance with various embodiments, a credit protocol may be used to guarantee that there is a landing space for a request at the output. Accordingly, a credit crossbar 210c may be used to return credit for requested space in the output.

A data crossbar 210d is used to move granted packets from an input buffer to a targeted output buffer. An Ack crossbar 210e is used to propagate Ack packets from output ports 220c to input ports 220b. Acks are steered in accordance with a state kept in an output flow channel table.

It should be understood that data crossbar 210d moves multi-clock packets with both headers and data, while the other four crossbars (request crossbar 210a, grant crossbar 210b, credit crossbar 210c, and Ack crossbar 210e) move only single-clock packet headers. All five crossbars use the same architecture with row buses and column buses within an 8×4 matrix of 32 dual-port tiles (as described below).

Figure 3B:
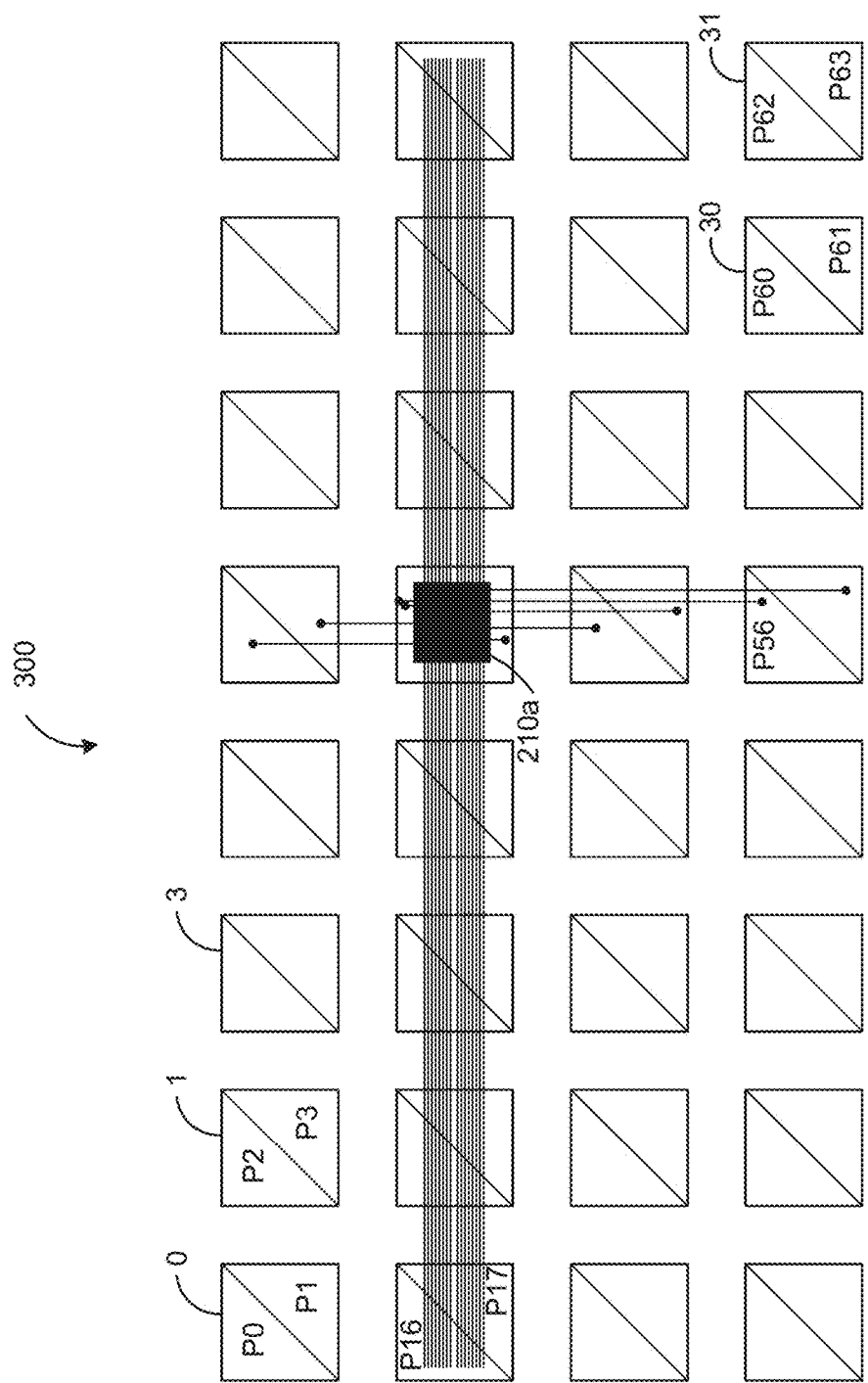
FIG. 3B illustrates an example tile matrix corresponding to ports of the example edge switching system of FIG. 2 in accordance with various embodiments.

Referring back to FIG. 2, switch 202 may have a plurality of transmit/receive ports, e.g., port 220. The plurality of ports may be structured in a tile matrix. FIG. 3B illustrates an example of such a tile matrix 300. In one embodiment, tile matrix 300 comprises 32 tiles, each comprising two ports used to implement the crossbar switching between ports, and to provide the following: a serializer/de-serializer (SERDES) interface between the core of switch 202 and external high speed serial signals for driving the signals off switch 202; a media access control (MAC) sub-layer interface to the physical coding sublayer (PCS); a PCS interface between the SERDES and the Ethernet MAC function; a link level retry (LLR) function that operates on a per packet basis and uses ordered sets to deliver initialization sequences, Acks, and Nacks; and an Ingress Transforms block for converting between different frame fabric formats. Each tile contains a crossbar switch such as crossbar switch 210 for each of the crossbars (210a-210e).

Each crossbar switch 210 has sixteen input ports 220b, one for each port in its row, and eight output ports 220c, one for each port in its column. Row buses can be driven from each source in a row to all eight crossbars in that row (one-to-all). Arbitration can be performed at the crossbar from the sixteen row buses in that row to the eight column buses in a given column. Buffering can be provided at each 16×8 crossbar for each of the row buses in order to absorb packets during times when there is contention for a column bus. In some embodiments, a non-jumbo packet is kept off a row bus unless there is room for the entire packet in the targeted crossbar input buffer. Due to area constraints, jumbo packets are allowed to go even if there is not sufficient space (crossbar input buffer only sized to sink a non-jumbo packet) with the row bus being blocked until the packet wins arbitration and space is freed as it is moved onto a column bus.

Column buses are driven from a given crossbar to each destination port within a column (all-to-all). Each destination may have another level of arbitration between the column buses from the four rows. With sixteen row buses driving eight crossbars, each feeding eight column buses, there is a 4× speedup between rows and columns. Each row has identical connections with the one-to-all row bus connections for a single row shown in row buses. Each tile will have a one (request, grant, credit) or a two (data, ack) clock delay per tile depending on the crossbar. This gives a maximum seven or fourteen clock delay to get between the leftmost and rightmost columns. Credit returns routed through credit crossbar 210c may have a one clock delay per tile, and therefore, can take a maximum of seven clocks to complete transmission.

It should be noted that each column may have identical connections with the all-to-all column bus connections for a single column, and there may be a two clock delay per tile, resulting in a six clock delay to get from the top row to the bottom row. It should also be understood that both row and column buses both use the aforementioned credit-based protocol to determine when they are able to send. In the case of row buses, the source port maintains credit counts for the input buffers of the crossbars within that row. For the data crossbar, care is needed to determine when a packet is allowed to go on a row bus. If grants targeting a particular crossbar input buffer all go through a single queue, space for the packet at the head of the queue is required before starting the packet transfer. If the grants are distributed across multiple queues, in order to prevent small packets from locking out large packets, a packet transfer does not start unless there is space for an entire max sized packet in the buffer. In this way, once a packet transfer on a row bus starts, it will not stop until the entire packet has been transferred. Accordingly, crossbar input buffers are configured to be large enough to handle the maximum packet size plus additional space to cover the worst case round trip (packet send to credit return). This will not be the case for jumbo packets. To save on buffering area, the crossbar input buffers are only deep enough to handle a non-jumbo sized MTU (1500 bytes) with a jumbo packet being allowed to block a row bus while waiting to gain access to the targeted column bus.

For column buses, each crossbar maintains credit counts for the input buffers at each destination port in that column. Unlike row buses, there is no requirement that credits be available for a maximum-sized packet before starting transfer of that packet on a column bus. Individual words of the packet will move as credits become available. Therefore, the input buffer at the destination for each column bus needs to only be big enough to cover the worst case round trip latency (packet to credit).

Figure 3C:
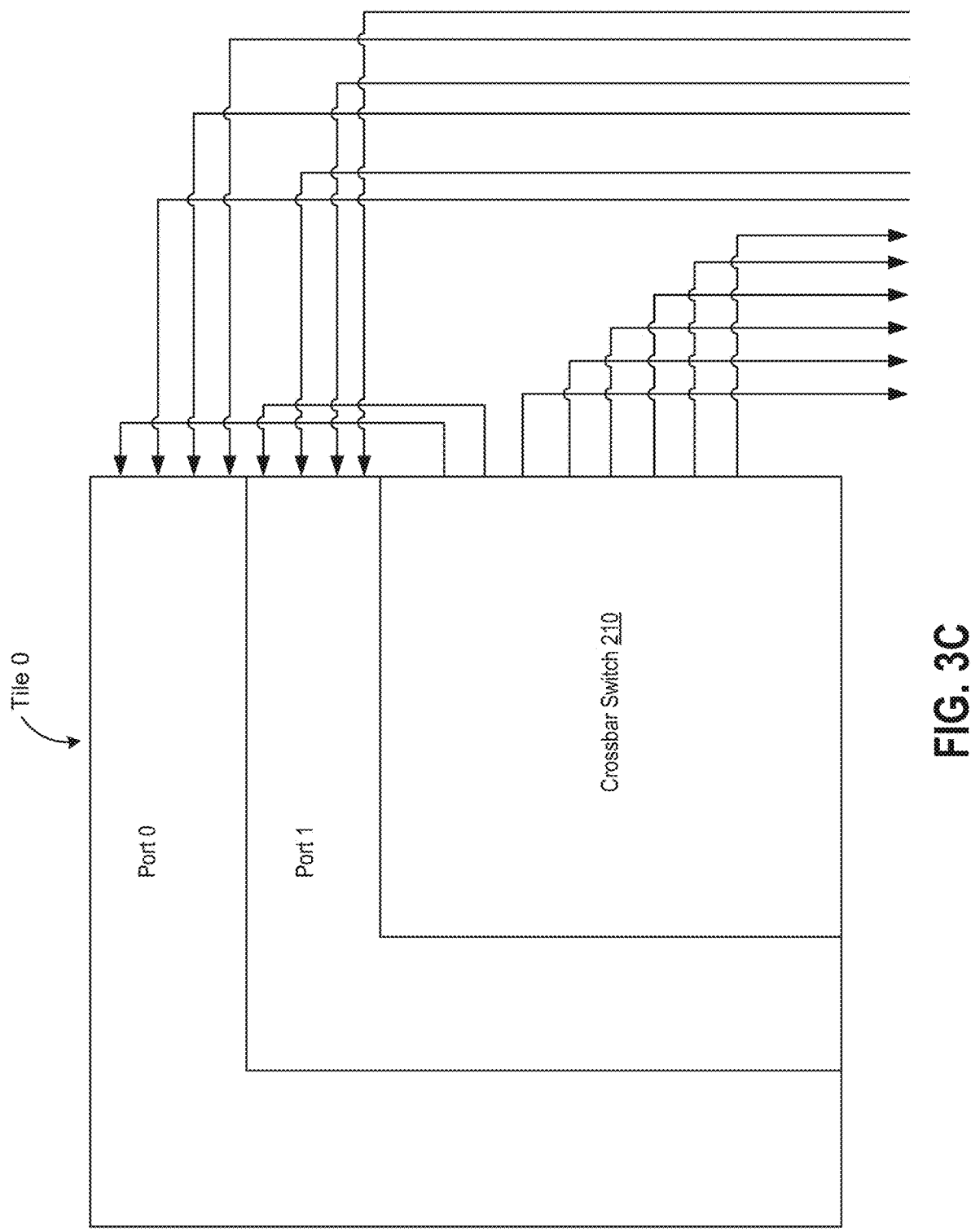
FIG. 3C illustrates an example tile making up the tile matrix of FIG. 3B in accordance with various embodiments.
Figure 3D:
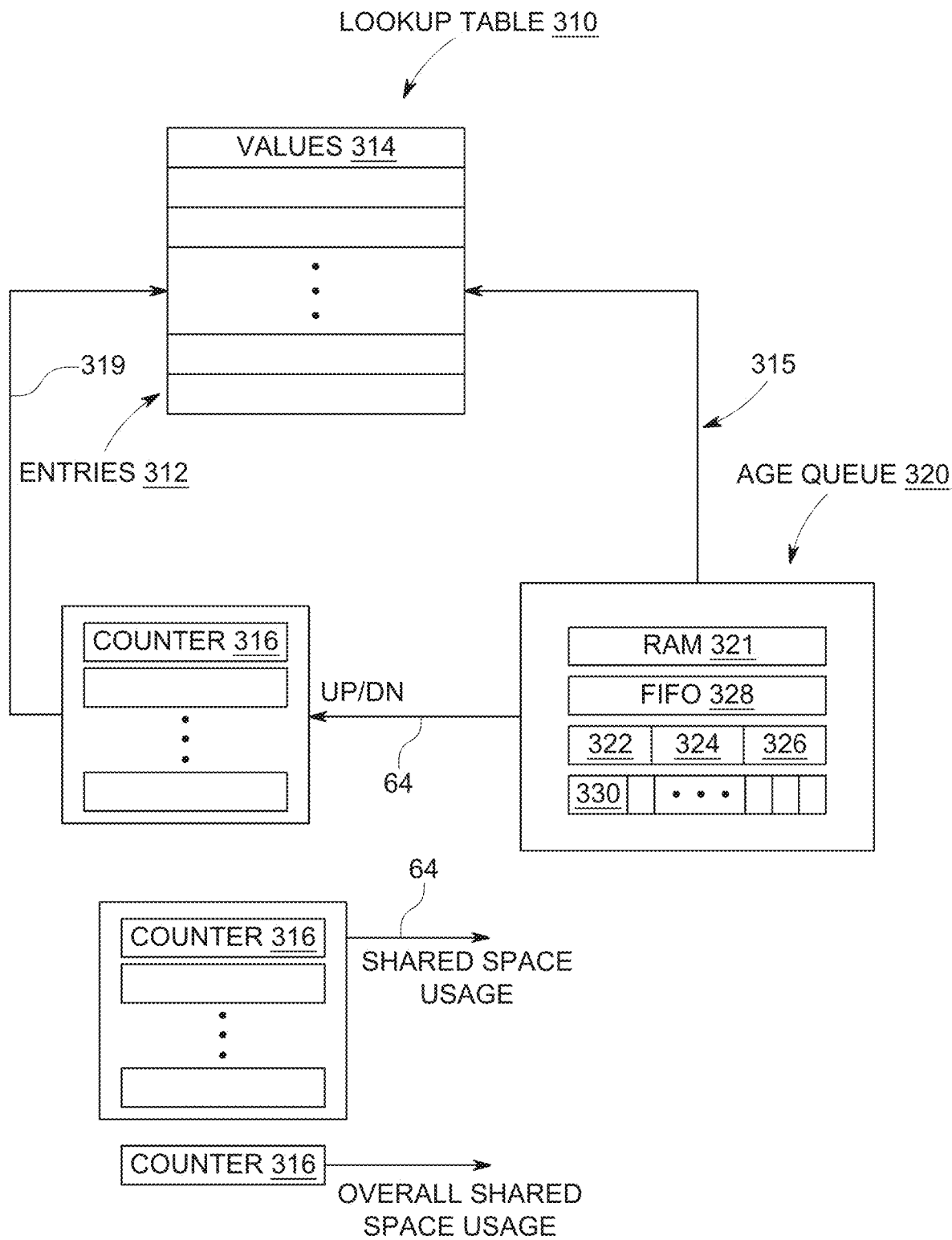
FIG. 3D illustrates an example age queue implementation in accordance with various embodiments.

FIG. 3C illustrates, in greater detail, an example implementation of two ports, e.g., ports 0 and 1, handled by tile 0, along with crossbar switch 210 comprising a set of row buses and column channels with per tile crossbars. In this way, every port has its own row bus, which communicates across its row, and every tile has the aforementioned 16×8 crossbar, which is used to do corner turns, and a set of eight column channels that feed up to the eight ports that are contained in that column. In other words, each crossbar switch 210 has sixteen row bus input buffers and eight possible destinations. For example, for data to travel from, e.g., input port 17 to output port 52, data is routed along a row bus from input port 17, traverses a local crossbar which is a 16 to 8 arbitration, and then traverses up a column channel to output port 52. In terms of the total routing through all the set of distributed crossbars, there is four times more internal bandwidth than there is external bandwidth, resulting in an ability to keep up with ingress when routing nearly any arbitrary permutation of traffic through switch 202.

A fair round-robin arbitration may be used between the sixteen sources for each destination. For the data crossbar 210d, once a source wins arbitration, it keeps control of the destination column bus until the entire packet has been sent. Each output grants a limited amount of packet payload so it is expected that contention for a given column bus should be fairly limited when larger packets are involved. Because of this, a round-robin arbitration is expected to be sufficient even with possibly large differences in packet size among requesters.

Parts of switch 202 associated with output functions generally operate on frames within the switch fabric format, and have a fabric header, even, for example, for a frame arriving and leaning on an Ethernet port within a single switch 202.

Age queue output control is responsible for accepting requests from all of the input port, e.g., input ports 220b, via request crossbar 210a, buffering the requests, arbitrating between them by traffic class using a traffic shaper, and passing the requests to the OFCT 216 to be granted via grant crossbar 210b. Age queue buffering is managed to allow each input to have enough space to flow while also allowing an input with multiple flows targeting a given output to take more space. In particular, an age queue space is managed by output control. The age queue/output control may also be responsible for managing access to the link either using credit-based flow control for a connected input buffer or pause-based flow control for non-fabric links. When a packet is released by the age queue, it is committed to being put on the link. Additionally the age queue has a path allowing packets initiated on a given port e.g., one of input ports 220b (such as maintenance or reduction packets), to arbitrate for resources on the given port.

Requests come into the output control block via a column bus from each row of matrix 30. Each column bus feeds an independent FIFO (e.g., first-in-first-out shift register or buffer) with space in the FIFO managed via credits. The FIFOs may be sized (24 deep) to cover a round-trip plus additional space to allow requests to be moved out of the crossbars 210a-210e and prevent head-of-line blocking. Prior to writing into a FIFO, a request may be checked for a valid error correcting code (ECC). If the ECC check has either a multi bit error (MBE) or a single bit error (SBE) in the destination field (i.e. it has been routed to the wrong port), the request is considered to be an invalid request, and is discarded with an error being flagged.

Least recently used (LRU) arbitration may be performed between column bus FIFOs to choose which FIFO gets forwarded to age queue management. As requests are removed from each FIFO, credits are returned to the corresponding crossbar. The row with which an incoming column bus corresponds can be dependent both on where in the matrix the tile is located, and as well as which half of the tile the block is in.

The output buffer (OBUF) makes requests to the output control block for sending reduction and maintenance packets across a link. These requests may be given the highest priority. A FIFO with 8 locations can be used to buffer these reduction/maintenance packet requests while they wait for resources. Reduction packets need not use flow channels, and maintenance packets may use loopback to create a flow so that checking for flow channel availability or flowing through the OFCT to create a grant is not needed. Reduction and maintenance packets also need not use any space in the output buffer so that no check of space is required. Rather, a check for the link partner input buffer may be performed. If allowed, a shaping queue (SQ) or virtual channel (VC) can be granted, blocking any grants from the age queue path from being granted during that cycle.

The size of the next request to be processed from the output buffer is checked against max_frame_size. If it exceeds this setting, the request is not processed and an error flag is set. This will result in the output buffer request path being blocked until a warm reset is performed. The error flag will stay set until the reset is done. The condition can also be released by increasing the setting of max_frame_size to a value above the size of the stuck output buffer request. The size used in the comparison may be the size indicated in the output buffer request (which may include a 4-byte frame checksum (FCS) used on the wire).

Each input may be given the same fixed_allocation of age queue space. This age queue space is large enough to reserve a location for each SQ/VC with enough additional space to cover a request/credit round-trip. It is up to the input to manage the space it is given across its SQs/VCs. This allocation (fixed_al/oc) is programmable via a control and status register (CSR) in each input queue (INQ), and can be, e.g., in the range of 64-96 locations. The remaining age queue space (8K−64*fixed_al/oc) may be shared space that is available to all inputs. The shared space can be managed by the output with it moving incoming requests from static to shared space as they arrive if there is room in the shared space, subject to per-input limits. When moving a request to the shared space, a credit is returned, e.g., immediately, via credit crossbar 210c, with the request marked in the age queue as being in the shared space.

When a request is granted, if it is marked as using the shared space, the shared space is credited. If it is not marked as using shared space, the request is considered to have used the static space, and a credit is returned to the input with the grant.

Due to conflicts in credit crossbar 210c, it is possible that credits may not be sent every clock period. Accordingly, a FIFO provides buffering for these transient disruptions. Space in this FIFO is required before taking a request from the request crossbar. A FIFO with a depth of 32 locations can be used to limit the chances of it ever backing up into request crossbar 210a. The shared space may have limits for how much space any input (from an input port 220b) can take. These limits can be set as a percentage of the available space. For instance, if the limit is set to 50%, if one input port is active, it has access to 50% of the buffer space, with two active input ports, each gets 37.5% ((space_used_by_1+pace_left*0.5)/2=(50%+50%*0.5)/2), with three active input ports, each gets 29.2% ((space_used_by_2+space_left*0.5)/3=(75%+25%*0.5)/3), and so on. Additionally, the total space used by the active input ports can be limited to the given total (50%, 75%, 87.5%). Thus, the space allocated to each of input port 220b may vary dynamically by how many inputs ports are currently active. The addition of an active input port causes other active inputs ports to give up their space which is then taken by the new input.

Given that division is not something easily done in hardware, the aforementioned age queue credit management function can be implemented as a lookup table 310 with 64 entries 312. The number of inputs currently active in the age queues 320 indexes 315 the lookup table 310. The values 314 in the lookup table 310 reflect the limit of the number of shared space locations any input can take along with the total space they can consume as a whole. Thus, it is up to software to program the values 314 in the lookup table 310 according to how much total shared space there is and what percentage each input port is allowed to take. As more input ports 220b become active, each input port 220b is allowed less space, and the total space available increases. Incoming requests from input ports 220b that are above this limit, or in total, exceed the total space limit, are not allowed to take more shared space. In order to track the number of active input ports 220b in the age queues, a set of 64 counters 316 (one for each input port) is used. These count up when a request is put in the age queues 320 and count down as they are taken out (i.e., granted). A count of the number of non-zero counts 319 is used as an index into the lookup table 310. In addition, in order to manage the shared space, an additional set of 64 counters 318 may be used to track the current usage of the shared space by each input. There may also be a single counter 334 that can be used to track overall shared space usage. These counters are compared against the current quotas to determine if a request is allowed to use the shared space or not. Counters 316, 318 can be, e.g., 13 bits wide, to provide sufficient coverage of the maximum value of an object that may be somewhat less than 8K.

Age queues 320 may use a single storage RAM 321 that has 8K locations in it. These locations can be dynamically allocated to 32 separate queues (one for each Set/VC) with each consisting of a linked-list of locations within the storage RAM 321. This gives each SQ/VC the ability to take more space as needed.

An age queue 320 can be created with a front pointer 322 pointing to the front of the queue, and a next pointer 324 for each location pointing the next item in the queue. The last location in the queue may be indicated by a back pointer 326. Items are taken from the front of the queue and inserted at the back of the queue. In addition to the above data structures, each queue has a FIFO 328 of entries at its head. These FIFOs 328 may ensure that a queue can sustain a request every clock with a multi-clock read access time from the request RAM 321. When a new request arrives, if the head FIFO 328 for that queue is not full, it bypasses the request RAM 321, and can be written directly into the head FIFO 328. Once requests for a given age queue are being written to the request RAM 321, subsequent requests are also written to the request RAM 321 to maintain order. The bypass path can be used again once there are no more requests for that age queue in the request RAM 321, and there is room are the head FIFO 328. When a request is read from a head FIFO 328, and there are corresponding requests queued in the request RAM 321, a dequeue is initiated. One head FIFO 328 may be read at a time, such that a single dequeue operation can be initiated each clock period. Logic may be included to handle the various race conditions between an ongoing or imminent enqueue operation and a head FIFO 328 being read.

The aforementioned ECC protection used in the age queue RAM 321 can be extended to the FIFOs 328 to protect the data path flops. The resulting structure may include 8K flops (32 queues×5 deep×SQ-bits wide). When generating the ECC, the age queue number can be included in the calculation (but not stored) as an extra check of the free list management. When the ECC is checked, the request can be considered to be in error if there is an MBE or there is an SBE in the queue number bits.

A free list RAM can be a simple FIFO which is initialized with pointers to all 8K entries whenever a reset is performed. A count can be maintained to keep track of how may entries are valid within the free list. As entries are taken, they are popped off the front of the FIFO and used. As entries are returned, they are pushed onto the back of the FIFO. Some number of entries, e.g., three entries,) at the head of the free list can be kept in flops so they are available for quick access. As with the head FIFOs for the age queues, ECC is carried through the flops to provide protection. The resulting structure may have minimal flops (57=3 deep×19-bits wide).

In order to support full performance for small packets, age queues support both an enqueue and a dequeue every clock period. The operations across the data structures for an enqueue operation are discussed below, and can differ depending on whether the queue being written is empty or not.

In some cases, a simultaneous enqueue and dequeue to a specific queue is easily handled as they are using and updating separate fields. Some specialized scenarios may arise, e.g., when a dequeue operation empties the age queue. In order to handle this scenario, a dequeue occurs first logically, followed by an enqueue operation. Accordingly, an empty flag is seen as being set when the queue is emptied by the dequeue operation, and then cleared due to the enqueue operation.

The arbitration alluded to above can be performed among requests that are permitted to be granted subject to input buffer management, output buffer management, and flow channel quotas. Arbitration can also be halted if there are no credits for the OFCT input FIFO. In some embodiments, arbitration may be performed at two levels. First, traffic shaping arbitration can be used to arbitrate between the SQs. A Deficit Round-robin arbitration can be used to arbitrate between VCs within a given SQ. Traffic shaping arbitration may use a series of token buckets to control the bandwidth of each SQ as follows: eight leaf buckets, one for each SQ; four branch buckets; and a single head bucket.

Arbitration can be divided into three groups with a first group having the highest priority, followed by a second group, which in turn is followed by a third group. For the first and second groups, arbitration may be handled in the same way among eligible SQs. A x8 round-robin arbitration can be performed between the SQs for each of the eight priority levels (eight parallel round-robin arbitrations). A fixed arbitration can be performed between priority levels. For example, group 3 arbitration has no priorities, and therefore is simply a single x8 round-robin arbitration.

For arbitration in the first group, the priority for each comes from the setting in the leaf buckets. For arbitration in the second group, priority comes from the setting in the branches of the leaf buckets. In all cases, the buckets which are checked to be eligible for that group, are also the buckets from which packet size tokens are obtained if that request wins arbitration.

Regarding age queue 320 selection, packets can be classified in order to select the SQ to which their request is forwarded. This allows traffic associated with an application to be shaped differently from traffic originating from a different application or a different traffic class. This can be useful on the edge ports which connect to a NIC in that the applications will have been configured to use a share of the resources on the node, and similarly will be granted a proportion of the network bandwidth. In accordance with one embodiment, this classification is performed by classifying the packets into a traffic class identifier (FTAG), e.g., a 4-bit code that is part of the fabric frame header, and a VLAN ID (VNI) as the packet ingresses into the fabric. The FTAG and VNI may then be used as the packet egresses the fabric to select the shaping queue.

A configuration register can be used to map FTAGs to SQs. This configuration matches the corresponding configuration in the in queue. When the output buffer requests or returns link partner credits, it converts a given FTAG to an SQ. For packet injection, the FTAG is found in R_TF_OBUF_CFG_PFG_TX_CTRL. For test generation, the FTAG is found in the test control register. When the reduction engine (RED) requests a credit return, the FTAG is found in ret_cdtJtag. When a reduction frame is removed from the output stream and link partner credits need to be returned, the FTAG is found in the frame header.

Regarding the SQs discussed herein, each age queue 320 may have 32 SQs 330 that are addressed by {SQ, VC}. The 3-bit SQ 330 can be considered a shaping function, and the VC selects one of four queues within that shaping function. For Ethernet egress (edge) ports, the VC is not needed for deadlock avoidance. Accordingly, all 32 SQs 330 can be available. In such a scenario, the SQ 330 can be selected by adding the SQ base from R_TF_OBUF_CFG_FTAG_SQ_MAP to the lower bits of the VNI. The 5-bit sum defines the {SQ,VC} to send to the age queue. It should be noted that when injecting frames on an egress port, a VNI is not available, and therefore, an SQ base can be directly used. For fabric links, the SQ 330 is taken from the upper three bits of the SQ base. The VC can be taken from the frame header when returning credits for reduction frames, or from the appropriate control CSR (R_TF_OBUF_CFG_TEST_CTRL or R_TF_OBUF_CFG_PFG_TX_CTRL) when injecting frames.

A link partner input buffer management can depend on the type of device to which the link is attached. Devices such as switch 202 may use credit-based flow control where each credit represents a cell of storage in the input buffer. Other devices may use standard Ethernet pause or priority pause-based flow control. Requests which are marked to terminate locally (lac term set) need not consider link partner input buffer flow control and need not update any associated counters. Link partner space need not be considered when the link is in the draining state.

For credit-based flow control, the link partner input buffer can be divided into eight buffer classes. Each SQ 330 can be assigned to one of these 8 buffer classes. Credits are maintained for each of the buffer classes with each credit representing 32 bytes of storage in the link partner input buffer. In order to allow credit-based flow control to work with various devices (switch, enhanced NIC), each of which may have different cell sizes, the cell size is a programmable value in units of 32 bytes.

There may be two sets of VCs with each SQ 330 assigned to one set. A maximum frame size worth of space can be reserved for each VC, and each VC set can have a different maximum frame size. The remainder of the link partner input buffer is shared dynamic space usable by any SQ/VC, subject to per VC and buffer class limits.

The size that comes with the request represents the size of the packet on the wire which includes a 4-byte FCS. This gets converted to an internal 2-byte FCS at the link partner before writing the packet to the link partner input buffer so the crediting needs to account for this difference, which can be a factor at the boundary of the cell size. For instance, for a 96 byte cell, a size that is 97 or 98 will take a single cell. In order to know when this happens, the request includes a correction term which is calculated as: req.len_correct= (byte_len % 16)==1 or 2.

Further validation of this term is required to convert it to whatever the cell size boundary may be. It will be valid when the length just exceeds the cell size. With this, the validated fen_correct term can be determined by: len_correct=(((16-byte size) % (2*32-byte cell size))==1) & req. len_correct An example of how these values work for a few cell and packet sizes is illustrated in the table below:

| | | Length Correct Calculation | | | | |
|---|---|---|---|---|---|---|
| Size (bytes) | Req len_correct | Size (16 B units) | Cell Size (32 B units) | len_correct Modulo result | len_correct | Credit Taken |
| 64 | 0 | 4 | 2 | 0 | 0 | 2 |
| 65 | 1 | 5 | 2 | 1 | 1 | 2 |
| 66 | 1 | 5 | 2 | 1 | 1 | 2 |
| 67 | 0 | 5 | 2 | 1 | 0 | 3 |
| 96 | 0 | 6 | 3 | 0 | 0 | 3 |
| 97 | 1 | 7 | 3 | 1 | 1 | 3 |
| 9B | 1 | 7 | 3 | 1 | 1 | 3 |
| 99 | 0 | 7 | 3 | 1 | 0 | 4 |
| 128 | 0 | 8 | 4 | 0 | 0 | 4 |
| 129 | 1 | 9 | 4 | 1 | I | 4 |
| 130 | 1 | 9 | 4 | 1 | 1 | 4 |
| 131 | 0 | 9 | 4 | 1 | 0 | 5 |

The size that comes with the request uses 8-byte units and the link partner input buffer cell size is a multiple of 32 bytes (32*y where y=cell size from CSR). First, the 8-byte size is converted to a 16-byte size (ROUNDUP((8-byte size)/2)). Also, the cell size is converted to 16 byte units (2*y). Mathematically, the number of cells a request will use can be calculated by: ROUNDDN(((16-byte size)+2*y−1−len_correct)/(2*y))=# of cells While a divide operation is possible in hardware, due to timing reasons, a divide operation cannot be done in the critical path of the arbitration. Instead, an alternate credit management is used. That is, credits are maintained in units of 32 bytes. When a request wins arbitration, the number of credits taken is adjusted by the maximum error term (2*y−1) using the calculation: ROUNDDN(((16-byte size)+2*y−1)/2)=Maximum 32 byte credits needed. Because this calculation overestimates the credit required for the packet, on the following clock, a modulo operation (X=(16-byte size) MOD 2*y, y=32-byte cell size from CSR) van be performed to determine what the actual remainder is. This value along with the len_correct term are used to adjust the credit counter. The formula used to create the adjustment value (adf_val) for X is: If (X==0) adj_val=y−1 else if (X==1 and fen_correct) adj_val=y else adj_val=ROUNDDN((X−1)/2)

The table below illustrates a request credit example for 96 byte cells showing the values used across several packet lengths for the 96 byte cells of the switch input buffer (y=3).

| Packet Size (bytes) | Packet Size (16-byte units) | Credit Taken | Modulo Result | len_correct | adj_val | Corrected Credit Taken |
|---|---|---|---|---|---|---|
| 48 | 3 | 4 | 3 | 0 | 1 | 3 |
| 64 | 4 | 4 | 4 | 0 | 1 | 3 |
| 80 | 5 | 5 | 5 | 0 | 2 | 3 |
| 96 | 6 | 5 | 0 | 0 | 2 | 3 |
| 97 | 7 | 6 | 1 | 1 | 3 | 3 |
| 98 | 7 | 6 | 1 | 1 | 3 | 3 |
| 99 | 7 | 6 | 1 | 0 | 0 | 6 |
| 128 | 8 | 6 | 2 | 0 | 0 | 6 |

If a request is filtered before being forwarded to the link partner input buffer, the output buffer logic returns the SQ and VC so they can be used to return the credits to the appropriate credit counters. No size is required since the packet size is always the same, the length of a reduction frame (69-byte or 16-byte size=5).

The local (master) side of the link maintains a count of the number of packets sent from each VC across both sets (8 total), a count of amount of packet (in 3 2-byte quantities) sent to each VC (4), and a count of the amount of packet (in 32-byte quantities) sent for each buffer class (8). The link partner (slave) side of the link maintains the same set of counts with them being sent over the link periodically. The difference between the master and slave counts is a count of the number of packets in the link partner input buffer from each VC across both sets and a count of the amount of space (in 32-byte quantities) currently occupied by each VC and each buffer class. A count is also maintained of the total amount of space used across all packets. A summary of the counters is as follows: master_vcx_cnt[4]/slave_vcx_cnt[4]—master and slave counts of the number of packets sent to each VC in set X; master_vcy_cnt[4]/slave_vcy_cnt[4]—master and slave counts of the number of packets sent to each VC in set Y; master_bc_cnt[8]/slave_bc_cnt[8]—master and slave counts of the amount of space occupied by each buffer class in units of 32-bytes; master_vc_cnt[4]/slave_vc_cnt[4]—master and slave counts of the amount of space occupied by each VC in units of 32-bytes; master-tot-cnt/slave-tot-cnt-master and slave counts of the total amount of space occupied in units of 32-bytes.

All counters are set to zero on a warm reset. They are also forced to zero when the link is in the draining state or when the DBG_RESET CSR bit to clear their state is set. The output buffer filter will steer a reduction packet to something other than the path to the link partner input buffer. In this case, a signal can be returned along with the SQ and VC of the packet. Again, the length is not required as the size of these packets is fixed. This information is used to adjust the appropriate master credit counts.

A request is allowed to participate in arbitration if either its VC count is 0 (indicating its one statically assigned slot is available) or there is space for a max sized frame in the dynamic space (subject to the targeted buffer class and VC limits). There can be a single programmable value for max frame size which is used across all VCs and SQs. The request validation for input buffer space can be addressed using credit-based flow control.

Credit-based flow control can be used to divide a dynamic space in two ways, each independent of each other: first, based on a limit of how much dynamic space each of the four VCs can take; and second, based on a limit to how much dynamic space each of the eight buffer classes can take. In both cases, the limits are set as a percentage of the available space. For a given packet, space should be made available in both its targeted VC and buffer class. For instance, if each space has its limit set to 50%, if one is active, it has access to 50% of the buffer space, with two active, each space gets 37.5% ((50+50*0.5)/2), with three active, each space gets 29.2% ((75+25*0.5)/3), and so on. Also, the total space used by those spaces that are active can be limited to the given total (50%, 75%, 87.5%). Accordingly, the space allocated to each varies dynamically by how many are currently active. When an additional one goes active it causes others that are active to give up some of their space which is then taken by the new one.

Like the division function discussed above, this function is implemented as a lookup table. For the VC space in this example, there are 16 entries with each entry specifying the space available to each VC along with the total space available across all VCs. For the buffer classes, there may be 256 entries with each entry specifying the space available to each buffer class along with the total space available across all buffer classes. Space for each is expressed in 2048-byte units. The depth of each table is sufficient to cover all combinations of active members (VCs or buffer classes), with each being able to have an independent setting for their percentages. With this, it is up to software to program the values in the table according to how much total dynamic space there is and what percentage each is allowed to take across all possible combinations. As more become active, each is allowed less space and the total available increases. Requests for spaces that are above this limit, or in total above the total limit, are not allowed to take more dynamic space.

A VC or buffer class is considered active either if it has a request in an age queue, or if it has outstanding credits for link partner input buffer space. As an example, consider there are only 4 spaces (16 entry table) with percentages set as SPACE0(50%), SPACE1(40%), SPACE2(30%), SPACE3 (10%), and a total dynamic space of 16 KB. This results in the values, in quantities of 16-bytes presented in the buffer space example table below.

Buffer Space Example

| Index | SPACE3 | SPACE2 | SPACE1 | SPACE0 | Total |
|---|---|---|---|---|---|
| 0 | N/A | N/A | N/A | N/A | N/A |
| 1 | N/A | N/A | N/A | 512 | 512 |
| 2 | N/A | N/A | 410 | N/A | 410 |
| 3 | N/A | N/A | 319 | 398 | 717 |
| 4 | N/A | 307 | N/A | N/A | 307 |
| 5 | N/A | 250 | N/A | 416 | 666 |
| 6 | N/A | 255 | 339 | N/A | 594 |
| 7 | N/A | 202 | 270 | 337 | 809 |

-continued

| Index | SPACE3 | SPACE2 | SPACE1 | SPACE0 | Total |
|---|---|---|---|---|---|
| 8 | 102 | N/A | N/A | N/A | 102 |
| 9 | 94 | N/A | N/A | 469 | 563 |
| 10 | 94 | N/A | 377 | N/A | 471 |
| 11 | 75 | N/A | 299 | 374 | 748 |
| 12 | 95 | 284 | N/A | N/A | 379 |
| 13 | 78 | 234 | N/A | 389 | 701 |
| 14 | 80 | 239 | 319 | N/A | 638 |
| 15 | 79 | 236 | 315 | 394 | 1024 |

As an example, the values in the row for index 7 are calculated as: Total %=0.5+(1-0.5)*0.4+(1-0.5-(1-0.5)* 0.4)*0.3=0.79; SPACE0=(0.5/(0.5+0.4+0.3))*0.79* 1024=337; SPACE1=(0.4/(0.5+0.4+0.3))*0.79*1024=270; SPACE2=(0.3/(0.5+0.4+0.3))*0.79*1024=202; Total=337+ 270+202=809.

As noted above, and referring back to FIG. 2, switches, such as switch 202 may be used to create a switch fabric, where the switch ports 220 may be configured to operate as either edge ports or fabric ports. As also noted above, switch 202 can support various network topologies including but not limited to, e.g., dragonfly and fat-tree topologies. Networks can be thought of as comprising one or more slices, each having the same overall topology, although slices may differ with respect to how each is populated. Nodes are connected to one or more ports on each slice. When a network has multiple slices, and a node is connected to more than one slice, the node is assumed to be connected at the same location in each slice.

Figure 4A:
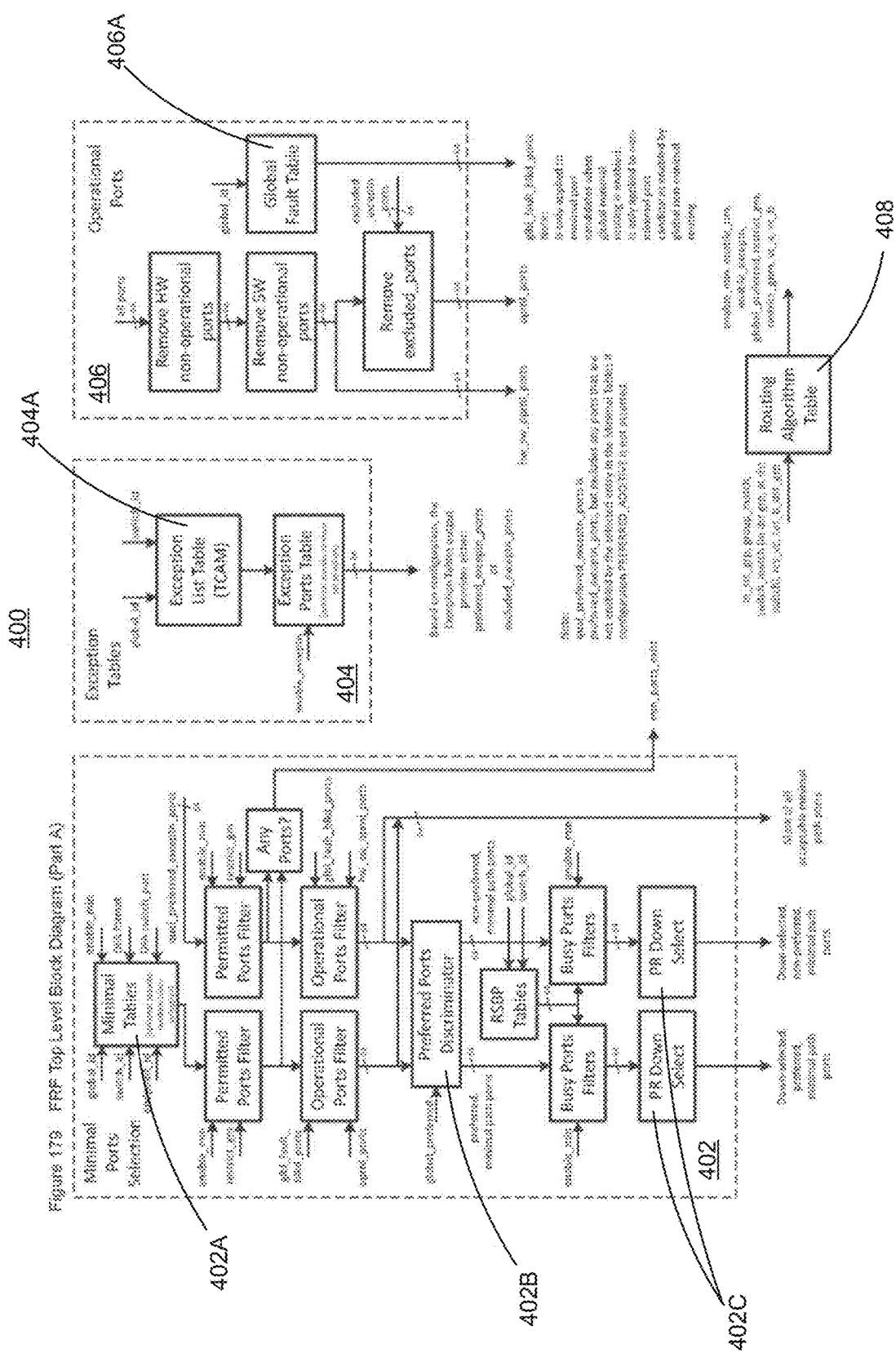
FIG. 4A and FIG. 4B are block diagrams of an example FRF component implemented at each port of the example edge switching system of FIG. 2.
Figure 4B:
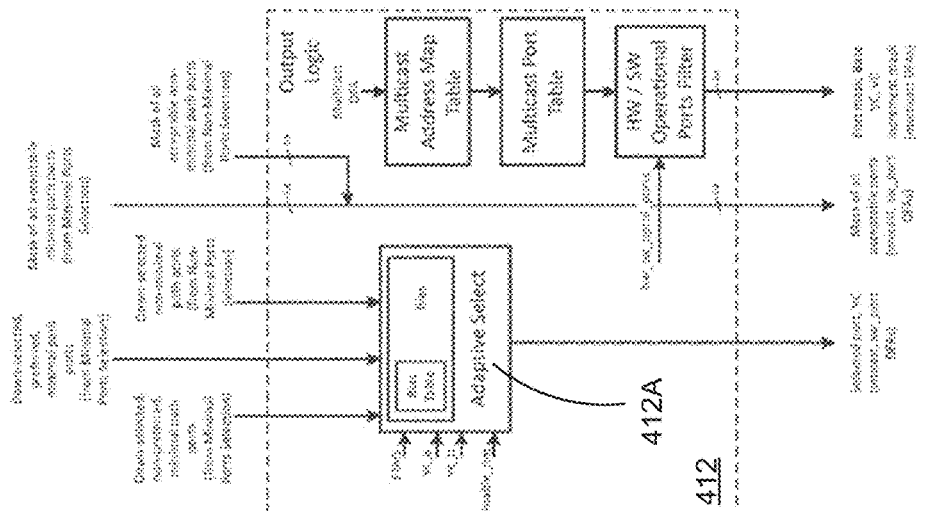
Figure 4B:
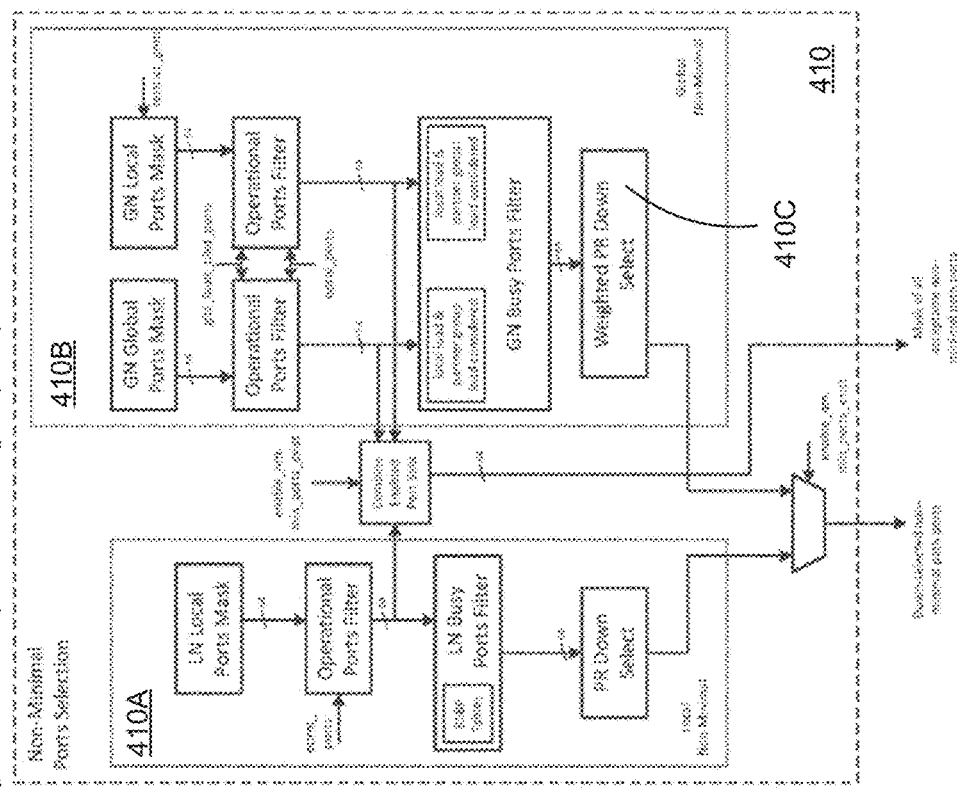

Routing in the switch fabric may be controlled by a fabric routing function (FRF) implemented in switch 202. An example FRF component 400 is illustrated in FIGS. 4A and 4B. It should be understood that a separate instance of FRF component 400 may be implemented within input logic for each port of switch 202. Routing decisions made by FRF component 400 can be applied to those frames that are not already part of an established flow. It should be noted that FRF component 400 does not necessarily know whether or not a particular frame is associated with a flow, but rather makes an independent forwarding decision for each fame presented at an input port. FRF component 400 may comprise filters, tables, circuitry, and/or logic such as selection circuitry/logic to effectuate routing of data throughout a switch fabric as described herein. As illustrated, FRF component 400 includes at least: a minimal ports selection component 402 (which includes a minimal tables component 402A), various ports filters (permitted ports filters, operational ports filters, busy ports filters); a preferred ports discrimination component 402B; pseudo-random down selection components/logic 402C; exception tables 404 (including an exception list table 404A); operational ports component 406 that includes a global fault table 406A; and a routing algorithm table 408. As illustrated in FIG. 4B, FRF component 400 may further comprise: a non-minimal ports selection component 410 that includes local non-minimal selection component 410A and global non-minimal selection component 410B); and output logic component 412, which includes an adaptive selection component or logic 412A. FRF component 400 includes other components, and are described herein.

In particular, FRF component 400 determines a preferred port to forward each frame presented at the input port based on: a received frame's destination fabric address (DFA); the frame's current routing state (where the frame is along its path, and the path(s) it took to reach its current routing state);

the switch fabric routing algorithm and configuration; and load metrics associated with the possible output ports to using busy ports filters.

FRF component 400 may include a routing algorithm table 408 that may be embodied as a software configurable table that determines valid choices based on the frame's current routing state. Valid choices are decisions such as whether a local minimal, global minimal, local non-minimal, or global non-minimal path is allowed to be chosen for the frame's next hop. The routing state includes information such as the VC the frame was received on, and whether it is in the source, the destination, or an intermediate group. The routing algorithm table 408, along with the adaptive selection function or logic 412A (described below), also determines the VC to be used for the frame's next hop.

Frame routing with unicast DFAs will be described as an example. However, it should be noted that the DFA of the routing request can either be in unicast or multicast format. The unicast format can include a 9-bit global ID field (global_id), a 5-bit switch ID field (switch_id), and a 6-bit endpoint ID field (endpoint_id). The global ID can uniquely identify a group within the network. Specifically, it identifies the final group to which the frame must be delivered. The switch ID uniquely identifies a switch within the group identified by global ID. The endpoint ID field, together with the global ID and switch ID identify the endpoint, connected to the edge of the network fabric, to which the frame is to be delivered. This field is mapped to a port or set of ports on the switch identified by global ID and switch ID.

The multicast format includes a 13-bit multicast ID field (multicast_id). This field is mapped by FRF component 400 to a set of ports on the current switch to which the frame is to be forwarded.

From this information, FRF component 400 determines an updated routing state for the frame, which is then carried within the frame. For example, to effectuate routing in a dragonfly topology, a frame's current state may be gleaned from the frame's VC (discussed above). Based on algorithmic switch fabric routing rules specified for the switch fabric (the selection of which is described below), FRF component 400 determines a particular VC to be used for the frame's next hop to avoid any deadlocks. Additional routing state information can be provided depending on where the frame is along its path, e.g., whether the frame is in its source group, in an intermediate group, or in its destination group. It should be noted that FRF component 400 performs port filtering (described in greater detail below) using permitted ports filter, operational ports filter, busy ports filters, etc. to determine if a preferred port to which a frame is to be forwarded is currently faulty, busy, absent, etc.

Switch 202 distributes load information between switches. The FRF component 400 receives the load measurement of and from its associated output port. The FRF component 400 receives summary load information from its associated input port for a neighboring switch. Each FRF component 400 exchanges load information with all other FRF instances within the same switch. FRF component 400 provides summary load information to its associated output port for delivery to a neighboring switch. Through the load distribution mechanism, each FRF component 400 learns the load measured at each output port of its switch. As well, each FRF learns the summary load information for all neighboring switches.

It should be noted that FRF component 400 can support frame multicasting. When a multicast DFA is received, FRF component 400 determines a set of ports to which the frame associated with the multicast DFA should be forwarded. The set of ports can be determined by accessing a lookup table that maps software-configured multicast fabric addresses to output ports. This can help avoid problems associated with duplicate multicast frame copies.

As noted, multicast traffic is statically routed based on the configuration of the multicast forwarding tables. More specifically, the multicast table identifies the ports of the current switch to which copies of the multicast packet should be forwarded. This implicitly determines the number of copies generated at that point, as well, because for each multicast packet received at a port, only one copy is forwarded to each other port identified by the multicast table as requiring a copy. To prevent duplicate delivery of multicast packets, multicast forwarding filters conditionally prune copies of the multicast packet depending on source group at which the multicast packet originated.

Figure 5:
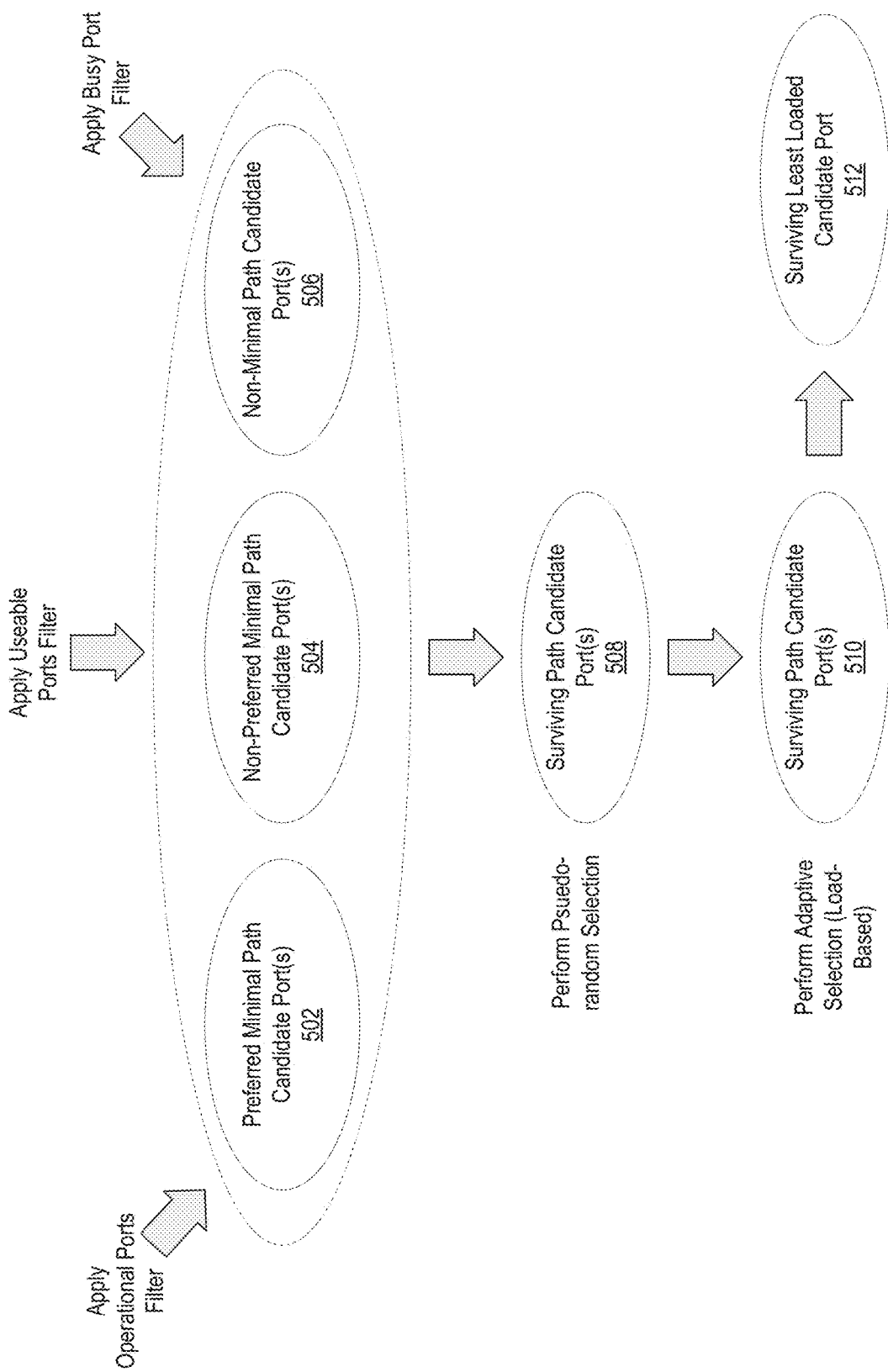
FIG. 5 illustrates an example of route selection in accordance with various embodiments.

FIG. 5 illustrates an example route selection process involving down-selection of candidate ports and adaptive route selection based on load. FRF component 400 considers three categories of candidate ports to which a frame may be forwarded: preferred minimal path candidate ports 502; non-preferred minimal path candidate ports 504; and non-minimal path candidate ports 506. Depending on where a frame may be along its path, non-minimal path candidate ports are either global non-minimal path candidate ports or local non-minimal path candidate ports.

Filtering may be applied to the three categories of candidate ports, e.g., operational port filtering, useable port filtering, and busy port filtering. Port filtering as applied herein can be used to reduce the set of valid ports considered as path candidate ports by identifying and removing absent and/or faulty ports from consideration.

Operational port filtering (or non-operational port filtering) can refer to the removal of non-operational ports from sets of ports being considered as candidates for routing, e.g., preferred minimal path candidate ports 502, non-preferred minimal path candidate ports 504, and non-minimal path candidate ports 506. That is, switch 202 may identify certain ports as being non-operational. These non-operational ports may be reported in a non-operational port mask. It should be noted that in some embodiments, software can force additional ports of switch 202 to be considered as non-operational using a non-operational port CSR, e.g., when a port(s) is to become disconnected as a result of planned maintenance.

Usable (or unusable) port filtering may involve filtering out candidate ports for consideration that would normally have been acceptable, but due to faults within network 100, for example, the candidate ports have become unacceptable/unusable for reaching one or more destination switches, destination groups (of switches), etc., but remain acceptable or usable for reaching one or more other destination switches. In some embodiments, global fault table 406A can be used to block global minimal path port candidates and global non-minimal path port candidates depending on a destination group of the frame being routed. For example, candidate ports that lead to an intermediate group (of switches) without connectivity to a particular destination group (of switches) can be excluded from consideration when routing frames to that destination group, although the same candidate ports may not necessarily be blocked out for other destination groups. The global fault table 406A can be determined or indexed by the global_id field of the frame's DFA.

In some embodiments, an exception list maintained by exception list table 404A may be used to conditionally exclude port candidates depending on the destination group or switch to which the frame is being routed. It should be noted that that exception list table 440A may be used to identify preferred global minimum path ports. Accordingly, use of the exception list table 404A to exclude port candidates is done when it is not being used to identify preferred global minimum path ports.

It should be noted that knowledge regarding which ports are busy in a neighboring switch can be used to determine if the ports that connect to a neighboring switch are poor candidates to receive a forwarded frame based on whether the neighboring switch will subsequently need to forward the frame to a port that is already busy. For example, when considering candidate ports for use in global minimal routing, the ports connected to a neighboring switch are poor candidates if the neighboring switch's global ports that connect to the frame's destination group are all busy, global ports referring to ports that connect to other switches belonging to a different group of switches. Similarly, when in the destination group and considering candidate ports for use in local nonminimal routing, the ports connected to a neighboring switch are poor candidates if the neighboring switch's local ports that connect to the frame's destination switch are all busy.

Accordingly, busy port filtering can be performed by FRF component 400 by using busy port masks to remove heavily loaded ports from being considered candidate ports. It should be noted that in some embodiments, heavily loaded ports are removed from consideration when other candidate ports that are not heavily loaded exist. Otherwise, when non-heavily loaded ports do not exist, busy port filtering will not remove the heavily loaded ports from consideration. FRF component 400 maintains four masks of busy ports, that is, ports whose load exceeds a software-defined threshold: local switch busy port mask; global non-minimal busy global port mask; global non-minimal busy local port mask; remote switch busy port mask. Information from these masks is communicated between switches to populate the remote switch.

A local switch busy port mask can be applied to minimal path candidate ports as well as to local non-minimal path candidate ports. The FRF generates a 64-bit Is_busy_port_mask by comparing each port's local_load to a software defined threshold. Ports with loads higher than this threshold are marked as busy in this mask.

A global non-minimal busy port global mask can be applied to global ports of global non-minimal path candidate ports. The FRF generates a 64-bit gnmbgp_mask by comparing each port's gnmgp_load to a software defined threshold. Ports with loads higher than this threshold are marked as busy in this mask.

A global non-minimal busy local port mask can be applied to local ports of global non-minimal path candidate ports. The FRF generates a 64-bit gnmblp_mask by comparing each port's gnmlp_load to a software defined threshold. Ports with loads higher than this threshold are marked as busy in this mask.

A destination group dependent busy-port mask, obtained from a remote switch busy global port table can be applied to global minimal path candidate ports. Correspondingly, when a frame is being routed in its destination group, a destination switch-dependent busy-port mask, obtained from a remote switch busy local port table can be applied to local non-minimal path candidate ports.

Upon applying the aforementioned filtering or down-selection stage, a set of surviving path candidate ports 508 can result. That is, a reduced number of candidate ports can be determined after removing non-operational and unusable port candidates, heavily loaded, a set of path candidate ports remains. In some embodiments, a pseudo-random selection process is used to further reduce the number of surviving path candidate ports 508 to a determined threshold number of ports associated with each category of candidate ports (preferred minimal path candidate ports, non-preferred minimal path candidate ports, and non-minimal path candidate ports). In some embodiments, that threshold number of candidate ports may be four candidate ports per category. If the minimum threshold number of candidate ports is not met, no candidate ports from that category are removed from consideration.

In some embodiments, this pseudo-random selection (or down selection) of candidate ports can be weighted. That is, weights, e.g., weights between 0 and 15, can be assigned to each port per the CSR configuration. This weighting can be used to influence the probability with which individual candidate ports are chosen such that higher-weighted ports have a great chance of being chosen. For example, a weight of 15 results in a port having 15 times greater likelihood of being selected in the pseudo-random selection process. In some embodiments, candidate ports may be filtered into four groups (GW1, GW2, GW4, GW8) based on their assigned weights, where a candidate port can belong to multiple groups depending on the assigned weight (e.g., a candidate port with weight 1 belongs only a one weight group, while a candidate port with weight 5 belongs to two groups (GW1 and GW4, i.e., 1+4=5), and a candidate port with weight 15 belongs to all four groups (Gw1, GW2, GW4, GW8, i.e., 1+2+4+8=15). The number of candidate ports in each group can be determined (nW1, nW2, nW4, nW8), and pseudo-random selection is applied to each group to select one candidate port from each group (cW1, cW2, cW4, cW8). The weight of each group can be computed, along with their total weight: wW1=nW1; wW2=2*nW2; wW4=4*nW4; wW8=8*nws; wtotal=wW1+wW2+wW4+wW8. A fifth pseudo-random selection can be performed to choose a number j in the range O . . . Wtotal−1. One of the candidates, cW1, cW2, cW4, cW8 is chosen as the down selected candidate port based on the value of j as follows: If j<wW1, choose cW1; else If j<wW1+wW2, choose cW2; else If j<wW1+wW2+wW4, choose cW4; else choose cW8.

The number of ports in each group can vary from request to request due to changing operational status and load, and may also be dependent on the configuration of the global fault table 406A. It may also vary depending on the type of port at which the routing request is being performed, i.e., edge port versus local port, for example. On the assumption that operational status and load do not change too quickly, and that the configuration of global fault table 406A should not vary greatly for different global_id values, each pseudo-random generator's previously generated value is simply used as the offset for biasing its next value. If an offset value is out of range (>n−1), it is brought within range through truncation of upper bits. mgnm=4 candidate ports are produced by the pseudo-random down selection process. Each candidate can be produced through a separate copy of the weighted pseudo-random down selection logic 410C, described above.

It should be noted that the same candidate port may be chosen by more than one of the instances/iterations of the weighted pseudo-random down selection logic 410C, in effect reducing the number of candidate ports that are chosen. The probability of the same candidate port being chosen by more than one of the mgnm=4 global non-minimal, weighted pseudo-random selectors decreases with increasing numbers of candidate ports to choose from. In the context of a dragonfly topology, for example, and a network with full global bandwidth, at an edge port in the source group there are potentially about 48 possible global non-minimal candidate ports: 16 global ports and 32 local ports. If a local hop has been taken, the next hop is a global hop, thereby reducing the number of candidate ports to about 16. However, if the network is tapered such that it only supports one quarter of full global bandwidth, there may only be 4 global candidates to choose from after a local hop has been taken. The probability of selecting four unique global non-minimal candidate ports shows the probability of four unique candidate ports being chosen for varying numbers of possible candidates to choose from. The probability of selecting n unique global non-minimal candidate ports shows the probability of varying numbers of the four selected candidates being unique when there are only 16, 8, or 4 candidate ports to choose from.

FRF component 400 can use received remote switch busy port masks to generate the aforementioned Remote Switch Busy Global Port Table of busy port masks that identify ports connected to neighboring switches that should be avoided as global minimal path candidates based on the destination group to which the frame is being routed. Similarly, the received remote switch busy port masks can also be used to generate the aforementioned remote switch busy local port table of busy port masks that identify ports connected to neighboring switches that should be avoided as local non-minimal path candidates, when routing in the destination group, based on the destination switch to which the frame is being routed.

The rs_busy_port_masks are used in assessing the suitability of neighboring switches (whether ports of neighboring switches are busy or quiet) for reaching specific destination groups via global minimal paths and specific destination switches via local nonminimal paths or via local minimal paths. Each FRF instance corresponding to a local port or a global port can be configured to generate a 64-bit rs_busy_port_mask. The generated mask is delivered to the partner switch connected to that port. Similarly, the partner switch can also generate and return an rs_busy_port_mask.

Each FRF instance communicates the rs_busy_port_mask, that it received from its partner switch, to all other FRF instances in the switch using the port status ring (which connects the tiles of a switch and communicates status and load information amongst the ports on the switch). Each FRF instance captures all rs_busy_port_masks such that all FRF instances learn the remote busy port status being provided by all neighboring switches. Each FRF instance uses the rs_busy_port_masks that it receives to generate the busy port tables described in the Remote Switch Busy Global Port (RSBGP) Table and Remote Switch Busy Local Port (RSBLP) Table.

Generation of the rs_busy_port_mask is a two-step process. The first step is to compare each port's local_load to a software configurable generating an intermediate mask of all ports that are individually busy. This intermediate mask is formed as the status of each port is received from the port status ring interface. Ports that are classified as non-operational are also recorded as busy in the intermediate mask. The second step takes link bundling into account such that a port is only marked as busy in the rs_busy_port_mask if it and all other ports, that are part of the same bundle, are marked as busy in the intermediate mask. Either all ports that are members of the same bundle are marked as busy in the rs_busy_port_mask, or none are. Global ports that are part of the same bundle all connect to the same remote group. Local ports that are part of the same bundle all connect to the same remote switch within the current group.

As the rs_busy_port_masks are used to determine whether the switch that generated the mask is a good candidate for routing a frame to another group or to another switch in the current group, bundling is used to provide a consistent view of the generating switch's suitability when the busy status across its links, that connect to the destination group or to the destination switch in the current group, is inconsistent. The rationale for the treatment of bundling described here is that the switch generating the rs_busy_port_mask remains a candidate for reaching the destination group, or the destination switch in the current group as long as it has at least one link to the destination group or switch that is not busy; adaptive routing at the switch that generated the rs_busy_port_mask should direct the frame to the non-busy link.

Ports must be included in either the bundled ports mask CSR or the unbundled ports mask CSR (both of which are part of the static description of the wiring) in order for them to be marked as busy in the rs_busy port_mask. The second step is performed as each frame is received from the port status ring. The bundled port masks are scanned to identify the bundles and the ports that they contain. In addition, the unbundled port mask is consulted to identify any other ports, that are not members of a bundle, but whose busy status should also be included in the generated rs_busy_port_mask.

A different software-defined threshold is used in computing the rs_busy_port_mask because of the larger latency involved in communicating and processing the rs_busy_port_mask and in delivering a frame subject to this mask to the remote switch that generated the mask. Because of the larger latency, it may be useful to require a port to be more loaded before it is considered to be so busy that it is not a good candidate for receiving additional frames from a remote switch. A busy remote port should be sufficiently loaded such that it remains loaded throughout the time it would take to receive a frame that has been subject to the mask.

The aforementioned RSBGP table stores busy port masks indexed by destination group (global_id). Again, the RSBGP table is used in the evaluation of global minimal paths consisting of a hop to a neighboring switch which has a global port connected to the destination group to filter out ports of the current switch which are poor choices for use in reaching the destination group because the corresponding global port or ports, of the neighboring switch reached by the filtered-out ports of the current switch, are too heavily loaded.

The RSBLP table stores busy port masks indexed by destination switch (switch_id), and again, can be used in the evaluation of local non-minimal paths consisting of a local hop to a neighboring switch followed by another local hop to the destination switch. For topologies, such as fat-tree, where a local minimal path can consist of a local hop to a neighboring switch followed by another local hop to the destination switch, the RSBLP Table can also be used in the evaluation of local minimal paths. The RSBLP table is used to filter out ports on the current switch which are poor choices for use in indirectly reaching the destination switch because the neighboring switch's port or ports that connect to the destination switch are too heavily loaded.

It should be noted that the RSBGP table and the RSBLP table are never both accessed for the same routing request. The former is accessed when routing a frame that is not in the destination group, and the latter is accessed only when routing a frame that is in the destination group. Therefore, both are implemented within the same memory, termed the Remote Switch Busy Port Provided that there is at least one valid candidate port, the various busy port filters (Busy Ports Filter, Local Non-Minimal (LN) Busy Port Filter, Global Non-Minimal (GN) Busy Port Filter) may not be allowed to collectively block all candidate ports. If there are viable candidate port choices, they are allowed, despite being "poor" choices, if there are no better choices. Otherwise, an empty route response will be generated for the routing request when routes are actually available.

To prevent an incorrect empty route response from being generated, the first stage of the preferred and non-preferred minimal path busy port filters (FIG. 4A) and the first stage of the local non-minimal path busy port filter (FIG. 4B) are all disabled if the following conditions are all true: No candidates survive the first stage of the preferred minimal path busy port filter (Busy Ports Filter); No candidates survive the first stage of the non-preferred minimal path busy port filter (Busy Ports Filter); No candidates survive the first stage of the local non-minimal busy port filter (Local Non-Minimal (LN) Busy Port Filter); and No candidates survive the global non-minimal busy port filter (Global NonMinimal (GN) Busy Port Filter).

It should be noted that there will be no minimal path candidate ports if minimal routing is disabled (Permitted Ports Filter). There will be local non-minimal path candidate ports only if local non-minimal routing is enabled (Candidate Local Non-Minimal Path Ports). There will be global non-minimal path candidates only if global non-minimal routing is enabled (Candidate Global Non-Minimal Path Ports). Local and global non-minimal routing are generally not both enabled simultaneously. When the first stage of the preferred and non-preferred minimal path busy port filters and the local non-minimal busy port filter are disabled due to the conditions described above, the only candidate ports that will be seen at an adaptive selection stage (described below) will be poor candidates because they will all be ports that lead to other switches whose ports (that connect to the destination group or to the destination switch) are heavily loaded. This is because these are the only candidate ports that were being blocked by the filters that are being disabled and, without these filters being disabled, there are no other candidates.

The adaptive selection stage will choose between these remaining/surviving candidate ports, which are all poor, based on their biased local loads (Local Load and Load Value Selection), although their local loads will not necessarily reflect the reason why they are poor. Their poor character can be the result of high downstream load on certain ports of the other switches reached by these candidate ports. It is because the adaptive selection stage may not be able to see how poor these candidates are that the coordination between the different busy port filters, described herein may be used. If each busy port filter decides independently whether or not to disable its RSBGP Table and RSBLP Table-based filters, situations such as the following could occur. The non-preferred minimal path busy port filter might produce one or more candidates, which are not poor, without any of its filter stages disabled. The preferred minimal path busy port filter might only be able to produce one or more candidate ports by disabling both of its filter stages. Thus, all of the candidate ports it is able to produce are poor. At the adaptive select stage, the down-selected, not poor, non-preferred minimal path candidate ports, are compared against the down-selected, poor, preferred minimal path candidate ports. However, the adaptive selection stage lacks visibility into how poor the preferred minimal path candidates are, so it may select a poor preferred minimal path candidate over a not poor non-preferred minimal path candidate.

An alternative to the busy port filter coordination mechanism described herein, would be for all of the busy port filters to act independently, but for the minimal path and the local non-minimal path busy port filters to each forward a signal through to the adaptive select stage to indicate if their respective candidate ports are poor choices due to busy ports at downstream switches. If they are, the adaptive selection function may de-prioritize their candidate ports in favor of other ports. The result would be the same as is achieved by the coordination, described herein, between the various busy port filters.

As illustrated in FIG. 5, load-based adaptive selection can be performed on the surviving path candidate ports 510 that remain after the pseudo-random selection process is performed by FRF component 400. The adaptive selection stage will result in a single, least loaded candidate port 512 to which a frame can be routed, where the current load present on the candidate ports surviving pseudo-random down selection (surviving path candidate ports 508) are compared to determine the least loaded candidate port among this remaining set of candidate ports.

In some embodiments, preferred minimal path candidate ports are preferentially selected over non-preferred minimal path candidate ports, and minimal path candidate ports are to be preferentially selected over non-minimal path candidate ports. To accomplish this preferential selection, a bias value can be added to each candidate port's load before the adaptive selection comparison is performed. The bias value used can be configured using CSRs, and can vary depending on the type of path to which it is being applied (i.e., non-preferred minimal, preferred minimal, and non-minimal), the traffic class of the frame being routed, and where the frame is along its path. For example, frames belonging to a low-latency traffic class can be more strongly biased towards minimal paths versus frames in other traffic classes to have a greater likelihood of achieving/comporting with low-latency requirements or needs. Frames may also be increasingly biased towards minimal path routes the closer the frames are to their destination.

It should be understood that each biased load value (9-bit wide) is obtained by adding an unsigned (8-bit wide) bias value to an unsigned (8-bit wide) port load value. To determine the bias value and the type of load value that applies to each candidate, the preceding minimal port selection and non-minimal port selection stages separate the candidate ports into three different categories. Bias value are obtained from a software configurable table, i.e., bias table 414A (described in greater detail below). The type of load value to be used for each port is determined, and result in minimal preferred candidate ports (which include edge port candidates, if any exist), non-minimal candidate ports (either global or local non-minimal candidates depending on the configuration of routing algorithm table 408), where a set of global non-minimal candidate ports can include both global and local ports, while a set of local non-minimal candidate ports include only local ports. Depending on the point where the routing request is being performed, along the path between the source and destination edge ports, a category might not contain any candidates. For example, when at the destination switch, with typical configuration only the minimal non-preferred category will contain any candidates for unicast traffic.

To enable the bias to change as a frame progresses toward its destination as well as to allow the bias to be dependent on the frame's FTag, the bias table 414A's entries are indexed by both the frame's point along its path (e.g. at the source group, at an intermediate group, at the destination group) and by its FTag bias class. The FTag bias class is a value derived from the frame's FTag value. Each entry in the bias table provides three bias values: one used for minimal preferred candidate ports, one used for non-preferred minimal candidate ports, and one used for non-minimal candidate ports.

In some embodiments, biased load override is also implemented, where if a candidate category's bias value, obtained from the bias table 414A, is the maximum possible bias value, that category is handled differently than it would be handled for other bias values. In particular, ports, to which the maximum bias value is being applied, are never chosen, regardless of their load, unless there are no other choices available. However, if the maximum possible bias value is being applied to all available ports, then the available port with the lowest biased load is chosen; the different handling, associated with the maximum possible bias value, is overridden in this case.

Figure 6:
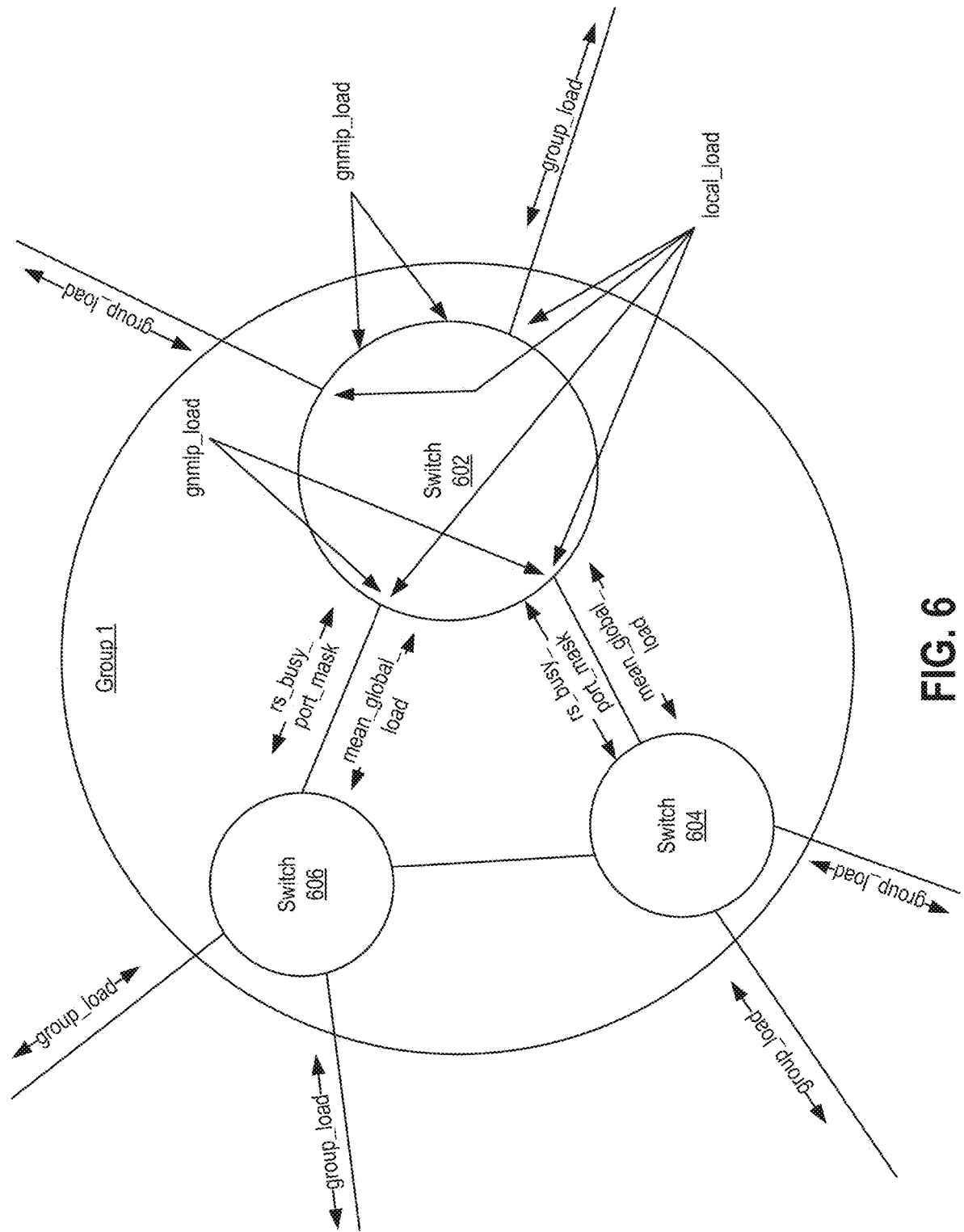
FIG. 6 illustrates an example of local and global load value updating and use in accordance with various embodiments.

In particular, load values represent the busyness of switch 202's ports and are used in evaluating the load-based port masks and in comparing candidate ports during the adaptive route selection process. Load-based port masks are used in the busy port filters to remove ports that are poor candidates, based on current load, from the set of candidates being considered. There are a number of different types of load values used within the switch and some are communicated to neighboring switch devices. These load values are described in the following sections, noting that FIG. 6 illustrates how the load values are measured, communicated and used.

Several load metrics are computed and used in determining which port to route a frame when there is more than one port to which the frame can be routed. The load metrics are also used in generating busy-port masks, which as described above, are used to remove heavily loaded ports from consideration.

There are five load metrics described herein: local load; group load; global non-minimal global port load; mean global load; and global non-minimal local port load.

Regarding local load, the load of each of a switch's output ports (e.g., output ports 220c of switch 202) is continuously being evaluated and provided to the corresponding FRF instance as the 8-bit value local_load. Larger values represent higher load. The current load present at each output port is measured by the output control age queue block. The output port load is provided by each age queue instance to the FRF instance (of FRF component 400) that is associated with the input side of the same port. The load value provided to the FRF is an 8-bit value termed the local_load. The age queue determines the local load based on a combination of the amount of traffic enqueued, waiting to go out that port and the amount of traffic enqueued at the opposite side of the link in the link-partner Switch device's input buffer. The calculation and configuration of local_load is performed later. Each FRF instance distributes the local_load value it receives from its associated age queue instance to all other FRF instances. In this way, each FRF instance learns the current local_load of every output port.

When the port loads of candidate ports are being compared to determine the best port to route a frame to, it is the port's local_load value that is used for ports being considered for minimal path routing, and for ports being considered for local non-minimal path routing.

Group load is a measure of how suitable a dragonfly group is for use as the intermediate group in a global non-minimal path. The 8-bit group load value is not computed by a switch, such as switch 202, but is software-configurable. Software might use a measure of the network injection load present across the input side of the group's edge ports in deriving the group_load value, or might determine the group_load value based on a policy of discouraging use of certain groups as non-minimal intermediate groups, perhaps based on the jobs or services that are running in the groups. That is, the group_load value is intended to be representative of the amount of local traffic within a group.

A network management stack sets the group_load value by periodically writing to a CSR. The software-configured group load value is communicated across global links. FRF instances associated with global links forward the group_load value that they receive from their link-partner in the group at the opposite side of the link, to all other FRF instances in the switch. In this way, each FRF instance learns the group load values of the groups at the opposite end of each of the global links terminated by the switch.

In terms of global non-minimal global port load (gnmgp_load), this load is a metric used in assessing a global port's suitability for use in directing a frame to the intermediate group reached by the global link connected to the global port. The gnmgp_load is nominally equal to the maximum of the global port's local_load and the group_load value being received from the group reached by the global link. However, through field G-NMGP_EN_GRP LD in CSRR_TF FRF_CFG-_LOAD_CTRL, the group_load component can be excluded.

When the port loads of candidate ports are being compared to determine the best choice port to route a frame to, it is the port's gnmgp_load value that is used for global ports being considered for global non-minimal path routing.

Mean global load (mean_global_load) is intended for use in assessing a switch's suitability for use in reaching any intermediate group that is directly connected to that switch. The mean_global_load value is an 8-bit value equal to the arithmetic mean of the gnmgp_load values of all of the switch's global ports. Ports that are classified as non-operational by either hardware or software are excluded from the calculation. The ports to include in the mean_global_load computation are determined from CSR R TF FRF CFG GNM global ports.

For any port whose load is included in the mean_global_load computation, if a group_load value is not being received for that port from the port status ring, either because link partner data is not being received for that port or because the link partner data that is being received is not global link data, the contribution of that port to the mean_global_load is based solely on that port's local load. It should be understood that the aforementioned port status ring communicates status and load information amongst the ports on a switch (e.g., input and output ports 220b and 220c, respectively, of switch 202). The computed mean_global_load value is communicated across local links. FRF instances associated with local links forward the mean_global_load value, that they receive from their link-partner in the local switch at the opposite side of the link, to all other FRF instances in a switch. In this way, each FRF instance learns the mean_global_load values of the local switches at the opposite end of each of the local links terminated by the switch, and can use these values in global non-minimal path selection.

Global non-minimal local port load metrics are computed by each FRF instance, distributed between ports in a switch using the port status ring, and distributed between switches. The global non-minimal local port load is a metric for use in assessing a local port's suitability for use in directing a frame to an intermediate group of a global non-minimal path. The global non-minimal local port load takes into account the load on the local port as well as the suitability of the local group switch, to which the port connects, for use in reaching an intermediate group. A port's gnmlp_load value is equal to the maximum of the port's local_load and the mean_global_load reported by the port's partner switch. Through software configuration it is possible to remove the mean_global_load component such that a port's gnmlp_load becomes simply equal to its local_load.

The gnmlp_load value is an 8-bit value. The computed gnmlp_load value is based on the local_load and mean_global_load values distributed via the port status ring. Each FRF instance computes the gnmlp_load value for all of its switch's ports at which link partner data for a local link is being received. If load status information is not being received from a port's partner switch, the gnmlp_load value for that port is set equal to the port's local_load.

For ports at which link partner data for a global link is being received, the port's gnmlp_load value is set to the value computed for gnmgp_load. This is a side-effect of an implementation optimization in which the same storage is used for gnmgp_load and gnmlp_load since, for any given port, at most one of the two is valid. The global non-minimal local port load metric is not used on ports where global link partner data is being received.

FIG. 6 illustrates example load measurements and how load measurement may be exchanged between switches in a group. FIG. 6 illustrates a group of switches, e.g., group 1, comprising switches 602, 604, and 606, each of which may be embodiments of switch 202 (FIG. 2). Group load values, as noted above, can be exchanged across global links, and as shown, group_load values are transmitted from/received by each of switches 602, 604, and 606 from other groups/switches in the switch fabric. Within group 1, switches 602, 604, and 606 exchange mean_global_load values and rs_busy_port_masks. As noted above, each FRF instance captures all rs_busy_port_masks such that all FRF instances learn the remote busy port status being provided by all neighboring switches. Switch 602 also is shown as receiving gnmlp_load values which are measured at the output of local ports, based on local_load at that port, and mean_global_load reported by the link partner. Further still, local_load values measured at the output of all ports is received by switch 602. It should be noted that such load and mask values are sent across links between connected switches symmetrically from each switch to the other.

The fabric routing process described in the preceding subsections is performed for every frame received. The switch determines whether to perform packet-by-packet adaptive routing (using this value) or flow based adaptive routing (where this value is used for the first packet in each flow) according to the ordering requirements of the traffic.

As has been described herein, a switch, such as switch 202 supports minimal and non-minimal path routing in a network. In some embodiments, as alluded to above, the network may have a dragonfly topology. Dragonfly routing is hierarchical, distinguishing between local destinations (those in same group as source) and global destinations. Thus in a dragonfly network, a switch routes to a destination group and then to a switch within that group using two tables rather than to individual destinations using one large table.

It should be understood that minimal paths are based on the destination. If a destination NIC is local, an output port that connects to the destination switch is selected. If the destination is in another group, the packet is routed to a switch within the local group that is connected to the destination group. In a large system, there may only be one such path, but in a small system there are likely to be many, some connected to the input switch and others to switches elsewhere within its group. The input switch selects between them.

The candidate ports considered for minimal path routing are further divided into preferred and nonpreferred sets of ports where ports in the preferred set may lead to a path containing fewer hops. Non-minimal paths route packets via an intermediary switch, referred to as a root switch. Root switches are selected on a packet-by-packet basis or a flow-by-flow basis depending on the ordering requirements of the traffic.

Non-minimal traffic is routed "up" to the root switch, and then minimally "down" to the destination. In some embodiments, intermediate root switches are selected at random so as to distribute load uniformly. The network, e.g., network 100, provides control over intermediate group selection enabling traffic to be routed towards intermediate groups that are known to be lightly loaded or away from those that have specific function or are known to be heavily loaded. Root switches may be distributed over all groups, where a non-minimal path may detect a root switch in the source group, the destination group, or any intermediate group. Global non-minimal routes take an indirect path through a root switch in an intermediate group. These paths require two global hops, one from the source group to an intermediate group, and one from the intermediate group to the destination group. Global non-minimal paths require up to three local hops, one in each group. The maximum path length is five switch-to-switch hops, whatever the system size.

Minimal routing is to be preferred as the paths are shorter, and hence the load on the network is lower. However, minimal routing alone will result in poor performance on some traffic patterns, for example when all nodes in one group communicate with nodes in one other group. Achieving good performance across a wide range of traffic patterns requires a mix of minimal and non-minimal routing.

At each hop along a frame's path, the routing modes that may be used to advance the frame along its next hop are controlled by the configuration of the FRF routing algorithm table 408. When a frame is received at a switch input port, the types of paths along with the frame may be forwarded is determined: local minimal, global minimal, local non-minimal, and global non-minimal. The set of output ports to which the frame may be forwarded is determined by the type of paths allowed at that point.

The types of paths that are allowed to be taken depends on where the frame is at along its journey between its ingress and egress ports of the network. The path types are as follows. Local minimal paths select links that are directly connected to the frame's destination switch and may be used when the frame is in its destination group. Global minimal paths may be used when the frame is not in its destination group and select either global links that directly connect to the frame's destination group or local links that connect to a switch that has working global links that directly connect to the frame's destination group. Local non-minimal paths may be used when the frame is in its destination group, or when the frame is in an intermediate group. Local non-minimal paths select local links connected to other switches in the group without regard for the frame's destination. When in the destination group, it must be possible to reach the frame's destination switch within one more hop after taking the local non-minimal hop. When in an intermediate group, it must be possible to reach a switch with a working global link that connects to the frame's destination group within one more hop after taking the local non-minimal hop. Local links, that connect to switches from which this in not possible, must not be selected.

Global non-minimal-paths may be used when the frame is in its source group and is not in its destination group. Global non-minimal-paths select either global links connected to other groups or local links connected to other switches in the source group without regard for the frame's destination. Global links must only be selected if they connect to a group that has working links connecting it to the frame's destination group. Similarly, local links must only be selected if they connect to switches that have global links that are, themselves, valid global non-minimal path choices.

Adaptive routing selects between minimal and non-minimal paths (described above) according to their current load.

In terms of minimal routing, when in the destination group, but not at the destination switch, local minimal routes are generated by looking up the switch_id field of the destination fabric address in a local switch minimal table (FIG. 4A). The lookup returns a set of valid links. The local switch minimal table contains 128 entries each of 64 bits, with each bit representing one possible output port. When at the destination switch, the egress port or port choices are generated by looking up the endpoint_id field of the destination fabric address in the local port minimal table. The lookup returns a set of valid links. The local port minimal table contains 64 entries each of 64 bits, with each bit representing one possible output port.

Global minimal routes are generated by looking up the global_id field of the destination fabric address in a global minimal table (FIG. 4A). The lookup returns a set of valid links. The global minimal table contains 512 entries each of 64 bits, with each bit representing one possible output port.

Local minimal paths take at most one switch-to-switch hop, from the source switch to the destination switch, both of which are within the same group. There can be several such paths. Local non-minimal paths take two switch-to-switch hops, from the source switch to an intermediate switch, known as the Root switch, and from there to the destination switch. There are many such paths.

Global minimal paths take one global hop from the source group to the destination group. There is at most, one local hop in each of the source and destination groups. Global minimal paths require a maximum of three switch-to-switch hops whatever the system size.

In certain system configuration in which there are multiple global links connecting a source group to a destination group, a bias can arise such that the proportion of traffic injected at the source group that is distributed to each of the global links is not equal. As an example, consider the case of switch A, B, and C, all in the group X, with switch B having three global links connecting it to group V and switch C having two global links connecting it to group V. If traffic injected at switch A, destined for group V, is equally distributed between switch B and C, each of the two global links of switch C will be more heavily loaded than each of the three global links of switch B.

To enable the bias to be counteracted, the Global Minimal Table can be divided into several blocks, each of which is capable of generating a valid set of global routing choices for any destination group. On a frame by frame basis, the block that is used to service the request is pseudo-randomly selected by the FRF. Within each Global Minimal Table block instance, only a subset of the possible candidate ports that can be used to reach the destination group are populated. The subset is chosen in such a way so as to counteract the bias. The populated subsets can be varied across the different block instances such that all possible candidate ports are able to be used.

A global minimal path between an edge port in one group and an edge port in another group can require one, two, or three hops across fabric links. One hop if the switch containing the ingress edge port in the source group has a global link directly connecting it to the switch containing the egress edge port in the destination group. Two hops if the frame traverses a global link between the two groups that is connected directly to either the ingress switch in the source group or to the egress switch in the destination group. In this case, one hop across a local link in either the source group or the destination group is also required. Lastly, three hops are required if the frame traverses a global link that is not directly connected to either the ingress switch in the source group or to the egress switch in the destination group. In this case, a hop across a local link is also required in both the source and destination groups. The local link hop in the source group takes the frame from the ingress switch to the source group switch that is connected to the global link. The local link hop in the destination group takes the frame from the destination group switch that is connected to the global link to the egress switch.

When identifying minimal path candidate ports, the FRF is able to classify the candidates into a set of preferred ports and a set of non-preferred ports. The preferred ports are those that allow a global minimal path requiring two, or fewer fabric link hops. The non-preferred ports are all of the minimal path candidates that are not classified as preferred. Use of preferred paths, when available, and when not too heavily loaded reduces the average load on the system's local fabric links as it reduces the average number of local fabric links traversed per frame. Use of a preferred path may also reduce the end-to-end fabric latency experienced by the frame.

When performing local non-minimal routing, any local link can be a candidate. However, some local links may need to be excluded from consideration if they lead to a switch from which it may not be possible to reach the destination because of link or switch failures that exist within the system. A CSR controls which ports are candidates for local non-minimal path routing.

When performing global non-minimal routing, generally any global link can be a candidate. Additionally, generally any local link that reaches a switch with operational global links can also be a candidate. However, some links may need to be blocked from consideration if they lead to a switch or to a group from which it may not be possible to reach the destination group because of link or switch failures that exist within the system. CSRs control which ports are candidates for global nonminimal path routing.

When selecting a candidate port to use for global non-minimal routing, if all candidate ports, global and local, are equally likely to be selected, for many system configurations globally non-minimal traffic will not be evenly distributed among the global links leaving the group. Consider, for example, the situation of three switches, A, B, and C within a group, where each switch is connected to each other switch by four local links, and switch A and switch B each terminate 14 global links and switch C terminates 16 global links. Ingress traffic arriving at an edge port of switch A may be routed globally non-minimally to any of the global or local links terminated by switch A. If it is equally likely to be routed to any of these links, then each global link terminated by switch B will receive only 4/14th (4 local links reaching 14 global links) of the traffic routed to each global link terminated by switch A. Similarly, each global link terminated by switch C will receive 4/16th (4 local links reaching 16 global links).

To counteract this potential bias in the distribution of globally non-minimal traffic among a group's global links, when the set of global non-minimal candidate ports is being pseudo-randomly down selected to the small number of ports that will participate in the adaptive routing stage, a weighting can be applied to each of the candidate ports such that some will be more likely than others to survive the down-selection process.

Adaptive routing selects between these minimal and non-minimal paths based on their load. Adaptively routed traffic starts on a minimal path, diverting to a non-minimal path if the load on the minimal path is high (this is known as progressive adaptive routing). Such paths are said to have diverged.

A non-minimal path can be selected at the injection point or at the exit router in a source group. A local non-minimal route may be taken within the source group, an intermediate group, or a destination group if it is selected as the intermediate. Dragonfly routing algorithms allow a non-minimal path in both the intermediate and destination groups (consider a case where all traffic incoming on the global ports of a particular router is destined for NICs on another router in the group). In general however, non-minimal traffic is sufficiently well distributed as to avoid this happening, but an additional hop in the destination group may still be beneficial in cases where there is an error on a local link. Having arrived at the intermediate group the packet may take either a minimal route to the destination group or a local non-minimal route to a switch with a path to the destination group.

Again, this decision is made based on load. Having taken a hop within the intermediate group the packet must detect root and take a minimal path to the destination. Adaptive decisions are made based on load and a bias towards preferred, minimal, or non-minimal. A routing algorithm, as described above, increases the bias towards minimal paths the closer a packet is to its destination. This algorithm prefers a direct path across the intermediate group provided the load is low.

Restricted routing is used at points other than injection and root detection to prevent packets from flowing back in the direction from which they came. In a switch, cases in which a packet has taken one hop from points of injection and root detection are detected and ensured that a global port is taken. For local minimal routing, having taken a hop from the root, the packet will arrive at a switch that is connected to the destination NIC. For global minimal routing, having taken a hop from the point of injection, the packet will arrive at a switch with a global link, which must be taken. In the intermediate group, packets are allowed to take a local hop at the point of injection and having detected root. Having taken this hop, the packet will arrive at a switch that is connected to the destination group, this path must be taken.

When passing information from switch to switch, it is necessary to make instantaneous decisions about the next hop on the path. Decisions are taken using information derived from local state and information that is communicated from neighboring switches. Use of information from many different sources allows for more accurate/effective decisions. This includes information from neighbors.

Prior systems carried information on average load from switch to switch. That said, more detailed information from related or neighboring switches is more helpful. In the current switch ASIC, a set of values can include information indicative of the status of output ports of related/neighboring switches. By passing this set of values, much better routing decisions can be made. In one example, a flag is passed back from neighboring switches, with the flag having one bit for each output port. For example, with a switch having 64 outputs, a 64 bit flag would be transmitted. This is much more accurate than simply passing a global average for neighboring ports.

Network switches support fat-tree networks with two or three stages. In a typical system cabinet-level sub-tree structures contain between 32 and 256 endpoints connected by one or two stages of switches. In a full bandwidth network each stage of switches has equal numbers of links down towards the endpoints and up to the higher stages of switches.

The sub-trees are connected by Core switches, with each Core switch connected to all the sub-trees. In a full bandwidth network with N endpoints per sub-tree there are N uplinks from the sub-tree to the Core switch.

The top stage (a Core switch) has 64 down links. In a full bandwidth fat-tree the lower stages have 32 up links and 32 down links. In a tapered fat-tree the lower stages may have 48 or more down links and 16 or fewer up links. The range of supported fat-tree topologies is set out in the following table. Note that the number of nodes per switch varies with the number of stages and the taper, as compared to a constant of 16 with dragonfly.

TABLE

Maximum number of endpoints for fat-tree configurations.

| Stages | Geometry | Switches in each stage | Maximum number of Endpoints per switch | Taper |
|---|---|---|---|---|
| 1 | 64 1 | 64 | 64.0 | None |
| 2 | 64 × 32 32:64 | 2048 | 21.3 | None |
| 2 | 64 × 48 16:64 | 3072 | 38.4 | 1:3 |
| 3 | 64 × 32 × 32 | 1024:2048:2048 65536 | 12.8 | None |
| 3 | 64 × 48 × 32 | 512:2048:3072 98304 | 17.4 | 1:3:3 |
| 3 | 64 × 48 × 48 | 256:1024:3072 147456 | 33.9 | 1:3:9 |

Figure 7:
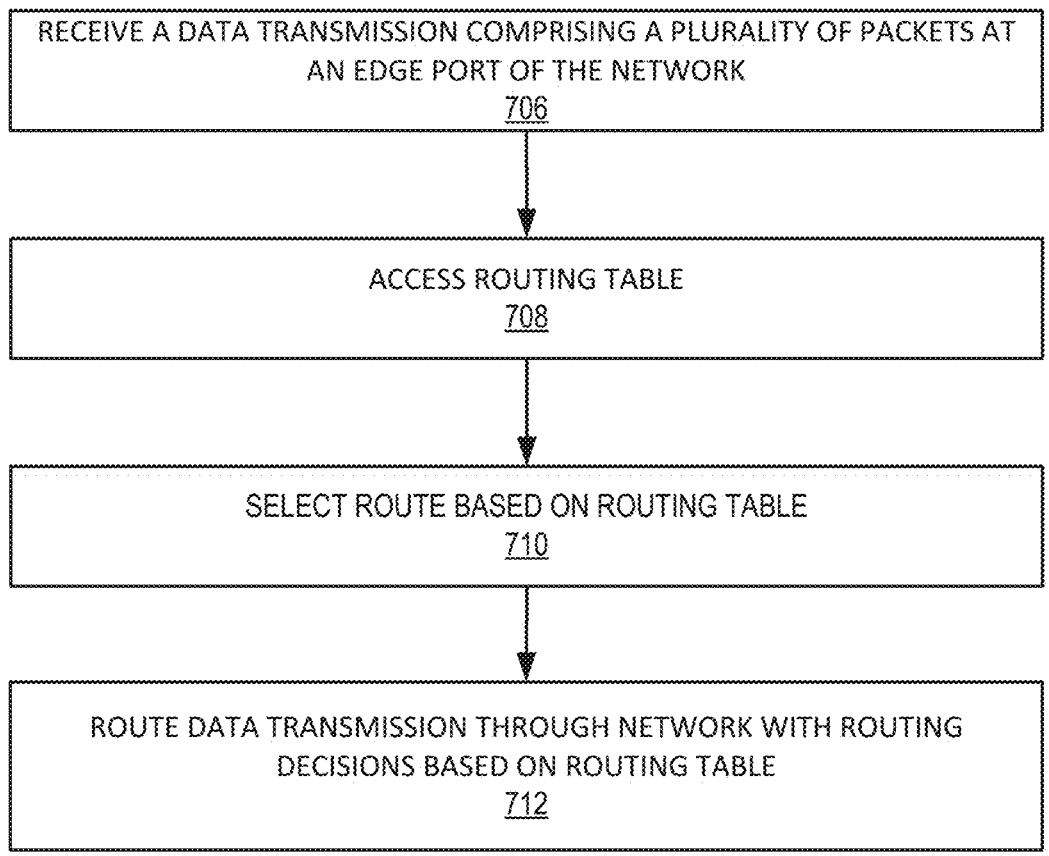
FIG. 7 illustrates an example method of efficiently routing data through a network in accordance with some embodiments.

FIG. 7 illustrates an example method of efficiently routing data through a network in accordance with some embodiments. In this example, the network has a plurality of switches configured in a fat-tree topology. A routing table is provided for routing and includes entries to effect routing decisions based upon a destination based hash function. At operation 706, the network receiving a data transmission comprising a plurality of packets at an edge port of the network. At operation 708, the switch accesses a routing table to determine routing for the data transmission. At operation 710, the route is selected based on the routing table. The routing table includes entries to effect routing decisions based upon a destination based hash function. At operation 712, the system routes the data transmission through the network with routing decisions based upon the routing table.

Figure 8:
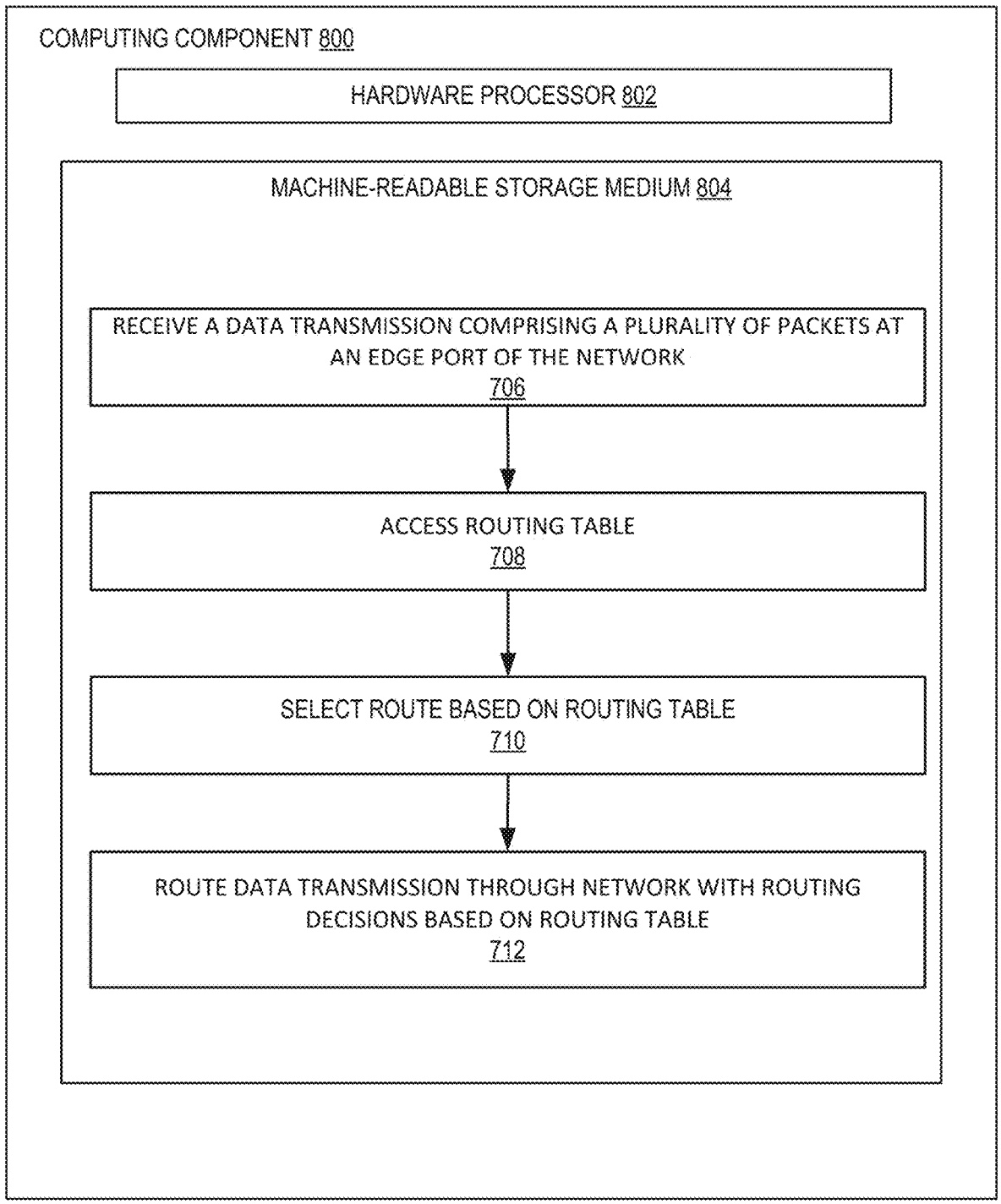
FIG. 8 illustrates an example computing component that may be used to effectuate fat-tree routing in accordance with one embodiment of the disclosed technology

FIG. 8 illustrates an example computing component 800 that may be used to effectuate fat-tree routing in accordance with one embodiment of the disclosed technology. Computing component 800 may be, for example, a server computer, a controller, or any other similar computing component capable of processing data. In the example implementation of FIG. 8, the computing component 800 includes a hardware processor 802, and machine-readable storage medium 804. Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions, such as instructions 806-812, to control processes or operations for merging local parameters to effectuate swarm learning in a blockchain context using homomorphic encryption. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

In various embodiments selected functionality is added to the network fabric at an its edge (i.e. at an ingress port or edge port). A translation function is performed at the edge port to classify the packets as LAG packets or ECMP packets. The headers of received packets are parsed and fields in the headers, such as destination addresses, are compared to an array of values stored in a translation table. Some of these values can be associated with a LAG or may be translations setup for an implementation of ECMP. If a match occurs against one of these translation rules, a lookup is carried out in a related translation lookup table, which indicates the LAG/ECMP function is needed and also returns a base pointer and a width value that will be used by the LAG/ECMP function. A configurable combination of the parsed header fields are fed into a distribution function which generates a hash value. This hash distribution value can combine the MAC address, IP address and/or port address of the packet header using a Cyclic Redundancy Check (CRC) function to compress these fields into 16-bit number with a uniform distribution. This 16-bit hash value is multiplied by the width value. The upper bits of the multiply result (bits 16 and above) will be in the range 0 to (width−1). Because the lower 16 bits of the multiply result are not required a synthesized parallel multiplier can optimize away most of the hardware multiplier array. The upper bits of the result are added to the base pointer to form an index into another table that stores destination port addresses. These destination port addresses are the member ports of the LAG or are valid destination ports for the ECMP protocol. System software loads each LAG/ECMP destination port addresses directly into this table where each LAG/ECMP configuration uses the entries in this final lookup table from their respective base pointer to their base pointer+width−1.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-812.

Hardware processor 802 may execute instruction 806 to receive a data transmission comprising a plurality of packets at an edge port of the network. Hardware processor 802 may execute instruction 808, to access a routing table to determine routing for the data transmission. Hardware processor 802 may execute instruction 810, to select the route based on the routing table. The routing table includes entries to effect routing decisions based upon a destination based hash function. Hardware processor 802 may execute instruction 812 to route the data transmission through the network with routing decisions based upon the routing table.

The switch supports fat-tree networks with two or three stages. The top stage (spine switch) has 64 down links. In a full bandwidth fat-tree the lower stages have 32 up-links and 32 down-links. In a tapered fat-tree the lower stages may have 48 or more down-links and 16 or fewer up-links. Note that the number of nodes per switch varies with the number of stages and the taper, as compared to a constant of 16 with Dragonfly.

TABLE 3

Switch Fat Tree Networks

| Stages | Geometry | Switches in each stage | Maximum number of nodes | Nodes per switch | Taper |
|---|---|---|---|---|---|
| 1 | 64 | 1 | 64 | 64.0 | None |
| 2 | 64 × 32 | 32:64 | 2048 | 21.3 | None |
| 2 | 64 × 48 | 16:64 | 3072 | 38.4 | 1:3 |
| 3 | 64 × 32 × 32 | 1024:2048:2048 | 65536 | 12.8 | None |
| 3 | 64 × 48 × 32 | 512:2048:3072 | 98304 | 17.4 | 1:3:3 |
| 3 | 64 × 48 × 48 | 256:1024:3072 | 147456 | 33.9 | 1:3:9 |

Geometry is the Links down per switch in each stage: E or S×E or S×M×E, where S, M, E are the number of down-links of each spine, middle, edge switch. Switches in each stage is E or S:E or S:M:E, where S, M, E are the number of switches in the spine, middle, edge stages. Taper is the Ratio of up-links per switch to down-links per switch, "none" means the number of up-links is the same as the number of down-links for all stages. EU:ED or MU:MD:ED, where MU, MD, EU, ED represent middle up-links, middle down-links, edge up-links, and edge down-links. As each edge switch 912 up-link connects to a middle switch downlink, EU=MD.

Fat tree routing can be performed using the minimal tables. Frames are routed adaptively up the tree from the leaf switches towards the spine switches and then deterministically down to the destination.

Figure 9:
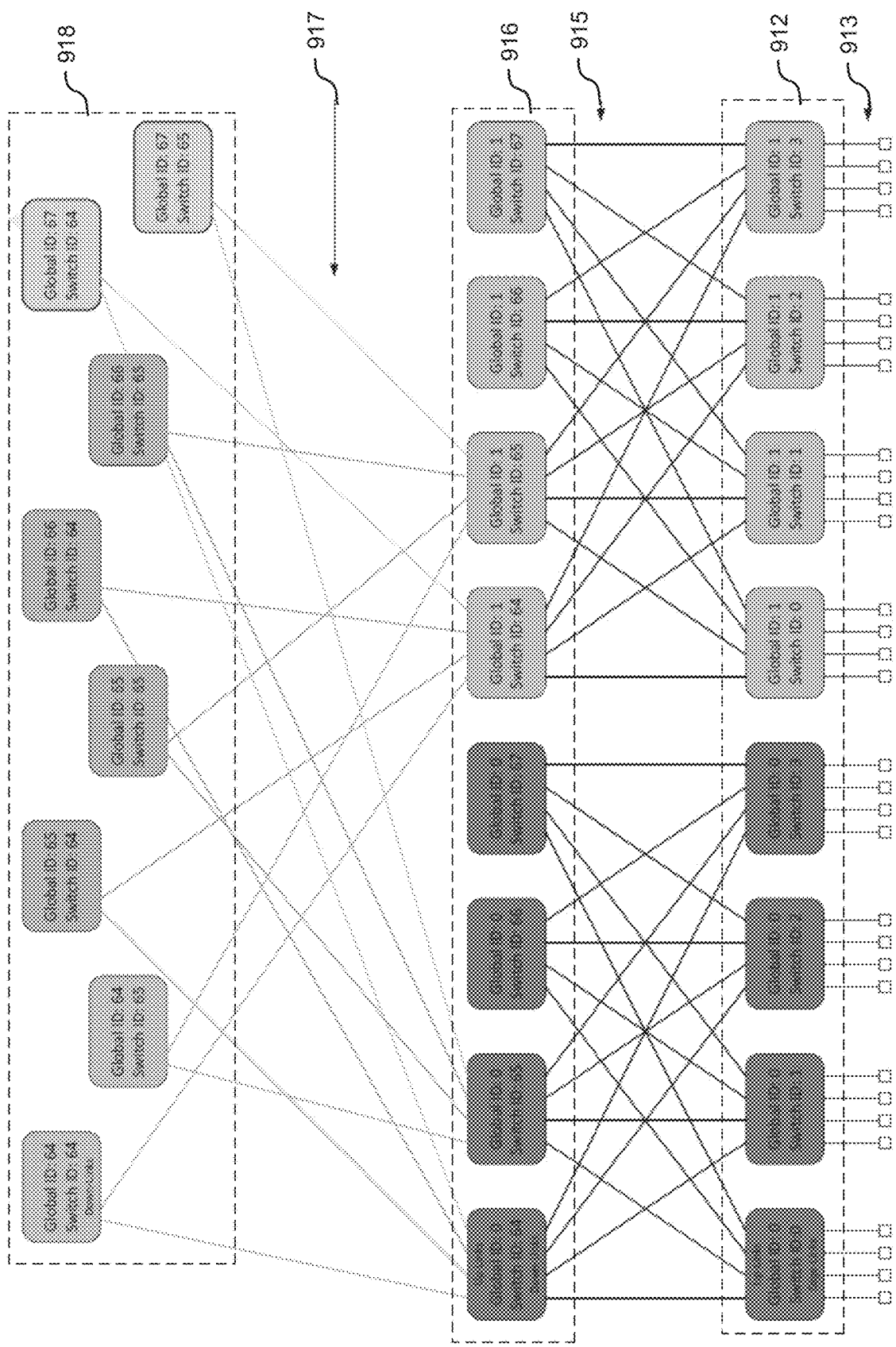
FIG. 9 illustrates an example of a three-level fat-tree topology in accordance with some embodiments.

FIG. 9 illustrates an example of a three-level fat-tree topology in accordance with some embodiments. The bottom level of switches represents edge switches 912 connected to edge links 913. The middle switches 916 connect to the edge switches 912 via local links 915. Spine switches 918 connect to middle switches 916 via global links 917.

The number of spine switches per group is equal to the number of middle switches, per group, within the groups that contain the middle and edge switches. It is, therefore, dependent on the taper implemented at the edge switches. Here, 32 with no taper. The maximum number of middle switches per group depends on the taper implemented at the edge switches. Here, 32 with no taper, and 16 with 3 edge links per edge switch up-link. The maximum number of edge switches per group depends on the taper implemented at the middle switches. Here, 32 with no taper, and 48 with 3 down-links per middle switch up-link.

Figure 10:
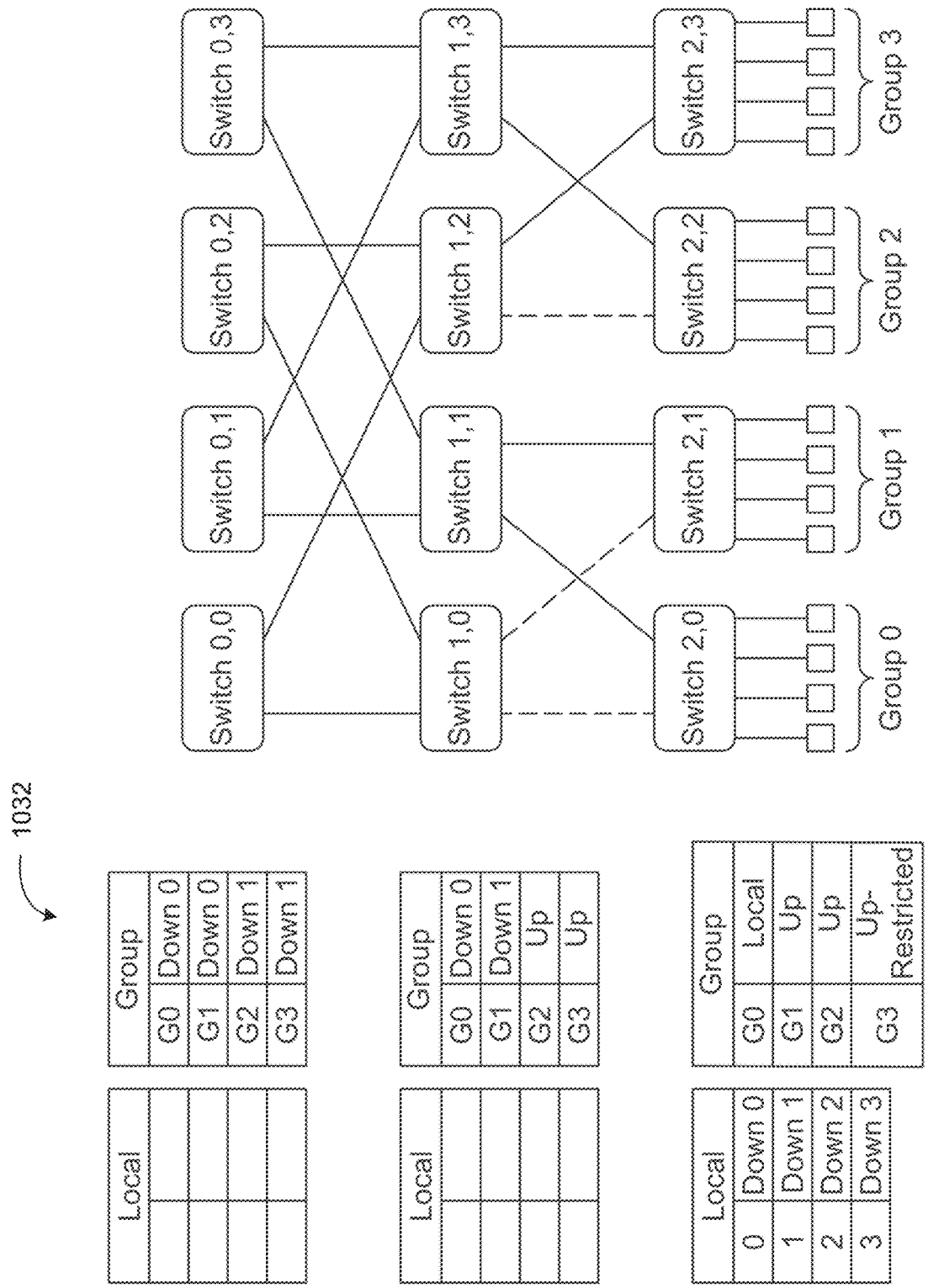
FIG. 10 illustrates an example of a Fat-Tree with a link failure between the first and second level switches in accordance with some embodiments.
Figure 11:
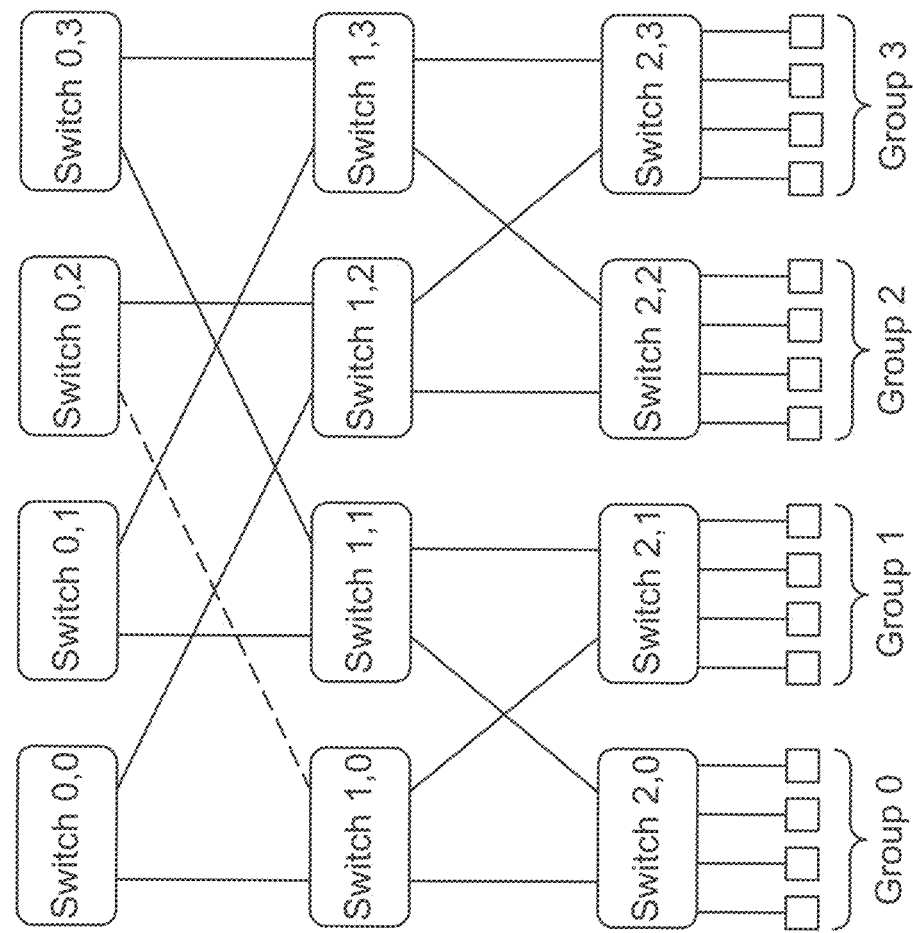
FIG. 11 shows an example of a link failure at a higher level in the topology in accordance with some embodiments.

Groups are formed from the sets of edge switches 912 and middle switches 916 that are interconnected. Local routing is used within these groups. Global routing directs frames to the correct group. For small systems, the groups are formed from the endpoints of each leaf switch. The tables in FIGS. 10 and 11 illustrate global routes for the switches in the left hand side of the figure. Down entries indicate that a specific down link must be taken to arrive at a group, local switch, or an endpoint. Up entries indicate that any of the up links can be used to reach a given local switch, or group. The Up entry would normally contain all of the up links, although one or more may be omitted to avoid routing to faulty components within the network. Where multiple links are specified, an adaptive choice can be made.

This scheme supports the full range of three-stage networks shown in Switch Fat Tree Networks (see Table 3). Two-stage networks can be formed using online local routing within a single group.

The fabric routing configuration of a Switch device depends on the number of stages in the fat-tree network and on the stage within the network at which that device is located. The following sub-sections describe how Switch can be used to support, three, two, and one stage fat-trees. The routing functionality provided by the Switch of Dragonfly routing, can also be applied to other network topologies including fat-tree.

As noted, in a fat-tree network, bottom groups are formed of the sets of edge-level switches 912 and middle-level switches 916 that are interconnected. Switches at the spine-level are also organized into groups (spine groups), where the number of switches per spine group is equal to the number of middle switches 916 per bottom group and the number of spine groups is equal to the number of up-links per middle switch. This organization has the following characteristics.

Each edge switch 912 connects to each middle switch 916 within its group, and vice versa.

Each middle switch 916 connects to one switch in each spine group.

Each spine switch 918 connects to all bottom groups. Therefore, each bottom group also connects to all spine switches.

The maximum number of bottom groups is equal to the number of down-links per spine switch: 64. The maximum number of spine groups is equal to the number of up-links per middle switch: 32 if there is no taper at the middle switches, fewer if there is a taper. Therefore the maximum number of groups of all types is 96.

The maximum number of edge switches 912 per bottom group is equal to the number of down-links per middle switch: 32 if there is no taper at the middle switches, but up to 63 with the greatest possible taper. Tire maximum number of middle switches 916 per group is equal to the number of up-links per edge switch: 32 if there is no taper at the edge switches, fewer if there is a taper. Therefore the maximum number of switches per bottom group is 95.

The maximum number of switches per spine group is equal to the number of middle switches 916 per bottom group: 32 if there is no taper at the edge switches, fewer if there is a taper.

Almost all traffic within the fat-tree network is expected to be traffic from one edge port to another.

All variations of three-stage fat-tree networks, can be implemented with seven significant bits configured for both the global_id and the switch_id.

global_id values between 0 and 63, inclusive, are used to identify the bottom groups.

global_id values between 64 and 127, inclusive, are used to identify the spine groups.

switch_id values between 0 and 63, inclusive, are used to identify the edge switches 912 within the bottom groups.

switch_id values between 64 and 127, inclusive, are used to identify the middle switches 916 within bottom groups.

switch_id values between 64 and 127, inclusive, are used to identify the switches within spine groups.

To support in-band management traffic between Local Management Processors (LMPs) distributed throughout the network, potentially at every switch in the network, the switch can be configured to also allow traffic to be routed from any port of any switch in the network to any port of any switch in the network.

To support the routing of management traffic to specific spine switches, each spine switch's switch id—value must be the same as the switch—id value of all of the middle switches 916 to which it connects. This restriction arises because there is no direct connectivity between spine switches. The down-links of the edge switches 912 are, naturally, configured to be edge links. The links that interconnect the switches within a bottom group are the up-links of the edge switches 912 and the down-links of the middle switches. These links are configured to be local links. The middle switch uplinks and all spine switch links are configured to be global links.

For routing between edge switches, when a frame is already in its destination group, local routing is used to direct the frame to its destination switch within the group and to its egress port of the destination switch. When a frame is not in its destination group, global routing is used to direct the frame toward its destination group.

For local routing toward an edge switch, when at an edge switch 912 in the destination group, but not at the destination edge switch, minimal routing, using the Local Switch Table, is enabled by the Routing Algorithm Table. A Local Switch Table entry corresponding to the destination switch is used to select candidate up-links. In the absence of faults within the network, when the destination switch is another edge switch, all uplinks are candidates.

When at a middle switch 916 in the destination group, minimal routing, using the Local Switch Table, is enabled by the Routing Algorithm Table. The Local Switch Table entry corresponding to the destination switch is used to select candidate down-links. In the absence of faults that cause there to be no connectivity between the middle switch 916 and the destination edge switch 918, the set of candidates consists of only the link or links that connect directly to the destination edge switch.

When at the destination switch, minimal routing, using a Local Port Table, is enabled by the Routing Algorithm Table. The Local Port Table entry, that corresponds to the endpoint_id in the frame's Destination Fabric Address (DFA), is used to select the frame's egress port, or set of candidate egress ports.

For global routing toward an edge switch 912, when at an edge switch 912 in a group that is not the destination group, the frame must be directed to an up-link of the edge switch 912. In the absence of faults within the network, the frame can be routed to any up-link. Either global minimal or global non-minimal routing can be used to select the set of candidate up-links. If global non-minimal routing is used, the adaptive choice between the edge switch's up-links will be based on the link's Global Non-Minimal Local Port (GNMLP) load. This has the benefit of allowing the mean load of the middle switches' up-links (global links) to be factored into the choice of which up-link of the edge switch 912 is chosen. By doing this, the middle switches, whose up-links are less heavily loaded, will be favored.

To enable global non-minimal routing at an edge port, global non-minimal routing must be enabled in the port's Routing Algorithm Table. The mask that controls which local ports are candidates for use for global non-minimal routing, must be configured to select the allowed up-links. In the absence of faults in the network, all up-links are allowed. For fat-tree networks, the adaptive routing bias, for non-minimal port selections, should be configured the same as it is for minimal port selections.

When at a down-link (local port) of a middle switch, minimal routing using the Global Table is enabled by the Routing Algorithm Table. The Global Table entry corresponding to the destination group is used to select candidate up-links. In the absence of faults in the network, all up-links (all global links) are candidates when routing to a bottom group.

When at a spine switch, minimal routing using the Global Table is enabled by the Routing Algorithm Table. The Global Table entry corresponding to the destination group is configured to select candidate down-links. When the destination group is a bottom group, the set of candidate down-links consists of only the down-link or links that connect directly to the destination group.

On reaching the up-link of a middle switch 916 of the destination group, local routing is used to direct the frame to its destination switch and egress port.

For routing to or from a non-edge switch, frames can be routed between the management processors in each of the switches using the same mechanisms.

For application of the remote switch busy port functionality, the switch's Remote Switch Busy Port (RSBP) functionality provides a mechanism to allow the loads at the ports of neighboring switches to affect routing decisions made at the current switch. This can be used in situations when, at the current switch, there is a choice of which neighboring switch to route through to reach a particular destination group or a particular destination switch. Particular neighboring switches can be avoided if their links to the destination group or switch are heavily loaded.

Within the three-stage fat-tree network, there are two places where the RSBP functionality can be beneficially applied:

RSBP application when routing between bottom groups. When at a middle switch 916 and globally routing to a different bottom group, particular spine switches can be avoided if their links to the destination group are heavily loaded.

RSBP application when routing between edge switches. When at an edge switch 912 and routing locally to a different edge switch 912 within the same group, particular middle switches 916 can be avoided if their links to the destination edge switch 912 are heavily loaded.

A two-stage fat-tree network can be implemented as a single one of the bottom groups shown in FIG. 9. The middle switches 916 in FIG. 9 are the spine switches in a two-stage network. This organization has the following characteristics.

Each edge switch 912 connects to each spine (middle) switch (916), and vice versa.

The maximum number of edge switches 912 is equal to the number of down-links per spine (middle) switch: 64. Spine (middle) switches have no up-links.

The maximum number of spine (middle) switches is equal to the number of up-links per edge switch: 32 if there is no taper at the edge switches, fewer if there is a taper. The maximum number of switches in the network is 96.

In a two-stage fat-tree network the down-links of the edge switches 912 are, naturally, configured to be edge links. The edge switch 912 up-links and spine switch down-links are configured to be local links.

Routing for the two-stage network is implemented with minimal routing using the Local Switch Table to route between switches and the Local Port Table to identify the egress port once the destination switch has been reached. The routing configuration is a subset of that required for three-stage networks.

A one-stage fat-tree network consists of a single Switch device. All 64 of its ports can be used as edge ports 912. Routing between ports is implemented using the minimal Local Port Table.

Aspects of how frames with unicast and sw_port DFAs are routed are now described. The Routing Algorithm Table is a software configurable table that determines valid choices based on the frame's current routing state. Valid choices are decisions such as whether a local minimal, global minimal, local non-minimal, or global non-minimal path is allowed to be chosen for the frame's next hop. The routing state includes information such as the VC the frame was received on, and whether it is in the source, the destination, or an intermediate group.

If the Routing Algorithm Table entry corresponding to the frame's current routing state is disabled, the frame is deemed to be unexpected and error EMPTY ROUTE_UF is reported. Routing Algorithm Table entries are considered to be disabled if they allow neither minimal nor non-minimal routing.

The Routing Algorithm Table, along with the Adaptive Select function, also determines the VC to be used for the frame's next hop. This table is implemented as an ECC protected memory of 64 words by 13 bits (plus ECC) per word.

There are three minimal tables: min_global, min_local_switch, and min_local_port, collectively referred to as the Minimal Tables. They are used to determine ports which can be used to route the frame via a minimal path. As only one of these tables is ever accessed at a time, all are implemented within the same memory with specific address ranges, within the memory, assigned to each. The min_global table is indexed by the DFA global_id field. The min_local_switch table is indexed by the DFA switch_id field. The min_local_port table is indexed by the DFA endpoint_id field.

The configuration of the Routing Algorithm Table determines when each table is used; however, min global is intended to be used when the frame has not yet arrived at its destination group to identify global ports that connect directly to the destination group and local ports that connect to a switch, in the current group, that has one or more global ports that connect to the destination group. Similarly, min local switch is intended to be used when the frame has arrived at the destination group, but not at the destination switch, to identify local ports that can be used to reach the destination switch. Lastly, min_local_port is intended to be used when the frame has arrived at the destination switch to identify edge ports that connect to the endpoint device.

The FRF design supports the possibility of multiple edge ports, off of the same Switch device, corresponding to the same DFA. If multiple edge ports are enabled in the min_local_port table, the downstream port selection logic will adaptively choose one based on loading and pseudo-random selection just as it does when multiple ports are enabled in the min local_switch or min global tables.

When the min global table is being used to route a frame, depending on the configuration of field RAND_BITS in CSR R_TF FRF CFG_GMIN_TABLE_BLKS (Section 9.7.5.33 in the SDG), up to four of the min_global table's upper address bits can be set pseudo-randomly instead of being determined by the global_id in the DFA of the frame being routed. This functionality enables implementation of weighting such that some ports are more likely to be chosen than others.

The format of these tables' output is a bit-field, 64 bits wide, where each bit corresponds to a different output port of the current switch. Bits that are set identify valid candidate ports to which the frame may be forwarded.

The Minimal Tables are implemented as an ECC protected memory of 704 (512 min_global+128 min_local_switch+64 min_local_port) words by 64 bits (plus ECC) per word.

When a failure occurs failures in Fat-Tree networks, the network's logical topology is not modified, but routing configurations are modified so as to limit paths that traffic can take in a way that avoids the missing component. It is not necessary to perform the routing updates atomically from the point of view of traffic in the network; traffic can continue to flow while the routing configuration is modified.

FIG. 10 illustrates an example of a Fat-Tree with a link failure between the first and second level switches in accordance with some embodiments. The network shown in FIG. 10 is only shown to be half as wide as it could be if the top level of switches also have four ports, like the middle level. The tables 1032 show how routing would be configured for the left-most column of switches (Group 0) based on a scheme that divides an endpoint's address into local and group components, where the local component is used to route toward the specific endpoint when already in the destination group and the group component is used to route toward the destination group when not in the destination group. This addressing scheme is also compatible with the Dragonfly topology.

Normally when routing upward, any upward-facing link can be chosen. This free choice in the upward link selection has simply been shown as "up" in the tables. When coming back down the tree, the choice of downward link is restricted, dependent on the destination, as shown in the tables.

When a failure occurs, upward choice must be limited so as to prevent a downward packet from arriving at a point where it needs to use the failed component. Assume in FIG. 10, the link between switch 1,2 and switch 2,3 is failed. Assuming there are no more functioning links between this pair of switches, downward traffic headed for switch 2,3 must be prevented from arriving at switch 1,2. This is accomplished by selectively limiting the upward link choice for traffic destined for switch 2,3 (Group 3) at the other switches in the same level of the topology. In the figure this is shown by the dashed lines; switches 2,0, 2,1, and 2,2 must use links other than the dashed links for traffic heading to group 3. Traffic headed to the other groups can use any of the upward links.

The ability to limit the choice of link based on the destination group would naturally be present in routing structures designed to support Dragonfly routing; this isn't special functionality that would be required only to support failure handling in Fat-Tree networks.

FIG. 11 is used to describe an example of a link failure at a higher level in the topology in accordance with some embodiments. Assume the link between switch 0,2 and 1,2 is failed. If there are no more functioning links between this pair of switches, downward traffic headed for switch 1,2 must be prevented from arriving at switch 0,2. Similar to the previous example, this is accomplished by selectively limiting the upward link choice for traffic destined for switch 1,2 (which is above groups 2 and 3) at the other switches, in the same level of the topology as 1,2, that can be reached from switches that are above switch 1,2. In the network shown in the figure, this is only switch 1,0; switch 1,0 must restrict traffic destined for groups 2 and 3 to links other than the dashed links.

Figure 12:
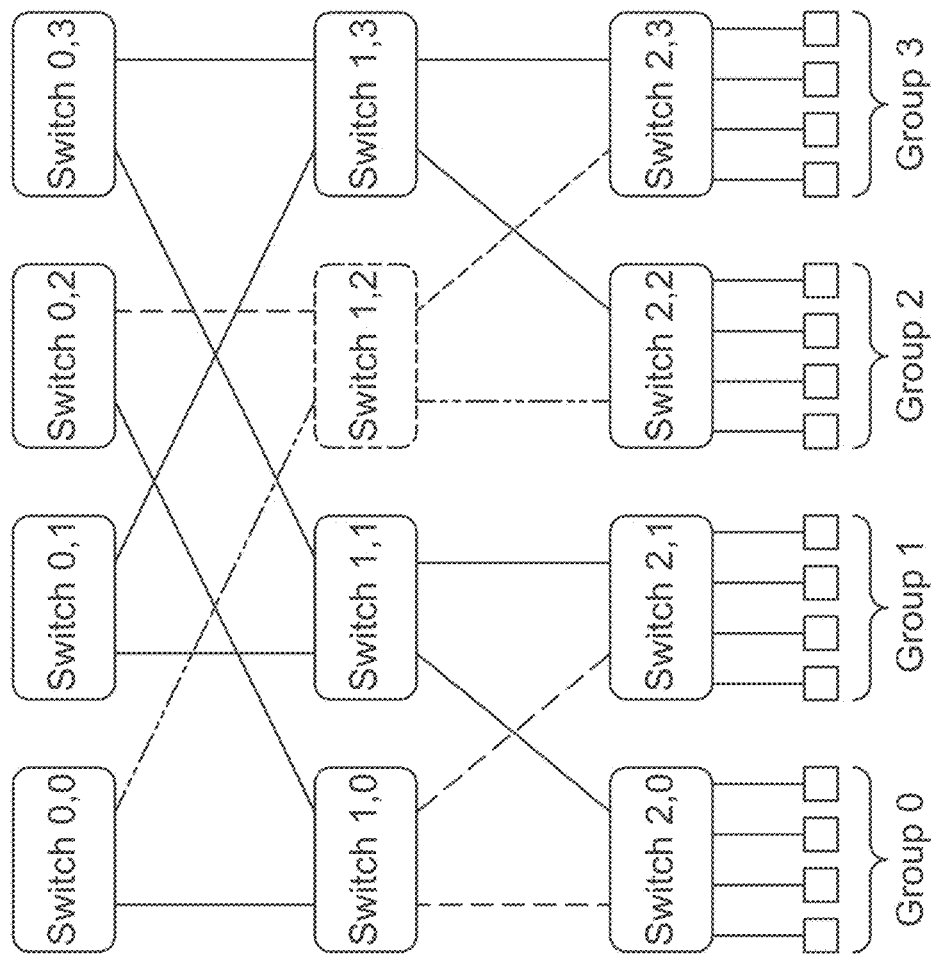
FIG. 12 shows an example of a failed switch in accordance with some embodiments.

The handling of the failure of a switch is essentially equivalent to the handling required for the failure of all of the downward links connected to the switch. Switches in the level below the failed switch are affected. FIG. 12 shows an example of a failed switch in accordance with some embodiments.

Below is a Driven Dragonfly Routing table.

| Set B Dest Group | In Src Group | Group Mate h | Switch Match | Port Type | Rcvd vc |
|---|---|---|---|---|---|
| 0 | 1 | 1 | 0 | Edge | don't care |
| 0 | 1 | 1 | 1 | Edge | don't care |
| 0 | 1 | 1 | 0 | Local | 0 |
| 0 | 1 | 1 | 1 | Local | 0 |
| 0 | 1 | 1 | 1 | Local | 1 |
| 0 | 1 | 0 | N/A47 | Edge | don't care |
| 48Q | 1 | 0 | NIA | Local | 0 |
| Q | 1 | 0 | NIA | Local | 1 |
| s00 | 1 | 0 | NIA | Local | 0 |
| 0 | 1 | 0 | NIA | Local | 1 |
| 0 | 0 | 0 | NIA | Global | 0 |
| s10 | 0 | 0 | NIA | Global | 1 |
| 0 | 0 | 0 | NIA | Local | 1 |
| 0 | 0 | 0 | NIA | Local | 2 |

| | | | Outputs[46] | | | | |
|---|---|---|---|---|---|---|---|
| Global Preferred | Enable Exception n | Enable Min | Enable NM | Restrict GM | Restrict GNM | VCA (local) | VCB (global) |
| No | 0 | Local Switch | Local | 0 | 0 | 0 | 0 |
| No | 0 | Local Port | Disable | 0 | 0 | 0 | 0 |
| No | 0 | Local Switch | Disable | 0 | 0 | 1 | 1 |
| No | 0 | Local Port | Disable | 0 | 0 | 0 | 0 |
| No | 0 | Local Port | Disable | 0 | 0 | 1 | 1 |

-continued

| | Outputs[46] | | | | | | |
|---|---|---|---|---|---|---|---|
| Global Preferred | Enable Exception n | Enable Min | Enable NM | Restrict GM | Restrict GNM | VCA (local) | VCB (global) |
| Yes | 1 | Global | Global | 0 | 0 | 0 | 0 |
| Yes | 0 | Global | Global | 0 | 1 | 1 | 0 |
| Yes | 0 | Global | Disable[49] | 1 | 1 | 1 | 1 |
| Non-global | 1 | Global | Global | 0 | 1 | 1 | 0 |
| Non-global | 1 | Global | Disable | 1 | 1 | 1 | 1 |
| Yes | 1 | Global | Local | 0 | 0 | 1 | 1 |
| Yes | 1 | Global | Disable | 0 | 0 | 2 | 2 |
| Yes | 0 | Global | Disable | 0 | 0 | 2 | 1 |
| Yes | 0 | Global | Disable | 1 | 1 | 2 | 2 |

The following Routing Algorithm Table Inputs and Outputs describes the inputs and the outputs of the Routing Algorithm Table.

| Column Heading | Mnemonic | Input/Output | Description |
|---|---|---|---|
| Set B Dest Group | SET_B_DSTJ; RP | Input | The global_id in the frame's destination fabric address can be classified as targeting one or the other of two different types of groups (A or B). The classification is based on a pattern match. The routing algorithm can be varied based on the type of group to which the frame is headed. |
| In Src Group, Group Match | I!\I_SRC_GRP, GROUP_M.ATCH | Input | A frame may be in either its source group, its destination group, both simultaneously, or neither. The decisions of whether the frame is in its source group and/ or in its destination group is based on comparing the global_ids contained in the frame's source fabric address and destination fabric address to the global_id of the current switch where the routing decision is being made. If a frame is simultaneously in both the source and destination groups, local routing applies. If a frame is in neither, it is in an intermediate group |
| Switch Match | S\NITCH_MA.TCH | Input | This field indicates whether the switch_id field in the frame's destination fabric address matches the switch_id of the current switch where the routing decision is being made. |
| Port Type | none (inherent) | Input | The Port Type input reflects the type of port at which the frame has been received and is where the current routing decision is being made.<br>Within the implementation, each port has its own copy of the Routing Algorithm Table; therefore, the port type is inherent in how the table is configured for that port rather than being an explicit input to the table.<br>Each port must be configured with its type using the LINK_TYPE field of the R_TFJRF_CFG_BASIC_ROUTING field of the R_TFJRF_CFG_BASIC_ROUTING CSR. |
| Switch Stage | none (inherent) | Input | This input identifies the position, within the network topology, of the switch at which this configuration is being made.<br>Within the implementation, each port of each switch has its own copy of the Routing Algorithm Table; therefore, the switch stage is inherent in how the table is configured for that port and switch rather than being an explicit input to the table.<br>With the Dragonfly topology, the switch stage is not meaningful as all switches in the network are equivalent. With the fat-tree topology, all switches are not equivalent. For example, it is only the switches at the bottom of the tree that have edge ports, and switches at the top of the tree have only down-links. |

| Column Heading | Mnemonic | Input/Output | Description |
|---|---|---|---|
| Rcvd VC | RCV_VC | Input | This input identifies the virtual channel on which the frame was received. |
| Global Preferred | GLOBAL_PREFE RRED | Output | Indicates whether minimal path global port choices should be biased preferentially relative to minimal path local port choices. The choices are enumerated and described in detail in Table 10.1 on page 90S. |
| Enable Exception | ENA8I.EJXCPTN | Output | Indicates whether use of the exception tables, should be enabled for detecting exception ports. Depending on configuration described, the exception tables can be used either to detect ports that must not be used for routing the current frame or to detect minimal path ports that should be biased preferentially relative to other minimal path ports. The configuration described here is based on the latter use, where preferentially biased ports lead to paths with fewer hops. |
| Enable Min | ENA8L . . . E_MI!\I | Output | Specifies the minimal routing mode. Global means consult the global minimal path table, which is used to identify global and 1 or local ports when not at the destination group. Local Switch means consult the local switch minimal path table, which is used when at the destination group to identify local ports that connect to another switch in the current group. Local Port means consult the local port minimal path table, which is used when at the destination switch to identify edge ports of the current switch. The enumeration for the field's choices is provided. |
| Enable NM | ENABLE_NM | Output | Specifies the non-minimal routing mode. Global means enable local and global ports that are usable for global non- minimal path routing. Local means enable local ports that are usable for local non-minimal path routing. Local Conditional means enable local ports that are usable for local non-minimal path routing only if there are no minimal path choices; otherwise, non-minimal routing is disabled. The enumeration for this field's choices is provided. |
| Restrict GM | RESTRICT_GM | Output | When this is asserted, the set of ports that are enabled for global minimal routing is restricted to only include global ports. The configuration determines which ports are classified as being global ports. |
| Restrict GNM | RESTRIC:T_GNM | Output | When this is asserted, the set of ports that are enabled for global non-minimal routing is restricted to only include global ports. The configuration described determines which ports are classified as being global ports. |
| VCA, VC B | VC_A, VC_B | Output | Depending on the final port chosen for routing the frame, either of two VCs (A or B) can be used for the frame's next hop. The configuration shown in this table assumes VC A is used for local (and edge) ports and VC B is used for global ports. The configuration selected determines, for each port, whether VC A or VC B is used. |

Figure 13:
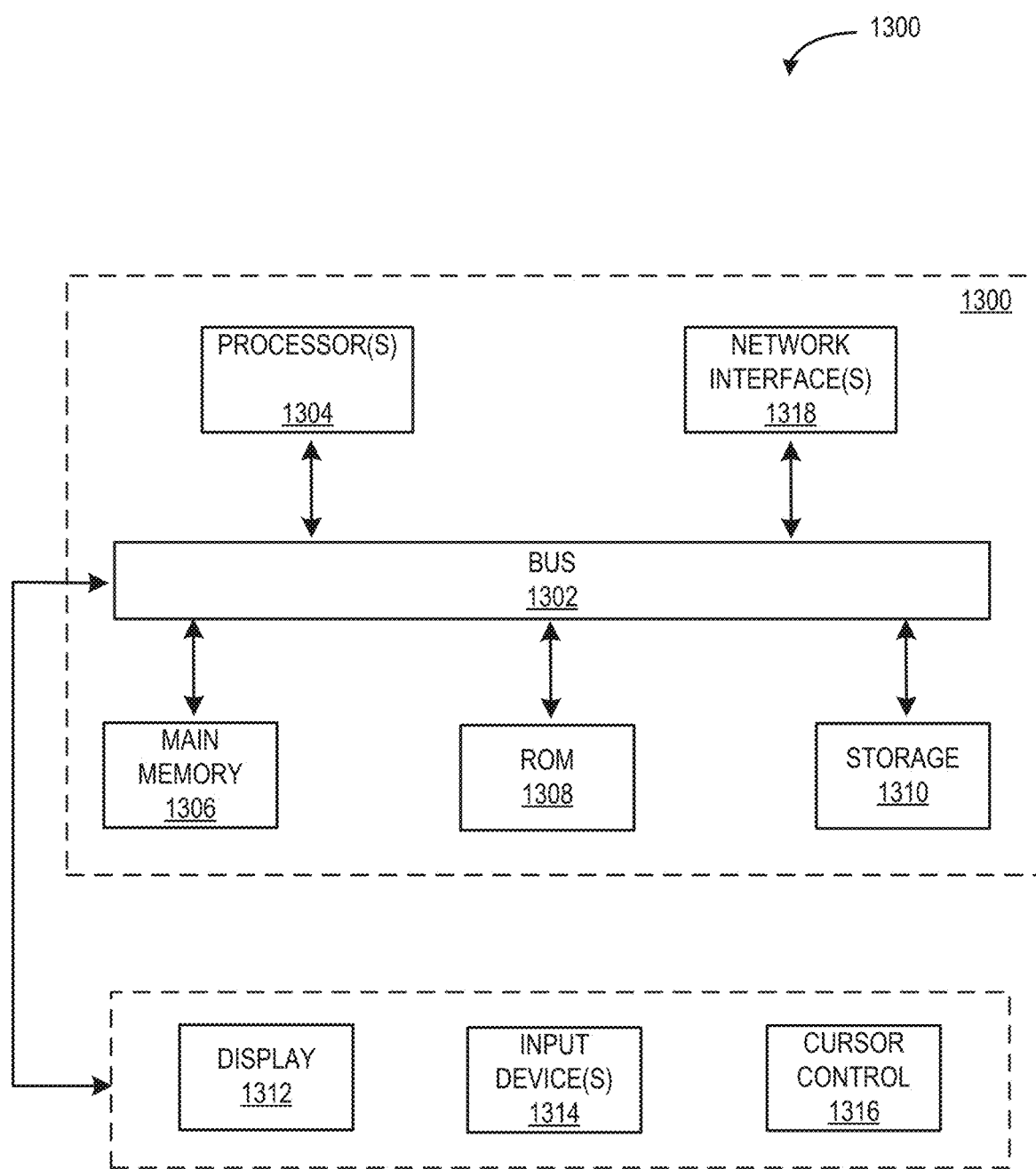
FIG. 13 is an example computing component that may be used to implement various features of embodiments described in the present disclosure.

FIG. 13 depicts a block diagram of an example computer system 1300 in which various of the embodiments described herein may be implemented. The computer system 1300 includes a bus 1302 or other communication mechanism for communicating information, one or more hardware processors 1304 coupled with bus 1302 for processing information. Hardware processor(s) 1304 may be, for example, one or more general purpose microprocessors.

The computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

The computer system 1300 further includes a read only memory (ROM) 1308 or other static storage device coupled to bus 1302 for storing static information and instructions for processor 1304. A storage device 1310, such as a magnetic disk, optical disk, or USB thumb drive (Flash drive), etc., is provided and coupled to bus 1302 for storing information and instructions.

The computer system 1300 may be coupled via bus 1302 to a display 1312, such as a liquid crystal display (LCD) (or touch screen), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. In some embodiments, the same direction information and command selections as cursor control may be implemented via receiving touches on a touch screen without a cursor.

The computing system 1300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components May be comprised of connected logic units, such as gates and flip-flops, and/or may be comprised of programmable units, such as programmable gate arrays or processors.

The computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor(s) 1304 executing one or more sequences of one or more instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1302. Transmission media can also take the form of acoustic or light waves, such as those generated during radio-wave and infra-red data communications.

The computer system 1300 also includes a communication interface 1318 coupled to bus 1302. Network interface 1318 provides a two-way data communication coupling to one or more network links that are connected to one or more local networks. For example, communication interface 1318 may be an integrated services digital network (ISDN) card, cable modem, satellite modem, or a modem to provide a data communication connection to a corresponding type of telephone line. As another example, network interface 1318 may be a local area network (LAN) card to provide a data communication connection to a compatible LAN (or WAN component to communicated with a WAN). Wireless links may also be implemented. In any such implementation, network interface 1318 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1318, which carry the digital data to and from computer system 1300, are example forms of transmission media.

The computer system 1300 can send messages and receive data, including program code, through the network(s), network link and communication interface 1318. In the Internet example, a server might transmit a requested code for an application program through the Internet, the ISP, the local network and the communication interface 1318.

The received code may be executed by processor 1304 as it is received, and/or stored in storage device 1310, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1300.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
receiving, by a switch in a network, a data flow comprising a plurality of packets at an edge port of the switch, the network comprising a plurality of switches configured in a fat-tree topology;
applying a translation rule to a respective packet of the data flow to determine a first value and a second value associated with forwarding of the packet;
applying a destination-based hash function on a set of header fields of the packet to determine a hash value comprising a predetermined number of bits;
determining a subset of the bits of the hash value based on the second value; and
determining an egress port for the packet based on the first value and the subset of the bits of the hash value.

2. The method of claim 1, wherein the set of header fields of the packet comprises at least one of: a source address and a destination address of the packet.

3. The method of claim 1, further comprising determining a combination of the set of header fields for the hash function based on a configuration.

4. The method of claim 1, wherein the hash value is generated based on a combination of one or more media access control (MAC) addresses, one or more Internet Protocol (IP) addresses, and one or more port addresses of the packet.

5. The method of claim 4, wherein applying the hash function further comprises using a Cyclic Redundancy Check (CRC) function to compress the one or more MAC addresses, one or more IP addresses, and one or more port addresses of the packet into the hash value.

6. The method of claim 1, further comprising multiplying the hash value by the second value to determine the subset of the bits of the hash value.

7. The method of claim 6, further comprising adding a value indicated by the subset of the bits of the hash value to the first value to form an index into an entry of a routing table indicating the egress port.

8. A switch, comprising:
a processor;
an input port to receive a data flow comprising a plurality of packets via a network configured in a fat-tree topology;
a plurality of output ports;
a non-transitory computer-readable storage medium storing instructions that when executed by the processor cause the switch to:
apply a translation rule to a respective packet of the data flow to determine a first value and a second value associated with forwarding of the packet;
apply a destination-based hash function on a set of header fields of the packet to determine a hash value comprising a predetermined number of bits;
determine a subset of the bits of the hash value based on the second value; and
determine an output port for the packet from the plurality of output ports based on the first value and the subset of the bits of the hash value; and
a crossbar switch, which couples the input port to the plurality of output ports, to route the packet to the output port.

9. The switch of claim 8, wherein the set of header fields of the packet comprises at least one of: a source address and a destination address of the packet.

10. The switch of claim 8, wherein a combination of the set of header fields for the hash function is determined based on a configuration.

11. The switch of claim 8, wherein the hash value is generated based on a combination of one or more media access control (MAC) addresses, one or more Internet Protocol (IP) addresses, and one or more port addresses of the packet.

12. The switch of claim 11, wherein applying the hash function further comprises using a Cyclic Redundancy Check (CRC) function to compress the one or more MAC addresses, one or more IP addresses, and one or more port addresses of the packet into the hash value.

13. The switch of claim 8, wherein the instructions that when executed by the processor cause the switch to multiply the hash value by the second value to determine the subset of the bits of the hash value.

14. The switch of claim 13, wherein the instructions that when executed by the processor cause the switch to add a value indicated by the subset of the bits of the hash value to the first value to form an index into an entry of a routing table indicating the egress port.

15. A non-transitory computer-readable storage medium storing instructions that when executed by a processor of a switch of a network cause the processor to perform a method, the method comprising:
- receiving a data flow comprising a plurality of packets at an edge port of the switch, the network comprising a plurality of switches configured in a fat-tree topology;
- applying a translation rule to a respective packet of the data flow to determine a first value and a second value associated with forwarding of the packet;
- applying a destination-based hash function on a set of header fields of the packet to determine a hash value comprising a predetermined number of bits;
- determining a subset of the bits of the hash value based on the second value; and
- determining an egress port for the packet based on the first value and the subset of the bits of the hash value.

16. The non-transitory computer-readable storage medium of claim 15, wherein the method further comprises determining a combination of the set of header fields for the hash function based on a configuration.

17. The non-transitory computer-readable storage medium of claim 15, wherein the hash value is generated based on a combination of one or more media access control (MAC) addresses, one or more Internet Protocol (IP) addresses, and one or more port addresses of the packet.

18. The non-transitory computer-readable storage medium of claim 17, wherein applying the hash function further comprises using a Cyclic Redundancy Check (CRC) function to compress the one or more MAC addresses, one or more IP addresses, and one or more port addresses of the packet into the hash value.

19. The non-transitory computer-readable storage medium of claim 15, wherein the method further comprises multiplying the hash value by the second value to determine the subset of the bits of the hash value.

20. The non-transitory computer-readable storage medium of claim 19, wherein the method further comprises adding a value indicated by the subset of the bits of the hash value to the first value to form an index into an entry of a routing table indicating the egress port.

* * * * *